(12) United States Patent
Wang et al.

(10) Patent No.: US 9,986,003 B2
(45) Date of Patent: *May 29, 2018

(54) MEDIATING CONTENT DELIVERY VIA ONE OR MORE SERVICES

(71) Applicant: QUALCOMM Incorporated, San Diego, CA (US)

(72) Inventors: Jun Wang, Poway, CA (US); Carlos Marcelo Dias Pazos, Carlsbad, CA (US); Charles Nung Lo, San Diego, CA (US); Nagaraju Naik, San Diego, CA (US); Thomas Stockhammer, Bergen (DE); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/497,820

(22) Filed: Apr. 26, 2017

(65) Prior Publication Data

US 2017/0230434 A1    Aug. 10, 2017

Related U.S. Application Data

(63) Continuation of application No. 14/305,557, filed on Jun. 16, 2014, now Pat. No. 9,674,251.

(Continued)

(51) Int. Cl.
*G06F 15/16* (2006.01)
*H04L 29/06* (2006.01)
(Continued)

(52) U.S. Cl.
CPC ........ *H04L 65/4076* (2013.01); *H04L 12/189* (2013.01); *H04L 65/601* (2013.01);
(Continued)

(58) Field of Classification Search
USPC ........................................................ 709/217
See application file for complete search history.

(56) References Cited

U.S. PATENT DOCUMENTS 7,852,767 B2 * 12/2010 Twiss ................ H04L 45/04
370/235
8,645,282 B2 * 2/2014 Vakil ................ G06Q 20/02
705/76

(Continued)

FOREIGN PATENT DOCUMENTS

CN       101051996 A    10/2007
WO       2007023337 A1   3/2007

OTHER PUBLICATIONS

"3rd Generation Partnership Project; Technical Specification Group Core Network and Terminals; Numbering, addressing and identification," 3 GPP TS 23.003, V12.2.0, Mar. 2014, 87 pp.

(Continued)

*Primary Examiner* — Alicia Baturay
(74) *Attorney, Agent, or Firm* — Shumaker & Sieffert, P.A.

(57) ABSTRACT

A device for receiving streaming data includes a broadcast or multicast middleware unit configured to receive the streaming data via a second service and a proxy unit configured to be disposed between the middleware unit and a client application, the proxy unit further configured to receive an indication of whether the streaming data is to be received via a first service or the second service, when the indication indicates that the streaming data is to be received via the first service: disable the middleware unit; and receive the streaming data via the first service, and when the indication indicates that the streaming data is to be received via the second service: activate the middleware unit to receive the streaming data via the second service, wherein (Continued)

the second service comprises at least one of a broadcast service or a multicast service; and receive the streaming data from the middleware unit.

24 Claims, 30 Drawing Sheets

Related U.S. Application Data

(60) Provisional application No. 61/836,143, filed on Jun. 17, 2013.

(51) Int. Cl.
*H04L 29/08* (2006.01)
*H04L 12/18* (2006.01)

(52) U.S. Cl.
CPC ............ *H04L 65/607* (2013.01); *H04L 67/02* (2013.01); *H04L 69/18* (2013.01)

(56) References Cited

U.S. PATENT DOCUMENTS

| | | | |
|---|---|---|---|
| 8,949,451 B2* | 2/2015 | Einarsson | G06F 17/30017 370/485 |
| 9,338,802 B2* | 5/2016 | LeCompte | H04W 28/06 |
| 9,674,251 B2 | 6/2017 | Wang et al. | |
| 2005/0043035 A1* | 2/2005 | Diesen | H04L 12/1886 455/454 |
| 2007/0173283 A1 | 7/2007 | Livet et al. | |
| 2008/0130548 A1* | 6/2008 | Kaikkonen | H04W 72/005 370/312 |
| 2008/0311949 A1* | 12/2008 | Koskinen | H04W 72/005 455/525 |
| 2012/0263089 A1 | 10/2012 | Gupta et al. | |
| 2012/0265892 A1 | 10/2012 | Ma et al. | |
| 2013/0007814 A1 | 1/2013 | Cherian et al. | |
| 2013/0111028 A1 | 5/2013 | Kondrad et al. | |
| 2013/0182643 A1 | 7/2013 | Pazos et al. | |
| 2013/0232510 A1* | 9/2013 | Yang | G06F 9/541 719/328 |
| 2013/0294321 A1 | 11/2013 | Wang et al. | |
| 2014/0089452 A1* | 3/2014 | Beck | H04N 21/8456 709/213 |
| 2014/0089467 A1* | 3/2014 | Beck | H04L 67/02 709/219 |
| 2014/0201323 A1 | 7/2014 | Fall et al. | |
| 2015/0012584 A1 | 1/2015 | Lo et al. | |

OTHER PUBLICATIONS

"3rd Generation Partnership Project: Technical Specification Group Services and System Aspects; 3G Security; Security of Multimedia Broadcast/Multicast Service (MBMS)," Release 11, 3 GPP TS 33.246 V11.2.0, Jun. 2013, 70pp.
"3rd Generation Partnership Project: Technical Specification Group Services and System Aspects; MBMS Improvements; MBMS operation on Demand," 3 GPP TR 26.849, V1.0.0, Release 12, Mar. 2014, 19 pp.
3rd Generation Partnership Project: Technical Specification Group Services and System Aspects; Multimedia Broadcast/Multicast Service (MBMS); Architecture and functional description, 3 GPP TS 23.246, V12.1.0, Mar. 2014, 67 pp.
3rd Generation Partnership Project: Technical Specification Group Services and System Aspects; Multimedia Broadcast/Multicast Service (MBMS); Protocols and codecs, Release 12,3 GPP TS 26.346 V12.1.0, Mar. 2014, XP050769694, 181 pp.
"3rd Generation Partnership Project; Technical Specification Group Services and System Aspects; Vocabulary for 3GPP Specifications," Release 12, 3 GPP TR 21.905, Version 12.0.0, Jun. 2013, 64 pp.
Berners-Lee T, Network Working Group; Request for Comments: 3986 STD: 66 Updates 1738 Obsoletes: 2732, 2396, 1808 Category: Standards Track; W3C/MIT R Fielding Day Sotware L Masinter Adobe Systems, Jan. 2005, Uniform Resource Identifier (URI): Generic Syntax.
Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.
Bross B., et al., "High Efficiency Video Coding (HEVC) text specification draft 8," 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 Pages.
Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High Efficiency Video Coding (HEVC) Text Specification Draft 9," Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012 , 290 pp.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
International Preliminary Report on Patentability—PCT/US2014/042752 The International Bureau of WIPO—Geneva, Switzerland, Oct. 1, 2015, 13 pp.
International Search Report and Written Opinion—PCT/US2014/042752—ISA/EPO—dated Oct. 17, 2014, 16 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
ITU-T H.265, Series H: Audiovisual and Multimedia Systems, Infrastructure of audiovisual services—Coding of moving video, High efficiency video coding, The International Telecommunication Union, Oct. 2014, 540 pp.
JCT-VC, "High Efficiency Video Coding (HEVC) text specification draft 10," Jan. 14-23, 2013.
Lecompte D., et al., "Evolved Multimedia Broadcast/multicast Service (eMBMS) in LTE-advanced: overview and Rel-11 enhancements," IEEE Communications Magazine, vol. 50, No. 11, Nov. 2012 (Nov. 2012), pp. 68-74, XP002730488, IEEE USA ISSN: 0163-6804, DOI: 10.1109/MCOM.2012.6353684 the whole document.
MI-MooD: MBMS Service Configuration, Qualcomm Incorporated. 3GPP TSG-SA4 #78. Kista. Sweden, Apr. 7-11, 2014, 5 pp.
Mockapetris: "Domain Names—Implementation and Specification," RFC 1035, The Internet Engineering Task Force (IETF) Request for Comments, Network Working Group, Information Science Instittute, pp. 1-52, Nov. 1987.
"OMA Device Management Protocol," Open Mobile Alliance, Approved Version 1.2.1-14, Jun. 2008, 53 pp.
OMA Enabler Release Definition for OMA Device Management, Approved Version 1.2.1, Jun. 17, 2008, Open Mobile Alliance, OMA-ERELD-DM-V1_2_1-20080617-A.
Paila T., et al., "FLUTE—File Delivery over Unidirectional Transport; rfc6726.txt," Internet Engineering Task Force, IETF; Standard,

(56) References Cited

OTHER PUBLICATIONS

Internet Society (ISOC) 4, Rue Des Falaises CH-1205 Geneva, Switzerland, Nov. 6, 2012 (Nov. 6, 2012), pp. 1-46, XP015086468, [retrieved on Nov. 6, 2012].

Second Written Opinion from International Application No. PCT/US2014/042752, dated Jun. 1, 2015, 11 pp.

Wiegand T., et al., "WD2: Working Draft 2 of High-Efficiency Video Coding," Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand T., et al., "WD3: Working Draft 3 of High-Efficiency Video Coding," Document JCTVC-E603, 5th Meeting: Geneva, CH, Mar. 16-23, 2011, 160 pages.

Wiegand T., et al.,"WD1: Working Draft 1 of High-Efficiency Video Coding," JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Response to Written Opinion dated Oct. 17, 2014, from International Application No. PCT/US2014/042752, filed on Feb. 27, 2015, 8 pp.

Response to Second Written Opinion dated Jun. 1, 2015, from International Application No. PCT/US2014/042752 filed on Jul. 31, 2015, 33 pp.

\* cited by examiner

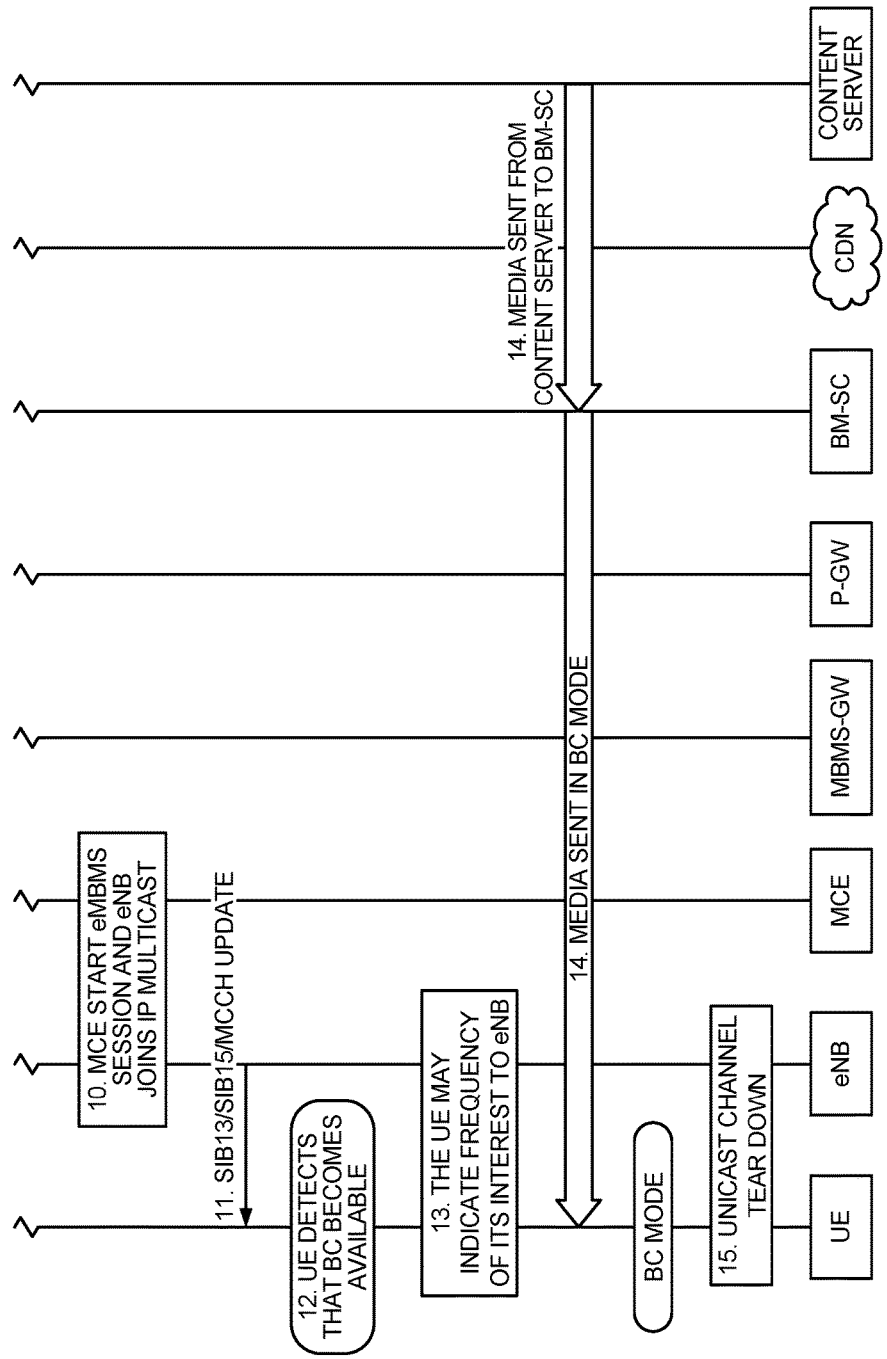

MEDIATING CONTENT DELIVERY VIA ONE OR MORE SERVICES

This application is a continuation of U.S. application Ser. No. 14/305,557, filed Jun. 16, 2014, which claims the benefit of U.S. Provisional Application No. 61/836,143, filed Jun. 17, 2013, the entire contents of which are incorporated herein by reference.

TECHNICAL FIELD

This disclosure relates to storage and transport of encoded data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In one example, a method of receiving streaming data includes receiving, by a proxy unit of a client device, an indication of whether the streaming data is to be received via a first service or a second service, wherein the indication was sent from a broadcast multicast service center (BM-SC) of a service provider network, wherein the client device further comprises a broadcast or multicast middleware unit, and wherein the proxy unit is disposed in a communication path between the middleware unit and a client application executed by at least one processor of the client device; and when the indication indicates that the streaming data is to be received via the second service: activating the middleware unit to receive the streaming data via the second service, wherein the second service comprises at least one of: a broadcast service or a multicast service, and receiving, by the proxy unit, the streaming data from the middleware unit.

In one example, a method of receiving streaming data includes receiving, by a proxy unit of a client device, an indication of whether the streaming data is to be received via a first service or a second service, wherein the indication was sent from a broadcast multicast service center (BM-SC) of a service provider network, wherein the client device further comprises a multimedia broadcast multicast services (MBMS) or evolved MBMS(eMBMS) middleware unit, and wherein the proxy unit is disposed in a communication path between the middleware unit and a client application executed by at least one processor of the client device; and when the indication indicates that the streaming data is to be received via the first service: disabling the middleware unit, the middleware unit having received at least a portion of the streaming data via the second service, wherein the second service comprises at least one of: a broadcast service or a multicast service, and receiving, by the proxy unit, the streaming data via the first service, wherein the first service comprises a unicast service.

In one example, a device for receiving streaming data includes a broadcast or multicast middleware unit configured to receive the streaming data via a second service; and a proxy unit configured to be disposed in a communication path between the middleware unit and a client application executed by at least one processor of the device, the proxy unit further configured to: receive, from a broadcast multicast service center (BM-SC) of a service provider network, an indication of whether the streaming data is to be received via a first service or the second service, when the indication indicates that the streaming data is to be received via the first service: disable the middleware unit; and receive the streaming data via the first service, wherein the first service comprises a unicast service, and when the indication indicates that the streaming data is to be received via the second service: activate the middleware unit to receive the streaming data via the second service, wherein the second service comprises at least one of: a broadcast service or a multicast service; and receive the streaming data from the middleware unit.

In one example, a computer-readable storage medium has stored thereon instructions for receiving streaming data that, when executed, cause at least one processor of a client device to: cause a proxy unit of the client device to receive an indication of whether the streaming data is to be received via a first service or a second service, the indication sent from a broadcast multicast service center (BM-SC) of a service provider network, wherein the client device comprises a broadcast or multicast middleware unit, and wherein the proxy unit is disposed in a communication path between the broadcast or multicast middleware unit and a client application executed by at least one processor of the client device; when the indication indicates that the streaming data is to be received via the first service: disable the middleware unit, and receive the streaming data via the first service, wherein the first service comprises a unicast service; and when the indication indicates that the streaming data is to be received via the second service: activate the middleware unit to receive the streaming data via the second service, wherein the second service comprises at least one of: a broadcast service or a multicast service, and receive the streaming data from the middleware unit.

In one example, a device for receiving streaming data includes means for causing a proxy unit of the device to receive an indication of whether the streaming data is to be received via a first service or a second service, the indication sent from a broadcast multicast service center (BM-SC) of a service provider network, wherein the device further comprises a broadcast or multicast middleware unit, wherein the proxy unit is disposed in a communication path between the broadcast or multicast middleware unit and a client application executed by at least one processor of the client device; means for disabling the middleware unit when the indication indicates that the streaming data is to be received via the first service; means for receiving, by the proxy unit, the streaming data via the first service when the indication indicates that the streaming data is to be received via the first service, wherein the first service comprises a unicast service; means for activating the middleware unit to receive the streaming data via the second service, when the indication indicates that the streaming data is to be received via the second service, wherein the second service comprises at least one of: a broadcast service or a multicast service; and means for receiving the streaming data from the middleware unit when the indication indicates that the streaming data is to be received via the second service.

The details of one or more examples are set forth in the accompanying drawings and the description below. Other features, objects, and advantages will be apparent from the description and drawings, and from the claims.

BRIEF DESCRIPTION OF DRAWINGS

FIGS. 11A and 11B are conceptual diagrams illustrating example operations for sending data over a network using one or more services.

DETAILED DESCRIPTION

Figure 1:
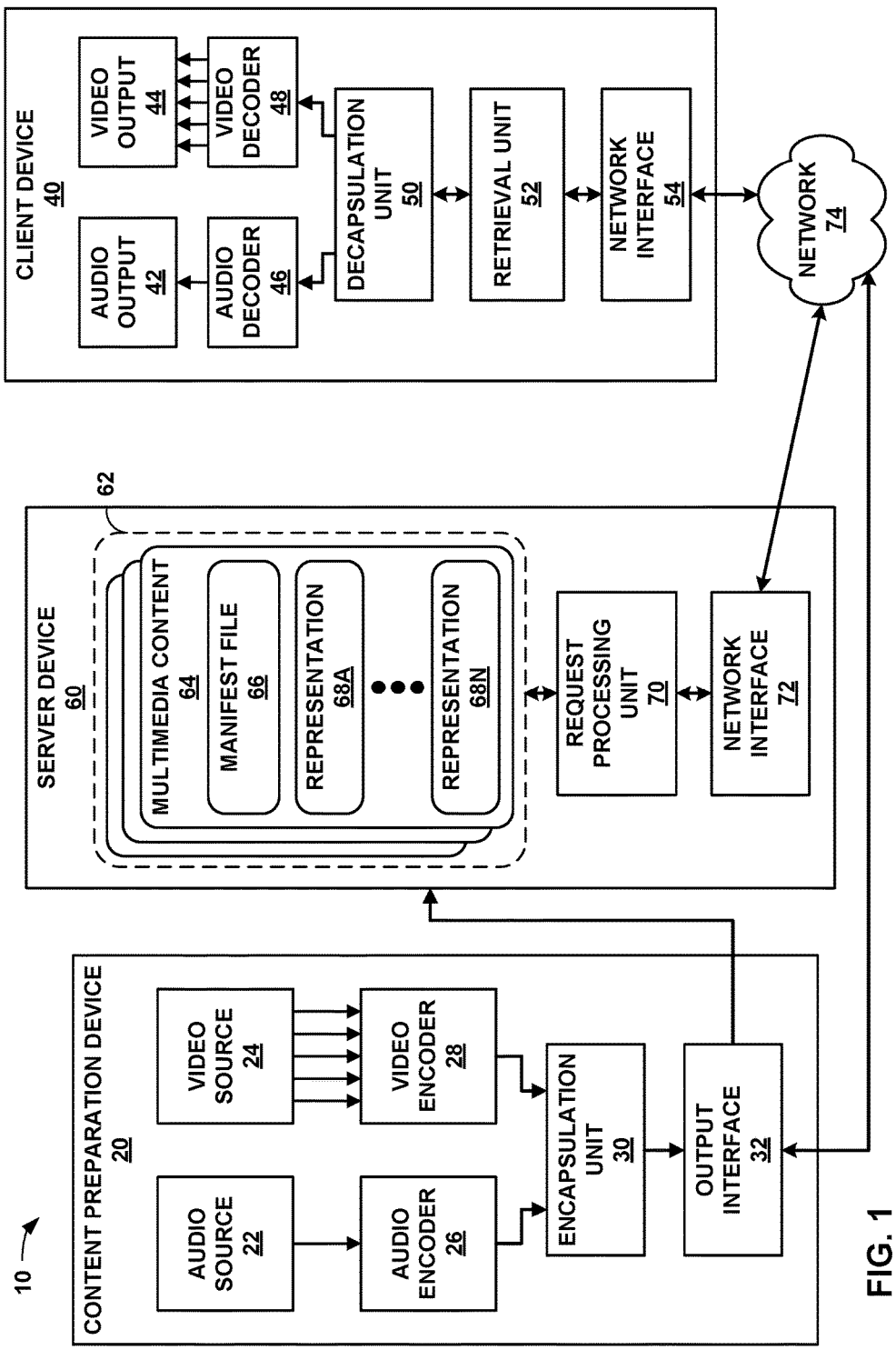
FIG. 1 is a block diagram illustrating an example system that implements techniques for streaming media data over a network.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile devices or mobile entities. A UE may communicate with a base station via a downlink and an uplink. The downlink (or forward link) refers to the communication link from the base station to the UE, and the uplink (or reverse link) refers to the communication link from the UE to the base station. A "base station" may refer to an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile devices, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

In broadcast operation, several eNBs in a broadcast area broadcast signals in a synchronized fashion, carrying information that can be received and accessed by any subscriber UE in the broadcast area. The generality of broadcast operation enables greater efficiency in transmitting information of general public interest, for example, multimedia broadcasts and multimedia unicast services providing various types of audio-video content to the end user. As the demand and system capability for multimedia content has increased, system operators are in need of tools to control use of radio resources for multimedia or other content, in a flexible and adaptive fashion.

In general, this disclosure describes techniques for supporting various types of transport mechanisms for sending various types of data, including streaming media data (e.g., audio and/or video data), through a network. For example, one or more components of a UE (e.g., an application, a streaming/file downloading client, a proxy unit, or other component) may be configured to receive an indication of whether data is to be received via a first (e.g., unicast) service or a second (e.g., broadcast or multicast) service. The indication, in some examples, may be an HTTP redirection, a push message, an air interface signaling message, or other message. When the indication indicates that the data is to be received via the first service, the UE may disable a unit for receiving data via the second service, such as a multimedia broadcast multicast services (MBMS) middleware unit, evolved MBMS (eMBMS) middleware unit, or multicast services device client (MSDC) and may receive the data via the first service using a first delivery mode (e.g., a unicast delivery mode). When the indication indicates that the data is to be received via the second service, the UE may activate the unit for receiving data via the second service and receive the data from the unit for receiving the data via the second service. The unit for receiving the data via the second service may receive the data via a first delivery mode (e.g., a unicast delivery mode) or a second delivery mode (e.g., a broadcast or multicast delivery mode).

In other words, one or more techniques of the present disclosure may involve improvements to MBMS operation by providing MBMS operation on Demand (MooD). The techniques described herein, in some examples, may enable the setup of an MBMS user service on the fly and the seamless migration of an existing service to an MBMS user service. That is, in some examples, certain content that is initially delivered over a unicast network may be turned into an MBMS User Service, in order to efficiently use network resources when the traffic volume exceeds a certain threshold. Such dynamic conversion from unicast delivery to MBMS delivery may also be referred to as "MBMS offloading." The MBMS offloading may apply to unicast traffic carried over HTTP or Real-time Transport Protocol (RTP)/Real-Time Streaming Protocol (RTSP). In the former case (e.g., unicast traffic carried over HTTP), an MBMS download delivery method may be used for delivering the offloaded content. In the latter case (e.g., unicast traffic carried over RTP/RTSP), an MBMS streaming method based on RTP may be used for delivering the offloaded content.

In some examples, MBMS offloading may be UE-elected. UE-elected offloading may refer to a MooD-capable UE sending unicast requests for content that is eligible for conversion to delivery as an MBMS service, to a designated proxy server. Conversion eligibility for particular content may be described by the open mobile alliance device management (OMA-DM) MooD Management Object (MO) based on the request domains. If the UE receives a MooD redirect response (e.g., containing a 3GPP-specified MooD header field), the UE may activate an MBMS middleware client by providing the middleware with entry point information to a user service description (USD) that is already provisioned or that is provided in the MooD header field. Subsequently, when the MBMS middleware client is operational, having acquired the USD fragments (including the Media Presentation Description fragment in the case of Dynamic Adaptive Streaming over HTTP (DASH)-formatted content) for the new MBMS service, and having begun receiving contents over the MBMS bearer, future requests for content by the streaming client (e.g., the DASH client) may be served by the MBMS client.

Via OMA-DM (Device Management), the UE may be provisioned with configuration information pertaining to MooD operation (e.g., using a MooD configuration management object). Configuration parameters may include an indication of a proxy server over which unicast content requests are to be sent, identification of content for which offloading to MBMS may be eligible, and the location of a USD for the UE to acquire service announcement information.

If a UE is not able to handle the redirection messages of the BM-SC, the UE may not use the proxy server for the requests. That is, some UE's may be configured in accordance with the techniques described herein, and may support handling of the redirection message, while other UE's may not be able to handle the redirection message.

Furthermore, the techniques described herein may include evaluating performance of a unicast service to determine whether the service would be better served using broadcast or unicast and techniques for enabling an MBMS Broadcast Session for an ongoing MBMS User Service where previously none was active.

In some examples, the techniques described herein may enable one or more components (e.g., of a service network) to determine whether a non-MBMS unicast service should be converted to an MBMS User Service and, if so, to enable a broadcast multicast service center (BM-SC) to convert the non-MBMS unicast service to an MBMS User Service. MBMS User Service is specified in 3GPP Technical Specification 26.346, "Multimedia Broadcast/Multicast Service (MBMS); Protocols and codecs (Release 12)", V12.1.0, March 2014. In some such examples, the techniques described herein may enable the service network to distribute a USD or other manifest file that describes the MBMS User Service to interested UEs.

In addition, the techniques described herein may, in some examples, include determining the consumption level of a service, and evaluating elements that may assist in determining whether the service would be better served via unicast or broadcast/multicast transmission. The consumption level, in some examples, may represent the number of UEs in a particular area that are consuming the service, the percentage of UEs in the area that are consuming the service, the percentage of MooD capable UEs that are consuming the service, or other measure of service consumption. The techniques described herein may, in some examples, enable a USD or other manifest file to add an MBMS download or streaming session to an existing MBMS user service if uptake is high. In some examples, the techniques described herein may investigate the level of MooD support for UEs supporting pre-R12 MBMS. In various examples, the techniques of the present disclosure may be applied using MBMS Broadcast services and/or MBMS Multicast services.

The techniques of this disclosure may be used in conjunction with various application-layer protocols for streaming media data. For example, the techniques of this disclosure may be used in conjunction with adaptive HTTP streaming technologies such as DASH, HTTP Live Streaming (HLS), and SmoothStreaming, which utilizes HTTP to stream media data. As additional examples, the techniques of this disclosure may be used in conjunction with RTP, RTSP, and/or file downloading protocols, such as Packet-switched Streaming Service (PSS) Progressive Download.

In these and other instances, a streaming client (e.g., an RTP client, an RTSP client, a DASH client, etc.) may be transport-agnostic, in the sense that the streaming client need not be aware of a transport mechanism used to retrieve media data. For instance, in some examples, the streaming client need not be aware of whether an underlying transport mechanism corresponds to a unicast service via a unicast delivery mode or a broadcast or multicast service via a broadcast or multicast delivery mode.

As discussed in greater detail below, a UE may be configured to send a request over a network, where the request specifies certain data (e.g., media data or other file data) of a content service. One or more components of the UE may receive an indication of whether the data can be retrieved using a particular transport mechanism, e.g., a broadcast service or a unicast service. For instance, a proxy unit of the UE may receive the indication in response to sending the request. The proxy unit may then cause the streaming/file downloading client to receive the data using one of the transport mechanisms (based on availability, preference, reliability, and/or other factors). For example, if the broadcast service is available, the proxy unit may cause the streaming/file downloading client to receive the data via the broadcast service (e.g., using a broadcast delivery mode), whereas if the broadcast service is unavailable, the proxy unit may cause the streaming/file downloading client to continue to receive the data via the unicast service.

As one example, with respect to DASH, media data may be available from one or more servers, e.g., a broadcast server and a unicast server. In some cases, the same server device may provide both a broadcast service and a unicast service. Thus, the broadcast server and the unicast server may correspond to the same server device. A DASH client may receive a modified media presentation description (MPD) for the media data that indicates that the media data is available from a local host (rather than the server(s)). When the DASH client sends a request for media data to a proxy unit, the proxy unit may determine (based on the received indication) whether a unicast service or a broadcast service is available for retrieving the requested media data. If the broadcast service is available, a broadcast receiving unit (e.g., an MBMS or eMBMS middleware unit or MSDC) may receive the media data via a multicast or broadcast delivery mode, and the proxy unit may cause the DASH client to send a request for the media data to the broadcast receiving unit. On the other hand, if the broadcast service is not available, the proxy unit may cause the DASH client to send a request for the media data to a unicast server, to retrieve the media data using a unicast service. Alternatively, if the broadcast service is not available, the proxy unit may retrieve the media data from the unicast server, and then provide the retrieved media data to the DASH client.

As another example, with respect to RTP and/or RTSP, an RTP client (which, additionally or alternatively, may correspond to an RTSP client) may submit DESCRIBE, SETUP, and PLAY commands to a proxy unit. In response to the DESCRIBE command, the proxy unit may provide a session description protocol (SDP) message to the RTP client. The SDP message may specify an address of the unicast server as the address from which the media data is available. This SDP message may cause the RTP client to send the SETUP and PLAY commands to the unicast server. When a proxy unit determines (based on the received indication) that the broadcast service is available, the proxy unit may send SETUP and PLAY commands to a broadcast receiving unit (e.g., an MBMS or eMBMS middleware unit or MSDC), which may receive the media data via a broadcast or multicast delivery mode and forward the media data to the RTP client. On the other hand, when the proxy unit determines that the broadcast service is not available, the proxy unit may retrieve the media data from a unicast server, and then provide the retrieved media data to the RTP client.

In some examples, components for performing the techniques of this disclosure may include a streaming/file downloading client and a broadcast receiving unit. In various examples, a client device may include either or both of these components, alone or in any combination. In some examples, a client device may include other components, such as a proxy unit, a short message service (SMS) receiving unit, an OMA-DM receiving unit, a wireless application protocol (WAP) message receiving unit, a communications unit (e.g., a modem), or other components. While described in various examples as being performed by one or more of a proxy unit of the UE, a streaming/file downloading client of the UE, and/or a client application of the UE, various functions may, in some examples, be performed by other components in accordance with the techniques described herein. For instance, in some examples a proxy unit may provide both streaming/file downloading client functionality and proxy/redirection functionality. In some examples, while described as part of a client device (or user equipment), various components may have the functionality described herein but be separate and distinct from one another. For instance, a client device may include a streaming/file downloading client, and one or more other components may be included in one or more devices that are separate from the client device.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats. One or more techniques of this disclosure may additionally apply to other types of data as well, such as file data, or other application data. That is, while described in certain examples with respect to streaming media data, the techniques of the present disclosure may apply to obtaining any type of data over one or more networks by selectively using one or more services and/or delivery modes.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. Different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a URL, URN, or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

Each representation may also include one or more media components, where each media component may correspond to an encoded version of one individual media type, such as audio, video, or timed text (e.g., for closed captioning). Media components may be time-continuous across boundaries of consecutive media segments within one representation.

The techniques described herein may be used for various wired or wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

In various networks, content can be delivered via unicast or broadcast. When a UE requests content, an MBMS user service for the content may not be available and, therefore, the MBMS client is not involved. In some examples, such as when the UE enters a different area of the network, or when a device of the network determines that enough UEs are accessing the content, a device of the network may enable the MBMS bearer service. When the device of the network decides to enable MBMS transmission for the content, for example based on a high attach rate, a way is needed to activate the MBMS client of UEs requesting the content. The present disclosure proposes, in one example, to include a local proxy so that the local proxy will activate the MBMS client when it gets network redirection. That is, a UE may include a local proxy for a unicast service so that the UE can be potentially switched to an MBMS user service. Additionally, the MBMS client may begin receiving data from the MBMS user service via a broadcast or multicast delivery mode, and the local proxy may enable the UE to thereby switch from a unicast delivery mode to a broadcast delivery mode. By including a local proxy, the application is agnostic on whether unicast bearer or MBMS bearer is used for content delivery as well as whether a unicast or broadcast delivery mode is used. That is, in some examples, the application to which the content is delivered need not receive information about whether the content is delivered via unicast, broadcast, or multicast delivery modes.

The techniques described herein may provide dynamic establishment of MBMS User Services to offload unicast delivery of certain contents, either real-time or non-real-time based, which reach a certain traffic volume due to the popularity of those contents. Furthermore, the techniques described herein may provide for termination of a previously established MBMS User Service due to subsequent decrease in its consumption. Functional aspects of the BM-SC and UE configured to support such on-demand MBMS are also described. That is, the present disclosure may provide a description of high-level MBMS and unicast network architecture in the context of MooD, message sequence diagrams illustrating examples of MooD operation, and/or description of solution frameworks that may enable MooD operation (e.g., including configuration data), as well as interaction between a BM-SC and a UE for activating or triggering an MBMS client for reception of a newly-established MBMS User Service, and the reporting of ongoing consumption of the MBMS service to enable measurement of ongoing demand for that service.

The techniques of the present disclosure may provide dynamic and demand-based provisioning of MBMS services. That is, an MBMS User Service may not need to be provisioned statically by a service provider (e.g., a mobile network operator) or variably over certain times. In accordance with the techniques described herein, service providers may use real-time, demand-based measurement of content consumption via unicast bearers to enable dynamic conversion to delivery over MBMS bearers. For instance, using the techniques described herein, the service provider, upon detection of sufficiently high rate/volume of unicast access to the same content or service in a common geographical area, by multiple UEs, may convert, in a dynamic fashion, the unicast service to an MBMS user service for broadcast delivery. Moreover, the techniques described herein may provide a normative description of the means for a service provider network to indicate, to UEs, the eligibility of unicast services for MBMS User Service conversion as well as methods that may enable a UE that is currently consuming content via a unicast service to inform the service provider network regarding the UE's capability (or lack thereof) for receiving the content over a broadcast service.

The techniques described herein may additionally or alternatively include dynamic and demand-based termination of MBMS services. That is, the present disclosure provides methods that a service provider network may use to terminate an ongoing MBMS user service. For instance, a network-initiated MBMS User Service termination could be triggered when a device within the network determines that a certain threshold (e.g., set by a content provider and/or a service provider) of MBMS User Service de-registration events has been exceeded or that some form of network-based counting of actual content consumption goes below a certain minimum level.

The techniques of the present disclosure may additionally or alternatively provide methods a service provider network (e.g., a BM-SC within the service provider network) may use to inform MBMS-capable UEs about a Potential MBMS User Service in a scalable manner. A Potential MBMS User Service may be a non-MBMS User Service that may potentially be migrated to an MBMS User Service. For instance, the techniques described herein may enable the network to operate using a static configuration, in which UEs are configured such that certain services are always Potential MBMS User Services. As another example, the network may use device management methods, wherein an operator of the network may configure UEs dynamically such that certain services are MBMS User Services. As another example, a device of the network may inform the UEs via the use of an MBMS User Service by using a specific USD that announces the service as a specific MBMS User Service. Furthermore, the techniques described herein may enable UEs to continuously inform a service provider network (e.g., a BM-SC) about consumption of a Potential MBMS User Service. In some examples, the UE may also inform the service provider network of other information, such as location or consumption metadata. For instance, the UE may register directly for a service and use a specific API or protocol to keep the BM-SC informed. As another example, the UE may use specific HTTP requests that are generated according to the configuration (e.g., to a specific proxy), enhanced with query parameters and/or cookies.

The techniques described herein may also enable a service provider network to establish and announce an MBMS User Service to MBMS-capable UEs that are currently consuming a service or MBMS-capable UEs that are joining a Potential MBMS User Service, once the MBMS User Service is already established. For instance, a device of the network may send a USD to the MBMS-capable UEs using a preconfigured API/protocol that is defined in the configuration. As another example, a device of the network may send a USD as part of the service distribution, either as part of the service protocol or as part of the formats. In addition, the techniques described herein may enable a UE to continuously inform a service provider network (e.g., a BM-SC) about the consumption of the UE in a scalable manner, including, in some examples, informing the service provider network about the UE's termination of the service.

In various examples, the techniques of this disclosure may be based on one or more assumptions. For instance, in some examples, the techniques described herein may be based on the following assumptions pertaining to dynamic switching between unicast and broadcast delivery modes of an MBMS User Service: first, it may be assumed that business agreements enable an operator (e.g., of a service provider network) to convert various content feeds from unicast to broadcast delivery upon high demand of a nominal unicast content or service; secondly, it may be assumed that operators want to accurately count the consumption of a service, taking into account UE capabilities, UE location, and the actions of users, such as time-shift and others. Of course, it will be appreciated that the techniques of this disclosure do not require any of these assumptions.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML). A manifest file (such as manifest file 66) may, in some examples, map identifiers for various representations (e.g., representations 68) to corresponding resource locations. That is, the manifest file may include information indicating where representations (or parts thereof) can be obtained. In some examples, the resource locations may be uniform resource locators (URLs), uniform resource identifiers (URIs), and/or other location identifiers. For example, a manifest file may include data defining URLs for segments of various representations.

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described by Fielding et al., "Hypertext Transfer Protocol—HTTP/1.1," Internet Engineering Task Force (IETF), RFC 2616, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In this manner, client device 40 represents an example of a device for retrieving media data, the device including means for receiving an indication of whether the media data of the content service is to be received via a first service or a second service, in accordance with one or more aspects of the present disclosure. When the indication indicates that the media data is to be received via the first service, client device 40 may disable a unit for receiving data via the second service and receive the media data via the first service. Alternatively, when the indication indicates that the media data is to be received via the second service, client device 40 may activate the unit for receiving data via the second service and receive the media data from the unit for receiving the data via the second service. The unit for receiving data via the second service may receive the media data via a broadcast or multicast delivery mode.

In other words, the techniques of this disclosure are directed to mediating content delivery via unicast and broadcast transport. That is, the present disclosure provides various techniques for activating MBMS middleware when a non-MBMS unicast service is converted to an MBMS user service by a network. In various examples, this disclosure includes both UE based solutions and network based solutions that include a mediating layer to trigger a client (e.g., an eMBMS client) to switch between receiving data from a unicast and broadcast (or multicast) service, and potentially receiving the data via unicast and broadcast (or multicast) delivery modes of a broadcast (or multicast) service. In one example UE based solution, the MBMS middleware is activated when any application is on. The UE can be preconfigured with the applications which potentially can be switched to the broadcast content to avoid triggering MBMS middleware for all applications. In example network based solutions, the MBMS middleware is activated upon the UE receiving some "indication" or "triggering" from the network. In some examples, if a device of the network has information about the capabilities of various UEs, the device (e.g., a BM-SC in the network) may determine whether the UEs that are receiving data from a unicast service are MooD-capable (e.g., are capable of switching to receiving the data via an MBMS User Service). For instance, a device of the network (e.g., an OMA-DM server) may send MooD configuration data to MooD-capable UEs while ensuring that non-MooD-capable UEs will not use the proxy server specified in the MooD configuration. MooD configuration is further described in S4-140327, "MI-MooD: MBMS Service Configuration", Qualcomm contribution to SA4 #78, the entire content of which is incorporated herein by reference.

The indication can be a triggering for the UE to receive a USD, and subsequently to receive data on the MBMS bearer, or it can be the USD itself. In some examples, a device of the network (e.g., a BM-SC) may send a USD or an updated USD (e.g., should other MBMS services already be in use) by announcing the new MBMS user service and its availability over broadcast and/or unicast delivery. The USD or updated USD may, in some examples, make use of the r12:broadcastAppService and/or the r12:unicastAppService elements under the deliveryMethod child element of the userServiceDescription element in order to identify whether the content is carried over a broadcast and/or a unicast transport. In some examples, existing mechanisms (e.g., as found in section 7.6 of 3GPP TS 26.346: "Multimedia Broadcast/Multicast Service (MBMS); Protocols and codecs") defined for supporting unicast fallback and mobility-based transport switching of application service access may also be applicable to MooD operations.

In some examples, the USD or updated USD may make use of the r12:appService child element of the userServiceDescription element for providing the identities of identical and alternative versions of an application service content item which can be substituted for one another, in accordance with MooD operation or network policy requirements (e.g., a requirement that only broadcast reception of content is allowed when the UE is redirected to broadcast reception and the UE is within MBMS coverage "). A unified MPD (e.g., via a corresponding Media Presentation Description fragment) that describes both broadcast and unicast representations may be included in an updated USD to enable a UE to associate the service being received through unicast with the MBMS user service.

In some examples, if the BM-SC has already established a file delivery over unidirectional transport (FLUTE) session for USD delivery, the BM-SC can send the USD (or updated USD) over that broadcast channel. Otherwise, the BM-SC can establish a FLUTE session for sending the USD or updated USD using the existing MBMS session establishment procedure. FLUTE is described in T. Paila et al., "FLUTE—File Delivery over Unidirectional Transport," IETF, RFC 6726, November 2012.

Upon having prepared the USD/updated USD for the newly-established MBMS user service, a device of the network (e.g., a BM-SC) may send a redirection/trigger message to the UE to redirect the UE to switch from unicast to broadcast reception. As a first example, a device of the network may send an indication along with the content provided in an HTTP response to trigger UE access to the USD/updated USD over a unicast or MBMS bearer. For instance, in response to a request for content, a device of the network may send an HTTP 200 OK message with a 3GPP Extension Header that contains an indication for triggering UE reception of the USD/USD-update. That is, the HTTP 200 OK message may include the content that the UE has requested as well as the redirection. As another example, in response to the request for content, a device of the network may send an HTTP 3xx Redirect message with a 3GPP Extension Header which prompts the UE to initiate reception of the USD/updated USD. The redirection URL included in the HTTP 3xx redirect message may represent a different location for the same requested resource. For example, if the original request URL was http://example.com/per-x/rep-y/seg-z.3gp, the redirection URL might be http://example.com/redirect/per-x/rep-y/seg-z.3gp. The 3GPP-defined HTTP extension header might be named "Trigger-MBMS" with the value "Get-USD." Consequently, the HTTP response message to the content request by the UE with 3xx status code may be accompanied by the response header: "Trigger-MBMS: Get-USD."

In order for a UE to differentiate between a regular redirection message (e.g., an HTTP redirection status code or RTSP redirection request) and an MBMS offloading request, a new header field (e.g., a MooD header field) may be used. The MooD header field may apply to both RTSP and HTTP redirections. If the UE detects the presence of the MooD header, it may determine that the redirection is an indication to activate the MBMS client. If the MBMS client is already activated or operational, the UE may determine that the redirection represents an implicit notification that updated USD fragments should be acquired. The MooD header field may include a URL indicating the location of a MBMS USBD fragment that serves as the entry point to the dynamically-established MBMS service. An example set of precedence rules for UE acquisition of USD fragments resulting from the receipt of the MooD header are given below, in decreasing order of priority:

1. If the URL is present in the MooD header, the MBMS client may use the URL to retrieve the USBD fragment over unicast.
2. If the URL to the USBD fragment is not present in the MooD header, but the URL to USD information, (e.g., /<X>/USDLocation/URL) is present in the MO, the MBMS client may use the URL to retrieve USD fragments over unicast.

During the interim period beginning from when the MBMS client starts to acquire the USD fragments until it has received contents of the on-demand MBMS service over the MBMS bearer, the UE may continue to request content via the unicast network, to avoid service disruption or a "break before make" switch from unicast to broadcast content reception. Upon readiness of the MBMS middleware client to supply content received over MBMS delivery to the application client, a switch in reception mode from unicast to broadcast may occur.

In some examples, a MooD header field may be used by a UE to indicate its current location to a MooD proxy server, if requested to do so by the information in the MO. In such instance, the UE's current location may be formatted according to the "LocationType" value as described in FIG. 21 below. The Augmented Backus-Naur Form (ABNF) syntax for the MooD header field is defined as follows: MooD="3gpp-mbms-offloading" [":" (absoluteURI|relativeURI|currentLocation)].

As a second example of a redirection/trigger message to redirect the UE to switch from unicast to broadcast reception, a device of the network may send the USD/updated USD together with the content provided in an HTTP response to the UE by encapsulating the requested content (e.g., Segments) and USD/updated USD in a multipart MIME container. As a third example, a device of the network may use an OMA Push mechanism (e.g., as found in Section 7.4 of 3GPP TS 26.346: "Multimedia Broadcast/Multicast Service (MBMS); Protocols and codecs") or other Push mechanism to send the USD/updated USD to a UE over a unicast channel. While the UE is acquiring a new USD or updated USD via either unicast or broadcast transport, the UE may continue using the unicast channel to fetch content. Once the UE can fully receive the content from the MBMS bearer, the unicast channel can be released.

Various triggering methods may be used to effectuate a network based solution for activating MBMS middleware of a UE. In a first alternative, an application of a UE may get some information and then the application may register with MBMS middleware of the UE. In a second alternative, an HTTP proxy or RTP proxy of the UE may get some redirection which provides an indication to the MBMS middleware. In a third alternative, some push mechanism, such as SMS, WAP push, OMA-DM, etc. may directly wake up the MBMS middleware. For example, the push mechanism may specify a new APP port ID (e.g., a new UDP port) for SMS used for MBMS triggering. When the SMS layer receives the trigger with the newly specified APP port ID, it is passed to the MBMS middleware. In another example, an OMA-DM server sends a management initiation message to the UEs to start up the MBMS middleware. In a fourth alternative, a network may use air interface signaling such as system information block (SIB) broadcasts, cell broadcasting, MBMS control information validity and change (MCCH) change notifications, USD change notifications, or other signaling methods. In a fifth alternative, the network may use packet gateway signaling, such as non access stratum (NAS) signaling, protocol configuration options (PCOs) or other signaling methods. Various other alternatives may be used in accordance with one or more techniques of the present disclosure.

Figure 2:
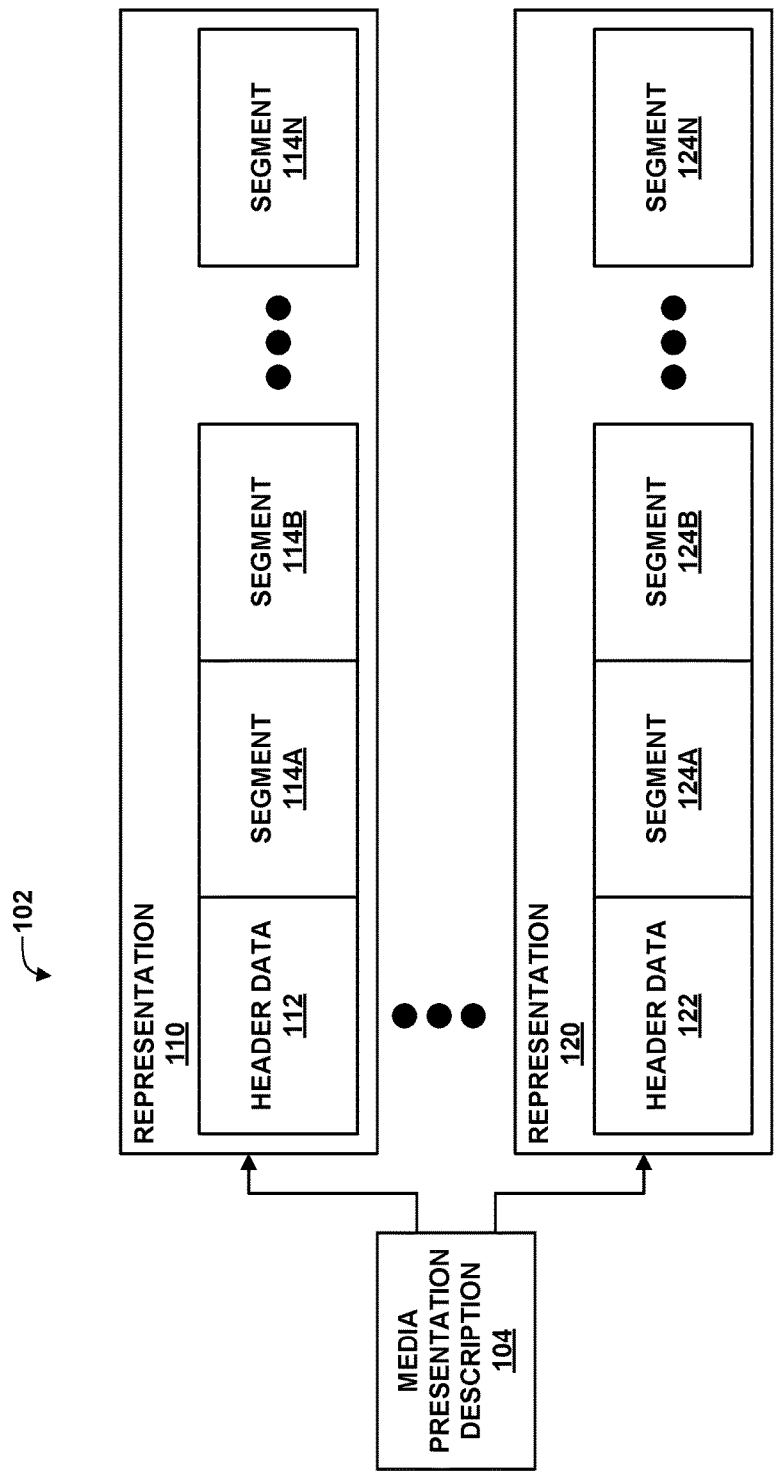
FIG. 2 is a conceptual diagram illustrating elements of example multimedia content.

FIG. 2 is a conceptual diagram illustrating elements of example multimedia content 102. Multimedia content 102 may be included in a streaming service for which the content is consumed as it is received, or a download delivery service for which the content is downloaded and stored for later consumption. That is, multimedia content 102 may represent any data accessible by one or more UEs for real-time or non-real-time rendering. In the example of FIG. 2, multimedia content 102 includes media presentation description (MPD) 104 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 104 may comprise a data structure separate from representations 110-120. MPD 104 may correspond to manifest file 66 of FIG. 1. Likewise, representations 110-120 may correspond to representations 68 of FIG. 1. In general, MPD 104 may include data that generally describes characteristics of representations 110-120, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 112, when present, may describe characteristics of segments 114, e.g., temporal locations of random access points (RAPs, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 2. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

An MPD may describe how to retrieve unicast content, multicast content, broadcast content, or some combination thereof. That is, the MPD may provide information to one or more components of a UE (e.g., a streaming client) to allow the UE to access the content via one or more delivery modes. In some examples, part or all of an MPD may be modified, thereby changing the instructions a streaming client may receive. For instance, a URL for retrieving media data included in the MPD may need to be changed to instruct a streaming client to obtain the media data from a new location. In some examples, to cause the streaming client to obtain the media data from the new location, a base portion of the URL may be modified. The base portion of the URL may be changed to direct the streaming client to a different network address, or to a local address. That is, in some examples, the base portion of a modified URL may cause a streaming client (such as that of client device 40) to retrieve media data from one or more components within client device 40 itself. In this way, a streaming client may retrieve media data from other components of a UE, such as an MBMS middleware unit, instead of from a content server on the network.

Various techniques to transition retrieval of media data from one service to another are described herein. Such techniques may be employed in accordance with a service provider network initiating or ceasing provision of the different services. As one use case example, a service provider network may enable demand-based eMBMS for Real-Time (RT) content. For instance, a sports/news content provider may make its online multimedia sports programming and news service available over the Internet (a.k.a. an "Over-the-Top" or OTT service). LTE unicast access to the service may be offered in a particular country by a mobile network operator. For any number of reasons, live coverage of a particular sporting event provided by the sports/news content provider may become wildly popular in the country. That is, a large number of users in the country may access the sports/news content provider's site (e.g., via smartphones) to follow the live coverage. The mobile network operator, which also provides eMBMS services, may incur a high and sustained level of traffic on its LTE unicast network to/from the sports/news content provider's site, due to the increased popularity.

Such high traffic volume may not only stresses the capacity of the service provider's unicast network, but it may also impair the overall user experience due to more frequent stalls during content reception (which may also be of concern to the sports/news content provider). In accordance with the techniques described herein, the mobile network operator network may be capable of detecting a dynamic OTT traffic increase over its unicast network to any external site, and may have the means to dynamically provision an eMBMS service for unicast traffic offloading. In some examples, the mobile network operator may have a business agreement with the content provider to configure demand-based eMBMS service as necessary.

As a second use case example, the service provider network may enable demanded-based eMBMS for non-real-time (NRT) content. For instance, the aforementioned sports/news content provider may also publish RSS ("RDF Site Summary" or "Really Simple Syndication") feeds (a.k.a. "podcasts") covering different categories of sports news, interviews, highlights, etc. Due to recent popularity, subscriptions to the podcasts may increase dramatically. It may be more efficient for such RSS content delivery over the unicast network of the service provider to be delivered over a broadcast or an eMBMS bearer. In some examples, the content provider may have a relationship with the service provider that may allow the subscription events to the various RSS feeds offered by the content provider to be measured and shared with the service provider. In some examples, upon reaching a certain threshold for a given RSS feed, the service provider may dynamically provision an eMBMS download delivery service to deliver the RSS content according to a broadcast schedule.

As a third use case example, the service provider network may enable demand-based deactivation of eMBMS services. For instance, sports fans in the country may start to lose interest in the sports/news content provider's content. Significant drop-off is detected in user access to the sports/news content provider's site over the recently provisioned eMBMS service. The service provider may determine that it is no longer beneficial, for overall network utilization, to maintain a dedicated eMBMS broadcast of the sports/news content provider's service. In accordance with business terms formerly agreed upon with the content provider, the service provider may deactivate the eMBMS service. In some examples, the associated network capacity may be re-allocated for carriage of unicast traffic.

As a fourth use case example, a service network operator may control eMBMS operation on Demand, thereby providing live streaming service support. For instance, in a shopping mall or other area, many users may be watching a first live program using the DASH protocol. The service network cell which covers the shopping mall may be highly congested. New users arriving at the shopping mall may have a hard time accessing content using the service network. In this example, many of the UEs accessing the DASH streaming content may be eMBMS capable. The congestion situation may come to the attention of the network operator. In order to alleviate the congestion, one or more devices of the network may communicate with the UEs to cause the UEs to begin receiving the DASH streaming content over an MBMS bearer. That is, the network may broadcast the live streaming content over an MBMS bearer, the MBMS user service subscription is activated, and, and, per instructions received from the network, eMBMS capable UEs may switch to the eMBMS system, thereby mitigating congestion in the cell.

In some examples, while the first live program is ongoing, a number of users may cease viewing the program. Additionally, a second live program may increase in popularity within the cell. The cell may once again become congested. In such instance, a device of the network may determine that the number of viewers for the first live program is less than the number of viewers of the second live program. Based on this determination, a device of the network may terminate the MBMS bearer for the first live program and instead broadcast the second live program over the MBMS bearer. In accordance with the techniques described herein, those UEs obtaining the first live program may quit the MBMS user service and thereafter obtain the first live program over DASH. The viewers of the second live program, on the other hand, may subscribe to the broadcast service and begin receiving the second live program over the MBMS bearer.

As a fifth use case example, a service provider may enable efficient access to aggregated content. For instance, a content provider may provide a service with many live television channels based on DASH. In other words, the content provider may act as an aggregator for other content producers and content consumers. The TV channels may include a large number of services of personalized reporters, local news, and/or other small production feeds. In this use case example, channels of the service may be shared through social networks and, occasionally, such channels may become popular only to eventually decrease again. Due to various factors, shifts in popularity may happen relatively gradually and may differ from region to region. The service provider may want to ensure that, in these high-demand cases, all MBMS-capable devices can consume qualifying services with high-quality and without disturbing the user experience (e.g., seamless service, availability of time-shift buffering, additional views and components of the channel, and other features). That is, the service provider wants to deliver such popular content in a radio efficient manner.

Figure 3:
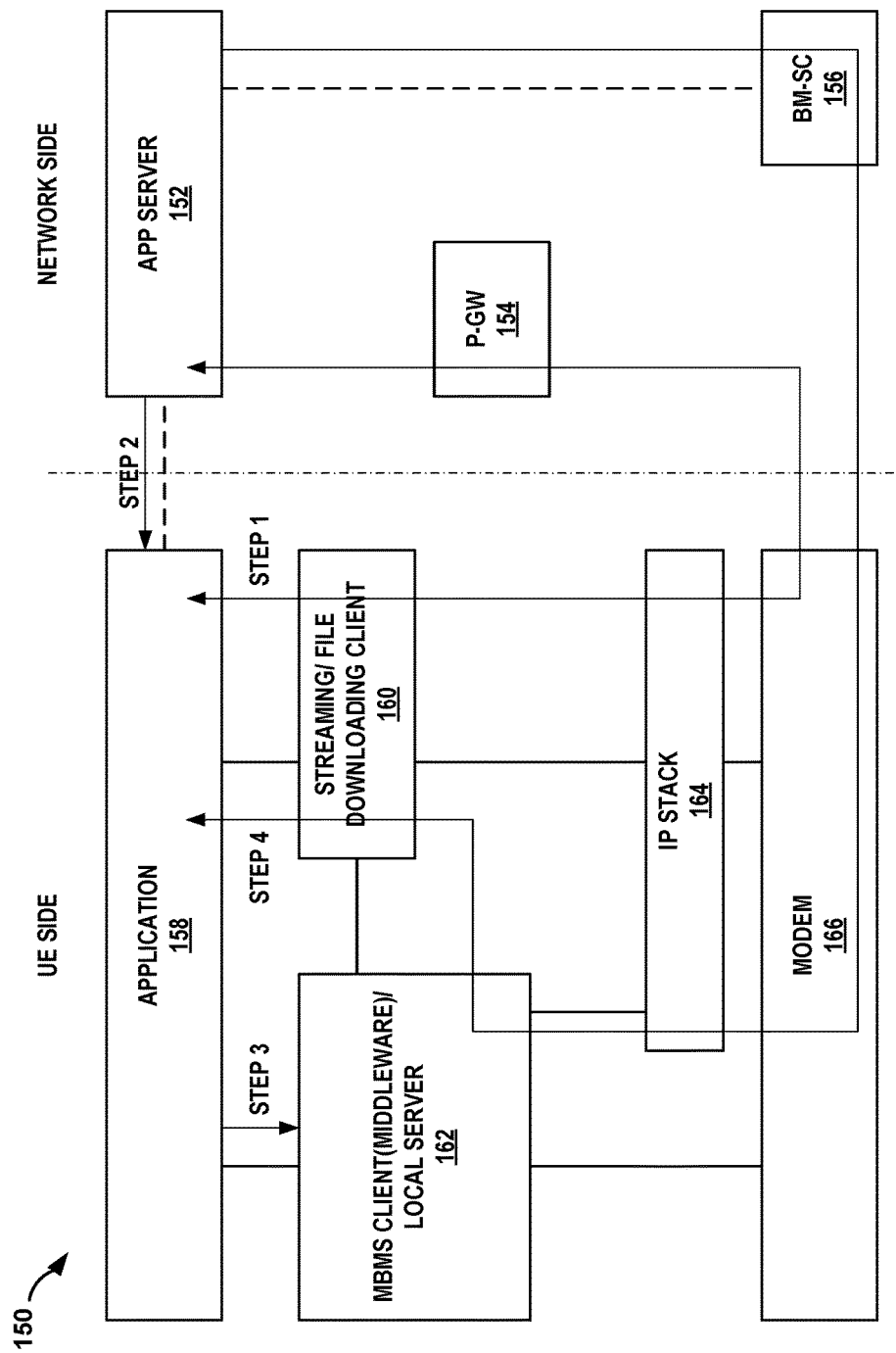
FIG. 3 is a conceptual diagram illustrating an example system that implements techniques for obtaining data selectively using one or more services.

FIG. 3 is a conceptual diagram illustrating an example system 150 that implements techniques for obtaining data (e.g., pertaining to a streaming service or a file download service) selectively using one or more services. As shown in the example of FIG. 3, system 150 includes a UE side and a network side. Components located on the UE side of FIG. 3 may, in some examples, represent components of client device 40 as described in FIG. 1. Components located on the network side may, in some examples, represent components of content preparation device 20, server device 60, and/or network 74 (which are not necessarily shown in FIG. 1). In other examples, components on the UE side may not be included in a client device, and may instead be a part of network 74.

In the example of FIG. 3, the network side of system 150 includes application server ("app server") 152, packet data network gateway (P-GW) 154, and broadcast and multicast service center (BM-SC) 156. Each of application server 152, P-GW 154, and BM-SC 156 may include hardware, firmware, software, or any combination thereof. Application server 152 may, in some examples, have the same or similar functionality to one or more components of server device 60. That is, application server 152 may be operable to receive requests for data, and provide the requested data. P-GW 154 may provide connectivity for UEs to external packet data networks by being the point of exit and entry of traffic for the UE. In some examples, multiple P-GWs may be used to provide UEs with simultaneous connectivity to more than one packet data network. P-GWs, in various examples, may perform policy enforcement, packet filtering, charging support, packet screening, or various other activities. For instance, in the example of FIG. 3, P-GW may provide UE components with access to application server 152 for obtaining content. BM-SC 156 may, in some examples, have functionality the same as or similar to that of processing unit 70. That is, BM-SC 156 may be configured to deliver data to UEs via a broadcast or multicast protocol, such as MBMS or eMBMS. BM-SC 156 may receive data from application server 152 and broadcast the data for use by one or more UEs.

The UE side of system 150, as shown in the example of FIG. 3, includes application 158, streaming/file downloading client 160, MBMS unit ("MBMS client (middleware)/local server") 162, IP stack 164, and modem 166. Application 158 may represent any application capable of receiving data. In some examples, application 158 may be capable of receiving streaming media data and outputting audio, video, or text for presentation to a user. For instance, application 158 may be a media player, a web browser, or other application. In some examples, application 158 may consume the media content in real time as the content is delivered or accessed by a streaming service or streaming client. In some examples, application 158 may engage in time-shifted consumption of content delivered or accessed by a file delivery service or file downloading client. Streaming/file downloading client 160 may be hardware, firmware, software, or some combination thereof operable to perform any or all of the functions described herein. In some examples streaming/file downloading client 160 may perform operations similar to those performed by retrieval unit 52. For instance, streaming/file downloading client 160 may be operable to receive a request for streaming media data from application 158, and provide application 158 with video data, audio data, and/or text data for presentation to a user. Streaming/file downloading client 160 may comprise, for example, a DASH client, an RTP/RTSP client, an FTP client, an HTTP client, or other client configured to receive streaming service data or file delivery service data via a computer network.

MBMS unit 162 may represent any unit operable to receive data via broadcast or multicast services (including broadcast and multicast delivery modes) and store the data for access by one or more other components. For instance, MBMS unit 162 may operate in accordance with various broadcast or multicast network protocols, such as MBMS, eMBMS or IP multicast. When broadcast or multicast services are available for particular content, MBMS unit 162 may submit a request to join a multicast network group associated with the particular content and thereafter receive data of the multicast group without necessarily having to issue any further requests. In the example of FIG. 3, MBMS unit 162 may be enabled by receiving an indication from application 158. The indication may signify that application 158 is requesting data for which a broadcast service or multicast is available. In some examples, when MBMS unit 162 has received at least a portion of the particular content, MBMS unit 162 may communicate with streaming/file downloading client 160 to cause streaming/file downloading client 160 to obtain streaming service data or file delivery service data from the MBMS middleware. That is, MBMS unit 162 may act as both an MBMS client as well as a local server for the received data.

In the example of FIG. 3, MBMS unit 162 may include functionality to communicate with streaming/file downloading client 160, such as via an API. MBMS unit 162 and streaming/file downloading client 160 may be operable to exchange various information via one or more APIs, such as an MPD/SDP URL (or a mechanism to notify the eMBMS layer of MPD for presentation being accessed), MBMS triggering information (or a mechanism to cause/trigger the eMBMS layer to check for user service description (USD) updates), and/or redirect configurations. For instance, an API between an MBMS client and a streaming/file downloading client may be used for exchanging information to send a manifest file for data or to cause streaming/file downloading client 160 to configure its settings (e.g., to change from accessing content on application server 152 to accessing content on MBMS unit 162).

In the example of FIG. 3, streaming/file downloading client 160 and MBMS unit 162 may communicate with the network side of system 150 via IP stack 164 and modem 166. In various examples, IP stack 164 represents any layered protocol suite usable for network communication, such as the Internet Protocol suite or other protocol suites. Modem 166 represents any unit capable of transmitting data across a physical medium, such as via cables, optical fibers, or by using electromagnetic waves.

In Step 1 of the example of FIG. 3, application 158 gets data from application server 152 through a unicast service (e.g., using a unicast delivery mode). That is, the UE may initially receive data using a first service. In Step 2 of the example of FIG. 3, a high attach rate detection (HARD) unit in the network (not shown) detects a high attach rate. For instance, the HARD may determine that a threshold number of UEs are accessing server 152 for the particular content. The HARD unit indicates the high attach rate to BM-SC 156, which enables an MBMS session (e.g., an MBMS bearer). BM-SC 156 may indicate the MBMS session to application server 152 and application server 152 may indicate the MBMS session availability to application 158 in the UE side of system 150. In this way, the network side of system 150 may indicate the availability of a second service (e.g., an MBMS bearer or other multicast or broadcast service) to application 158 of the UE. The second service may be available using a broadcast or multicast delivery mode as well as using a unicast delivery mode.

In Step 3 of the example of FIG. 3, when application 158 receives the indication that the MBMS service is available, application 158 registers with the MBMS middleware (e.g., MBMS unit 162). MBMS unit 162 may communicate with streaming/file downloading client 160 (e.g., via an API) to cause streaming/file downloading client 160 to obtain streaming service data or file delivery service data from the MBMS middleware. That is, in accordance with one or more techniques of the present disclosure, during receipt of data via a first service (e.g., unicast service), application 158 gets some information (e.g., the indication) and then application 158 registers with MBMS middleware.

In Step 4 of the example of FIG. 3, application 158 gets data from the MBMS bearer (e.g., BM-SC 156) using the broadcast or multicast service. In other words, when the UE receives an indication that the data is to be received via the second service, the UE may activate a unit for receiving data via the second service (e.g., MBMS unit 162) and receive the data from the unit for receiving the data via the second service. MBMS unit 162 may obtain the data via a broadcast delivery mode or a multicast delivery mode. This approach of FIG. 3 may be more suitable for file downloading, such as firmware over the air (FOTA) technology, podcasting, etc. In the example of FIG. 3, application 158 is not transport agnostic. That is, application 158 must receive the indication and register with the MBMS middleware to enable the receipt of data via broadcast or multicast services.

Figure 4:
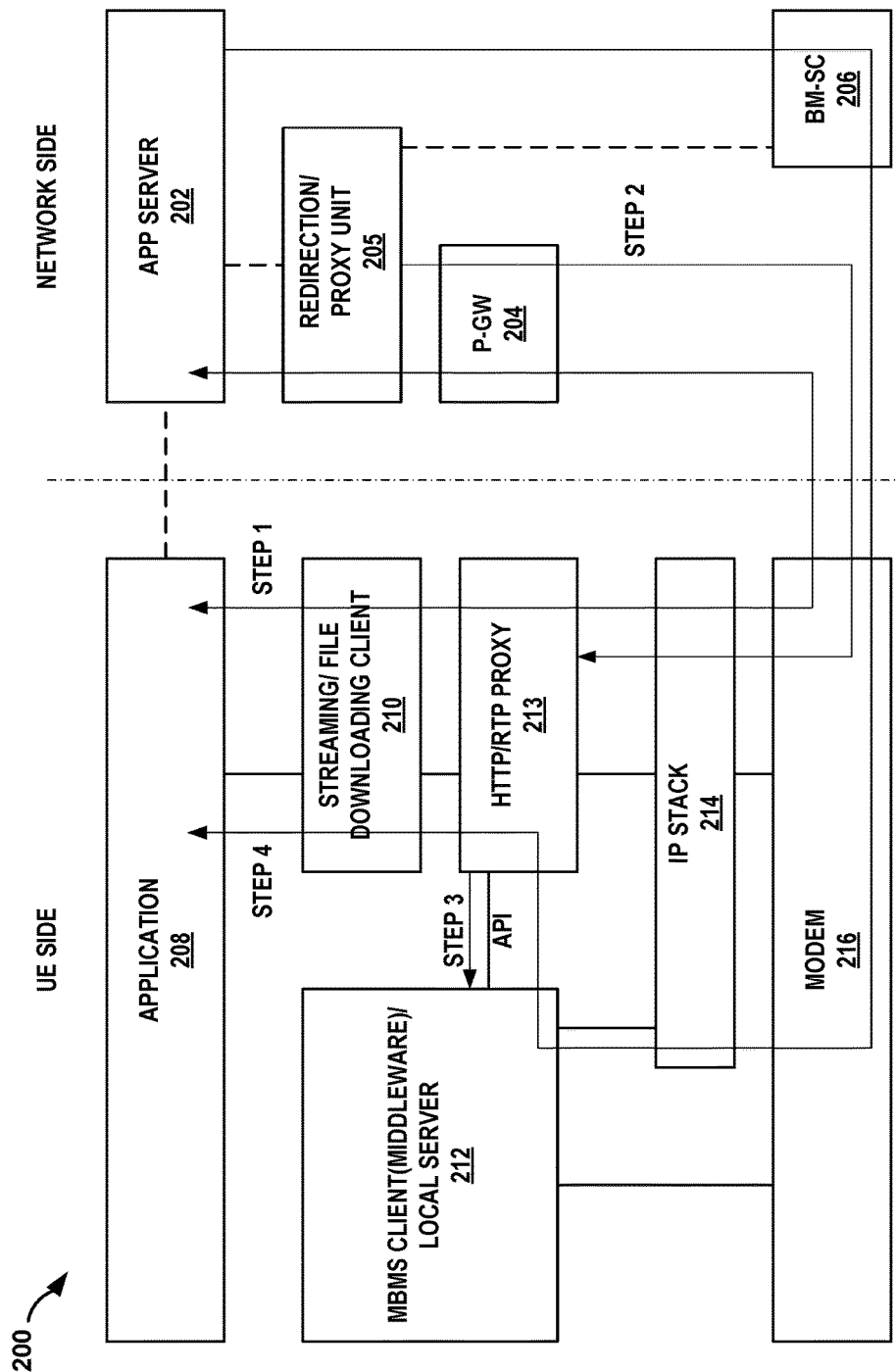
FIG. 4 is a conceptual diagram illustrating an example system that implements techniques for obtaining data selectively using one or more services.

FIG. 4 is a conceptual diagram illustrating an example system 200 that implements techniques for obtaining data selectively using one or more services. In the example of FIG. 4, system 200 includes UE side and network side. The network side of system 200 includes application server ("app server") 202, P-GW 204, redirection/proxy unit 205, and BM-SC 206. Application server ("app server") 202, P-GW 204, and BM-SC 206 may include functionality that is the same as or similar to that of application server 152, P-GW 154, and BM-SC 156 of FIG. 3, respectively. Redirection/proxy unit 205 may represent hardware, firmware, software, or some combination thereof for receiving requests, such as HTTP GET requests or RTP messages, and directing the requests to one or more sources based on instructions. For instance, redirection/proxy unit 205 may be operable to receive a request for data from a UE, and forward the request to application server 202.

In the example of FIG. 4, the UE side of system 200 includes application 208, streaming/file downloading client 210, MBMS unit ("MBMS client (middleware)/local server") 212, proxy unit ("HTTP/RTP proxy") 213, IP stack 214, and modem 216. Application 208, IP stack 214, and modem 216 may include functionality that is the same as or similar to that of application 158, IP stack 164, and modem 166 of FIG. 3, respectively. In some examples, streaming/file downloading client 210 may include functionality that is the same or similar to that of streaming/file downloading client 160 of FIG. 3. In other examples, streaming/file downloading client 210 may include different or additional functionality. In some examples, streaming/file downloading client 210 may be a collection of components, capable of processing data encoded using various formats (e.g., a DASH client and an RTP client). MBMS unit 212 may include functionality that is the same or similar to that of MBMS unit 162 of FIG. 3. In the example of FIG. 4, MBMS unit 212 may include different or additional functionality.

In the example of FIG. 4, MBMS unit 212 may also include functionality to communicate with proxy unit 213, such as via an API. MBMS unit 212 and proxy unit 213 may be operable to exchange various information via one or more APIs, such as an MPD/SDP URL (or a mechanism to notify the eMBMS layer of MPD for presentation being accessed), MBMS triggering information (or a mechanism to cause/trigger the eMBMS layer to check for user service description (USD) updates), and/or redirect configurations. For instance, an API between an MBMS client and a local proxy may be used for exchanging information to enable MBMS unit 212 to start receiving data, to send a manifest file for streaming service data or file delivery service data, and/or to cause proxy unit 213 to configure its redirection settings (e.g., to change from accessing content on application server 202 to accessing content on MBMS unit 212).

Proxy unit 213 may include functionality to receive requests (e.g., requests for data) and forward the requests to the appropriate destination. Proxy unit 213 may also include functionality to modify the received requests (e.g., a URL included in the request) to conform to redirection instructions. For example, proxy unit 213 may be operable to modify network addresses such that streaming/file downloading client 210 receives data from MBMS unit 212 (e.g., from a broadcast or multicast service) instead of from application server 202 (e.g., from a unicast service). Thereafter, MBMS unit 212 may receive data from the broadcast service over a broadcast delivery mode, if available.

In Step 1 of the example of FIG. 4, application 208 gets data from application server 202 through a unicast service. That is, the UE may initially receive data using a first service. Redirection/proxy unit 205 may be on the path of unicast user traffic. That is, unicast traffic between application server 202 and the UE side may flow through redirection/proxy unit 205. In Step 2 of the example of FIG. 4, a HARD unit in the network (not shown) detects a high attach rate. In various examples, the HARD unit may be a part of application server 202, redirection/proxy unit 205, P-GW 204, or other network entity. The HARD unit indicates the high attach rate to BM-SC 206 to enable an MBMS session (e.g., an MBMS bearer). BM-SC 206 requests redirection/proxy unit 205 (can be in user plane or in control pane) to redirect the UE to go to the local server. Redirection/proxy unit 205 may send the indication to the UE, for example, using an HTTP redirect or success message or an RTSP redirect or success message. As one example, an HTTP or RTSP redirect message may correspond to a 3xx redirect (e.g., 300 or 303-type HTTP response). The redirect may be sent with or without a header extension. An HTTP or RTSP success message may correspond to a 2xx success (e.g., 200-type HTTP response) that includes a header extension. In this way, the network side of system 200 may indicate the availability of a second service (e.g., an MBMS bearer or other multicast or broadcast service) to proxy unit 213 of the UE.

In Step 3 of the example of FIG. 4, when proxy unit 213 receives the indication (e.g., the redirection or success message), proxy unit 213 (e.g., the HTTP/RTP proxy) registers with the MBMS middleware (e.g., MBMS unit 212). That is, in accordance with one or more techniques of the present disclosure, the HTTP proxy (or RTP proxy) gets some indication, then activates the MBMS middleware.

In Step 4 of the example of FIG. 4, application 208 gets data from the MBMS bearer (e.g., BM-SC 206) by obtaining data indirectly from MBMS unit 212 that the MBMS unit 212 obtained using the broadcast or multicast service (e.g., via a broadcast or multicast delivery mode). In other words, when the UE receives an indication that the data is to be received via the second service, the UE may activate a unit for receiving data via the second service (e.g., MBMS unit 212) and receive the data from the unit for receiving the data via the second service. The data received via the second service may then be provided indirectly (e.g., via proxy unit 213 and streaming/file downloading client 210) to the application 208. In some examples, an HTTP interface between streaming/file downloading client 210 and a local proxy (e.g., proxy unit 213) is operable to enable an application request for content delivered over MBMS to be retrieved from a local HTTP server. The approach of FIG. 4 may be more suitable to streaming services, such as breaking news. In the example of FIG. 4, application 208 is transport agnostic. That is, application 208 need not have any indication of how the data is obtained. Rather, proxy unit 213 may automatically update routing information and send requests for data to MBMS unit 212 instead of to application server 202.

FIGS. 5A-5D are conceptual diagrams illustrating example operations for obtaining streaming media data selectively using one or more services. The example operations of FIGS. 5A-5D are described below within the general context of system 200 of FIG. 4. In the example of FIGS. 5A-5D, streaming/file downloading client 210 may be a DASH client, redirection/proxy unit 205 may be a Proxy/Redirector, MBMS unit 212 may be an MBMS client and a local HTTP server, proxy unit 213 may be an HTTP proxy, and application server 202 may be an HTTP server capable of providing DASH media content.

Figure 5A:
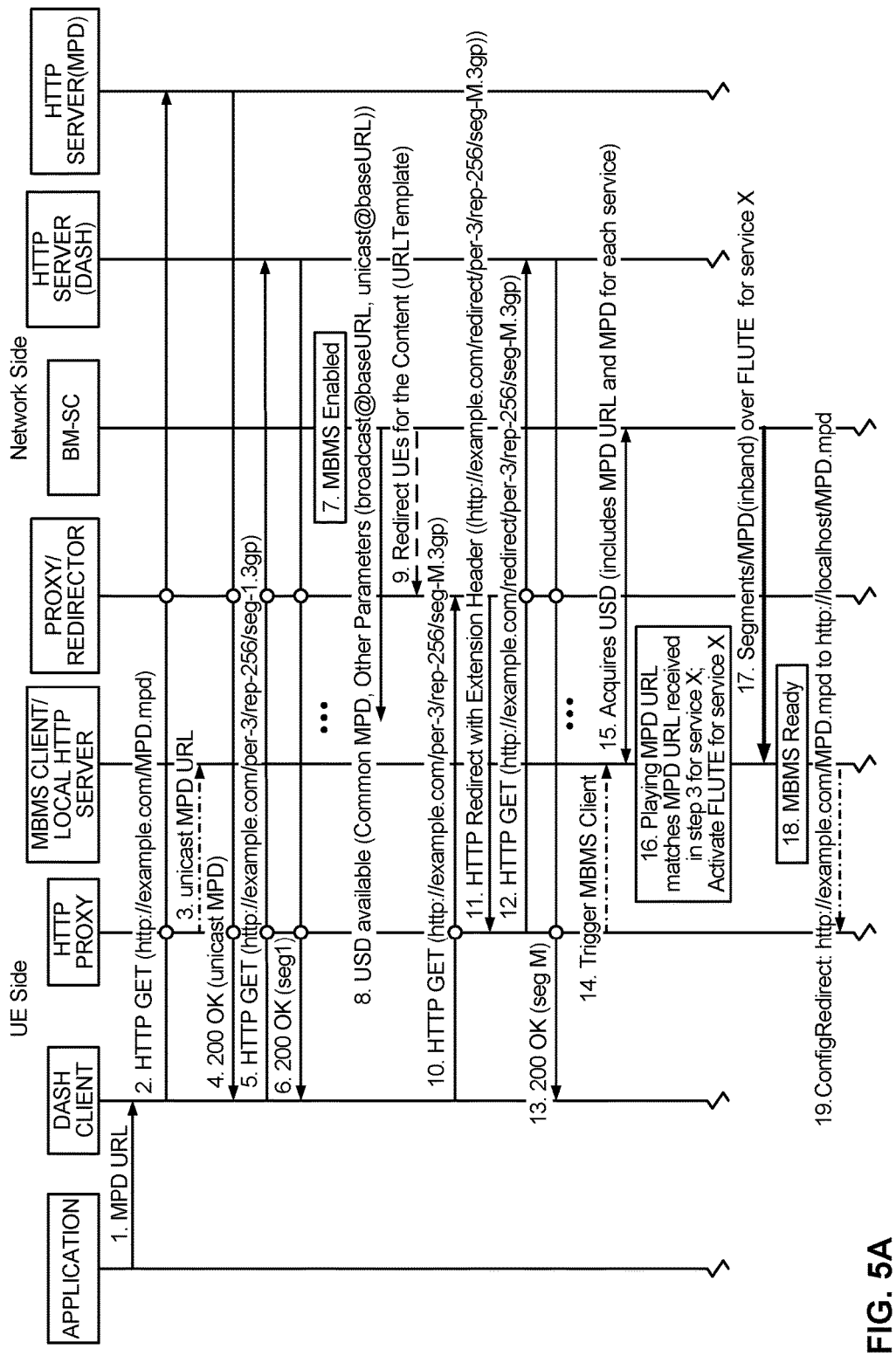
FIGS. 5A-5D are conceptual diagrams illustrating example operations for obtaining streaming media data selectively using one or more services.

In accordance with one or more techniques of the present disclosure, application 208 may obtain media data using streaming/file downloading client 210 (e.g., using the DASH protocol). For instance, application 208 may send streaming/file downloading client 210 a URL indicating a location of a manifest file (e.g., an MPD) that, in turn, defines one or more resource locations for retrieving media data according to a first service (e.g., unicast). Streaming/file downloading client 210 may obtain the MPD by sending an HTTP GET request to proxy unit 213. Proxy unit 213 may receive the HTTP GET request, and direct the request to application server 202 via IP stack 214, modem 216, P-GW 204, and redirection/proxy unit 205. In the example of FIG. 5A, proxy unit 213 may also send an indication of the MPD URL to MBMS unit 212 (e.g., by calling an API).

In some examples, the UE may indicate that it is eMBMS capable when it does an initial MPD fetch. In this way, the UE may enable the network to know how many eMBMS capable devices are in the area. Indicating eMBMS capability also allows the network to track future transactions from the UE's address. In some examples, the UE may also indicate its location when it does the initial MPD fetch.

Application server 202 may receive the HTTP GET request, and send a 200-type HTTP OK message in response, which proxy unit 213 may receive and send to streaming/file downloading client 210. The OK message may include the unicast MPD. Streaming/file downloading client 210 may receive the MPD and determine a representation, a period, and a segment of media data to obtain (e.g., Period 3, Representation 256, Segment 1). Based at least in part on the MPD, streaming/file downloading client 210 may look up a URL for the determined segment and send an HTTP GET request with the determined URL (e.g., "http://example.com/per-3/rep-256/seg-1.3gp"), which proxy unit 213 may receive and send to application server 202 via redirection/proxy unit 205. Application server 202 may receive the GET request and, in response, may send a 200-type HTTP OK message including the requested media data (e.g., "seg1"), which proxy unit 213 may receive via redirection/proxy unit 205 and may send to streaming/file downloading client 210. In this way, streaming/file downloading client 210 may obtain streaming media data from application server 202 using a unicast service.

On the network side, BM-SC 206 may enable MBMS (e.g., a broadcast) service and initiate an MBMS bearer. BM-SC 206 may broadcast a user service description (USD) that includes a common MPD and/or other parameters. For instance, the common MPD may include a base portion of a URL that corresponds to the broadcast delivery mode for a service as well as a base portion of a URL that corresponds to a unicast delivery mode for the service. BM-SC 206 may also send an indication to redirection/proxy unit 205 that media data is to be received via an MBMS service for the particular media content.

Streaming/file downloading client 210 may continue sending HTTP GET requests for media data, such as a request for segment M, including the corresponding URL from the original MPD (e.g., "http://example.com/per-3/rep-256/seg-M.3gp"). When redirection/proxy unit 205 receives the GET request for segment M, redirection/proxy unit 205 may send, in the example of FIG. 5A, a 3xx-type HTTP redirection message to the UE. The redirection message may include an extension header, including a redirection URL (e.g., "http://example.com/redirect/per-3/rep-256/seg-M.3gp") to indicate to local proxy unit 213 to register with MBMS unit 212. That is, the redirection URL may represent a different location for the same requested resource. For instance, if the original request URL is http://example.com/per-x/rep-y/seg-z.3gp, the redirection URL might be http://example.com/redirect/per-x/rep-y/seg-z.3gp. The 3GPP-defined HTTP extension header might be named "Trigger-MBMS" with the value "Get-USD," in which case the HTTP response message to the content request by the UE may be accompanied by the response header, "Trigger-MBMS: Get USD."

In some examples, redirection/proxy unit 205 may alternatively use 3xx-type HTTP redirection message with entity body that includes a redirection URL and an indication to local proxy unit 213 to cause proxy unit 213 to register with MBMS unit 212. That is, the redirection message may include an entity (e.g., as defined by HTTP) consisting of an entity header and/or an entity body. In some examples, redirection/proxy unit 205 may alternatively send an indication along with the content provided in an HTTP response. The indication may trigger UE access to the USD or USD update over a unicast or MBMS bearer. For instance, redirection/proxy unit 205 may send a 200-type HTTP OK message with a 3GPP Extension Header containing an indication that may trigger the UE to obtain/receive the USD or USD update. That is, the 200-type HTTP OK message may include the content that the UE requested (e.g., segment M) as well as the indication.

Proxy unit 213 of the UE may receive the redirection message and continue to retrieve content data via the unicast service by sending a new HTTP GET request, to the redirection URL, for the same segment M, to application server 202 via redirection/proxy unit 205. The request sent to the redirection URL may represent proxy unit 213's acknowledgement, to redirection/proxy unit 205, of proxy unit 213's receipt of the indication. In some examples, redirection/proxy unit 205 may receive the new HTTP GET request and forward the unmodified request on to application server 202. Application server 202 may receive the new request directed to the redirection URL, and, in response send segment M, which proxy unit 213 may receive via redirection/proxy unit 205 and send to streaming/file downloading client 210. In some examples, redirection/proxy unit 205 may receive the new HTTP GET request directed to the redirection URL, and modify the new request before sending the modified new request to application server 202. For instance, redirection/proxy unit 205 may modify the new request so that the modified new request is not to the redirection URL but is instead to the original URL (e.g., "http://example.com/per- 3/rep-256/seg-M.3gp"). Application server 202 may receive the modified request and, in response, send segment M, which proxy unit 213 may receive via redirection/proxy unit 205 and send to streaming/file downloading client 210.

In addition to sending the new GET request, proxy unit 213 may make use of an API (e.g., of MBMS unit 212) to enable MBMS unit 212. That is, in response to receiving the redirection request, proxy unit 213 may enable MBMS unit 212 but continue to forward the new HTTP GET requests to app server 202 (via redirection/proxy unit 205) to fetch data segments via the unicast service until the data is available using the broadcast service. Proxy unit 213 may or may not redirect subsequent requests for unicast content to the received redirection URL. That is, after receiving a redirection request and sending a GET request for the content via the redirection URL, proxy unit 213, in various examples, may allow requests to pass through without modification, or may modify requests to direct the requests URLs based on the redirection location.

MBMS unit 212, upon receiving a trigger from local proxy unit 213, may receive the USD from BM-SC 206 using the established broadcast service or may communicate with BM-SC 206 to acquire the USD through the unicast service. The USD includes the MPD URL and MPD metadata fragment, the latter describing the adaptation sets or representations for each MBMS service carrying DASH-formatted content. MBMS unit 212 may compare the URL for the MPD initially received from streaming/file downloading client 210 (e.g., received in step 3 of FIG. 5A) with the URL for the MPD received from BM-SC 206. If the URLs match, MBMS unit 212 may begin receiving media data via the broadcast service (e.g., using a broadcast or multicast delivery mode).

For instance, MBMS unit 212 may activate file delivery over MBMS unidirectional transport (FLUTE) to receive the media data being sent via a broadcast delivery mode as part of the broadcast service. Once MBMS unit 212 has received sufficient media data (e.g., a buffer), MBMS unit 212 may call an API to configure redirection for proxy unit 213. In some examples, MBMS unit 212 may send one or more updated resource locations to proxy unit 213. For instance, MBMS unit 212 may instruct proxy unit 213 to use a modified MPD, available from the MBMS unit 212, instead of the original MPD, retrieved from application server 202. In this way, streaming/file downloading client 210 may then begin receiving media data from MBMS unit 212, obtained via the broadcast service (e.g., using a broadcast delivery mode).

Figure 5B:
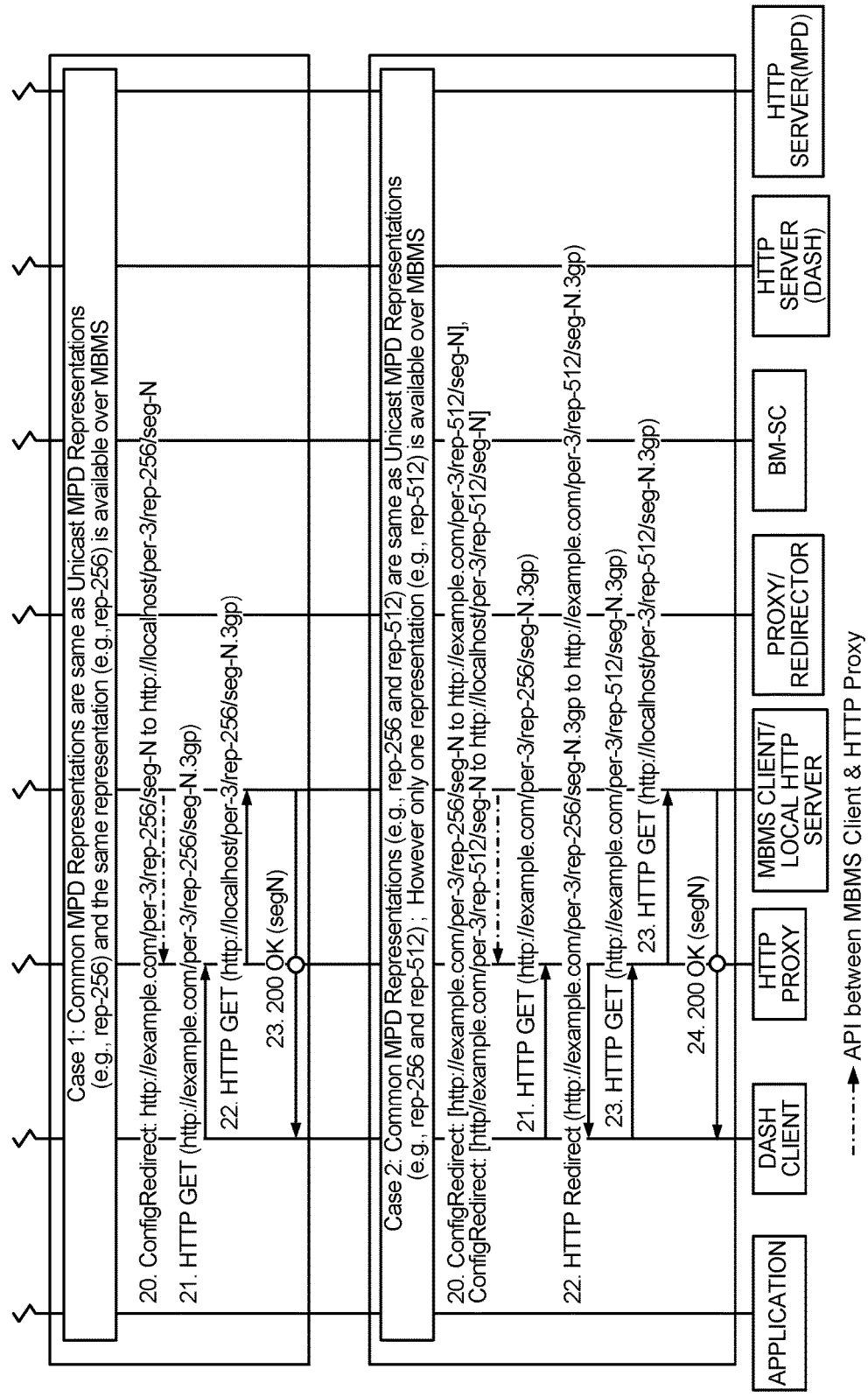
Figure 5C:
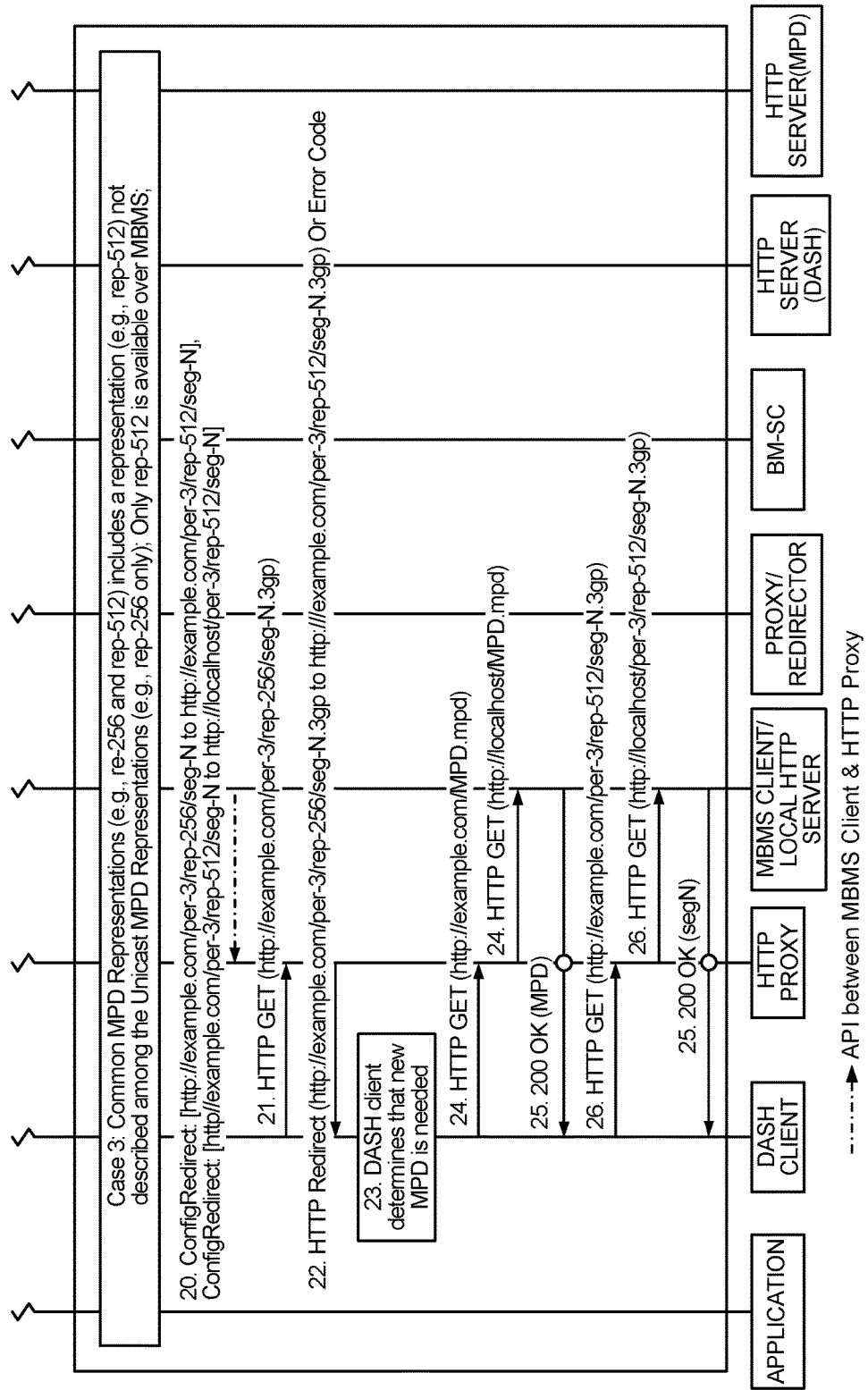
Figure 5D:
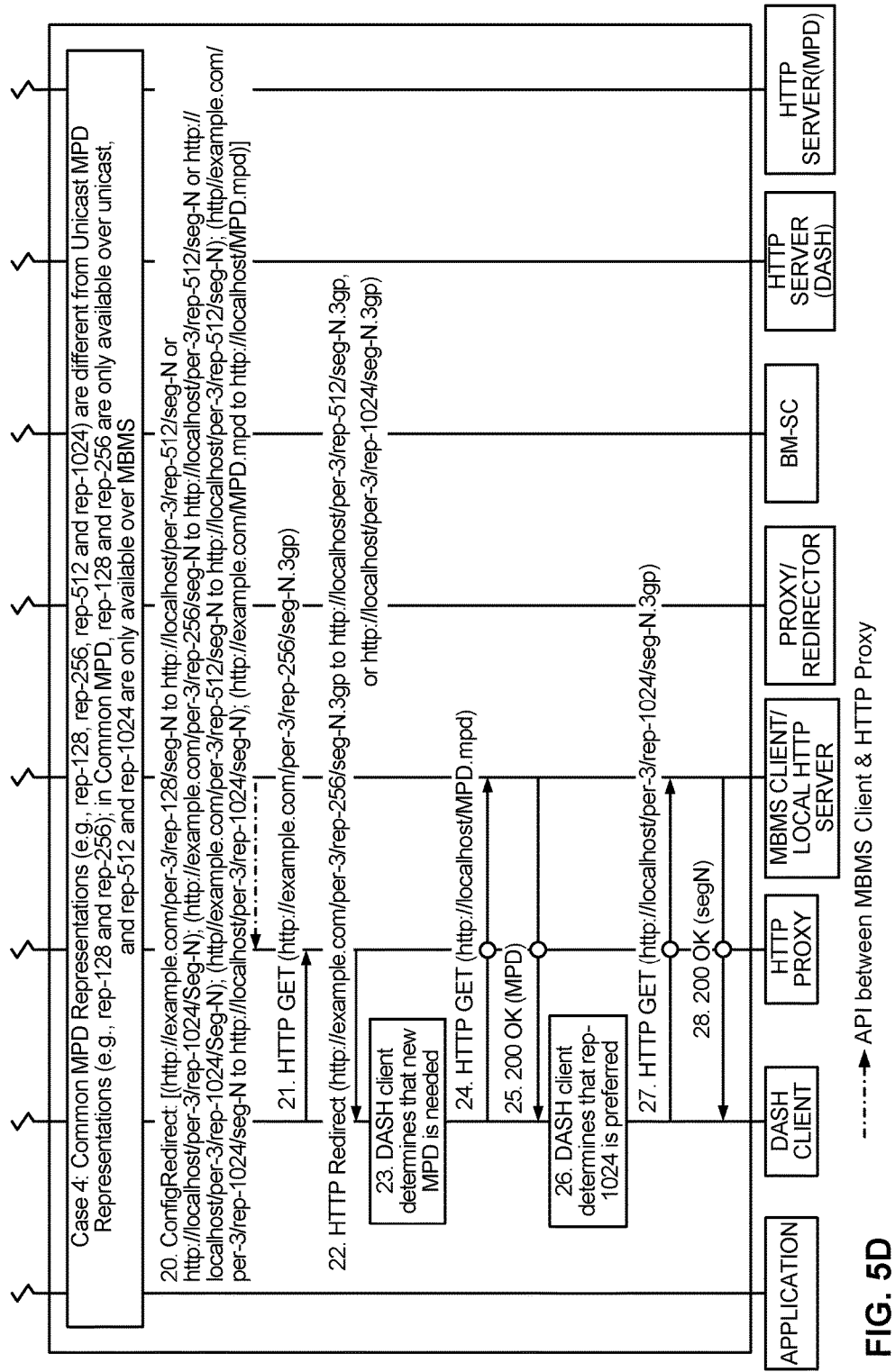

FIGS. 5B, 5C, and 5D provide example operations for four example cases. In case 1, the common MPD obtained by MBMS unit 212 from BM-SC 206 (e.g., received in step 15 of FIG. 5A) includes the same representations of the media content as the unicast MPD (e.g., representation 256) and the same representation is available via MBMS. In case 1, MBMS unit 212 may instruct proxy unit 213 to modify future requests for the media content by changing the base portion of the URLs indicated in the requests (e.g., the base portion corresponding to application server 202) to a base portion corresponding to MBMS unit 212 (e.g., a local server containing the content).

For instance, MBMS unit 212 may call an API to change a URL for segment N from "http://example.com/per-3/rep-256/seg-N" to "http://localhost/per-3/rep-256/seg-N." That is, in some examples, the first base portion may be a network location corresponding to a first service (e.g., unicast), while the second base portion may be the location of MBMS unit 212 correspond to a second service (e.g., broadcast). Proxy unit 213 may continue to receive HTTP GET requests from streaming/file downloading client 210. Proxy unit 213 may redirect the requests to the updated resource location (e.g., MBMS unit 212), which is a local host server.

MBMS unit 212 may receive the requests and send a 200-type HTTP OK message including the requested media data, which proxy unit 213 may receive and send to streaming/file downloading client 210. In this way, when proxy unit 213 receives an indication that the media data is to be received via the broadcast service (e.g., the redirection message), proxy unit 213 may activate the unit for receiving data via the second service (e.g., MBMS unit 212) and receive the media data from MBMS unit 212 (e.g., a local server) instead of a remote application server, such as application server 202.

In case 2, the common MPD obtained by MBMS unit 212 from BM-SC 206 includes the same representations of the media content as the unicast MPD representations (e.g., representation 256 and representation 512). However, only one representation is available over MBMS (e.g., representation 512). In case 2, MBMS unit 212 may instruct proxy unit 213 to modify requests by changing the base portion of URLs for both representations. Thus, proxy unit 213 may modify URLs of any requests directed to application server 202 to instead be sent to the local HTTP server of MBMS unit 212. MBMS unit 212 may also instruct proxy unit 213 to modify the URLs of requests for a representation not available over broadcast (e.g., representation 256) to the representation available over broadcast (e.g., representation 512). Thereafter, proxy unit 213 may receive an HTTP GET request from streaming/file downloading client 210 requesting the representation unavailable via MBMS.

In response to receiving the GET request, proxy unit 213 may send an HTTP redirect message to streaming/file downloading client 210 with a redirection URL for the representation available from MBMS unit 212. In some examples, the URL of the redirection message may be contained in the 'Location' header. In other examples, the redirection message may include an extension header that includes the redirection URL (e.g., "http://example.com/per-3/rep-512/seg-N.3gp"). In yet other examples, the local proxy unit 213 may alternatively use a 3xx-type HTTP redirection message with body entity including the redirection URL. In any case, streaming/file downloading client 210 may receive the redirect message, and send a new GET request with the redirection URL. Proxy unit 213 may direct the new GET request to MBMS unit 212, and MBMS unit 212 may provide the requested media data, which proxy unit 213 may receive and send to streaming/file downloading client 210.

In case 3, the common MPD obtained by MBMS unit 212 from BM-SC 206 includes a representation (e.g., representation 512) not included in the unicast MPD, and the excluded representation is the only representation available over MBMS. In case 3, MBMS unit 212 may instruct proxy unit 213 to modify request URLs (e.g., originally pointing to application server 202) by changing the base portion of only those requests pertaining to the representation available via MBMS (e.g., representation 512). In some examples, MBMS unit 212 may also instruct proxy unit 213 to modify the URLs for requests pertaining to representations not available over MBMS (e.g., representation 256) to the representation available over MBMS (e.g., representation 512). Thereafter, proxy unit 213 may receive an HTTP GET request from streaming/file downloading client 210 requesting a segment from the representation available over the unicast service (e.g., not the MBMS user service). In one example, in response to receiving the GET request, proxy unit 213 may send an HTTP redirect message to streaming/file downloading client 210 with a redirection URL for the representation available via unicast that is not included in the unicast MPD. The redirection message may include an extension header, containing a redirection URL (e.g., "http://example.com/per-3/rep-512/seg-N.3gp") and indicating that the MPD needs to be re-fetched by streaming/file downloading client 210. Proxy unit 213 may alternatively use a 3xx-type HTTP redirection message with body entity that includes the redirection URL and the indication that the MPD needs to be re-fetched. In another example, in response to receiving the GET request, proxy unit 213 may send an error code (for example, a 4xx-type HTTP error code) to streaming/file downloading client 210 to indicate that the MPD needs to be re-fetched by streaming/file downloading client 210. In any case, streaming/file downloading client 210 may determine that a new MPD is needed, and may send an HTTP GET request including the MPD URL. Proxy unit 213 may receive the GET request and redirect the GET request to the modified manifest file (e.g., the updated MPD obtained by MBMS unit 212). MBMS unit 212 may send the updated MPD, which proxy unit 213 may receive and send to streaming/file downloading client 210. In another example, in response to receiving the GET request for the modified manifest file, proxy unit 213 may push the updated MPD to streaming/file downloading client 210. In any case, after receiving the updated MPD, streaming/file downloading client 210 may send a new HTTP GET request for a segment from the representation available via MBMS, and proxy unit 213 may redirect the request to MBMS unit 212 (e.g., including a local server) to fetch the appropriate segments. MBMS unit 212 may provide the requested segments of media data, which proxy unit 213 may receive and send to streaming/file downloading client 210.

In case 4, the common MPD obtained by MBMS unit 212 from BM-SC 206 includes more than one representation (e.g., representation 512 and representation 1024) not included in the unicast MPD, and the excluded representations are the only representations available over MBMS. In case 4, MBMS unit 212 may instruct proxy unit 213 to modify the base portion of request URLs (e.g., which nominally point to a network-based server) to a base portion of URLs pertaining to the representations available via MBMS (e.g., representation 512 and representation 1024).

Thereafter, proxy unit 213 may receive an HTTP GET request from streaming client 210 requesting one of the representations available over the unicast service. In one example, in response to receiving the GET request, proxy unit 213 may send an HTTP redirect message to streaming client 210 with multiple redirection URLs for the representations available via broadcast delivery that are not included in the unicast MPD. In some examples, the redirection message may include an extension header which contains the multiple redirection URLs (e.g., http://example.com/per-3/rep-512/seg-N.3gp and http://example.com/per-3/rep-1024/seg-N.3gp), indicating that the MPD needs to be re-fetched by streaming/file downloading client 210. In other examples, the local proxy unit 213 may use a 3xx-type HTTP redirection message with body entity containing the multiple redirection URLs and an indicator indicating that the MPD needs to be re-fetched. In another example, in response to receiving the GET request, proxy unit 213 may send an error code (e.g., a 4xx-type HTTP error message) to streaming/file downloading client 210 to indicate that the MPD needs to be re-fetched.

In any case, streaming/file downloading client 210 may determine that a new MPD is needed, and may send an HTTP GET request including the MPD URL. Proxy unit 213 may receive the GET request and direct the GET request to the updated manifest file (e.g., the updated MPD obtained by MBMS unit 212). MBMS unit 212 may send the updated MPD, which proxy unit 213 may receive and send to streaming/file downloading client 210. In another example, in response to receiving the GET request, proxy unit 213 may push updated MPD to streaming/file downloading client 210. Streaming/file downloading client 210 may then send a new HTTP GET request for a preferred representation from the representations available via the broadcast service, and proxy unit 213 may direct the request to MBMS unit 212 (e.g., including a local server) to fetch the requested data. MBMS unit 212 may provide the requested data, which proxy unit 213 may receive and send to streaming/file downloading client 210.

In this way, proxy unit 213 may enable using MBMS unit 212 to receive DASH media data or any other suitable data. This may be accomplished, at least in part, by modifying streaming/file downloading client 210 behavior when it receives indications of one or more representations which are not in the common MPD (e.g., receiving a redirection or an error code). For example, receiving an indication of a representation not in the MPD may cause streaming client 210 to trigger an MPD fetch or other actions.

Figure 6:
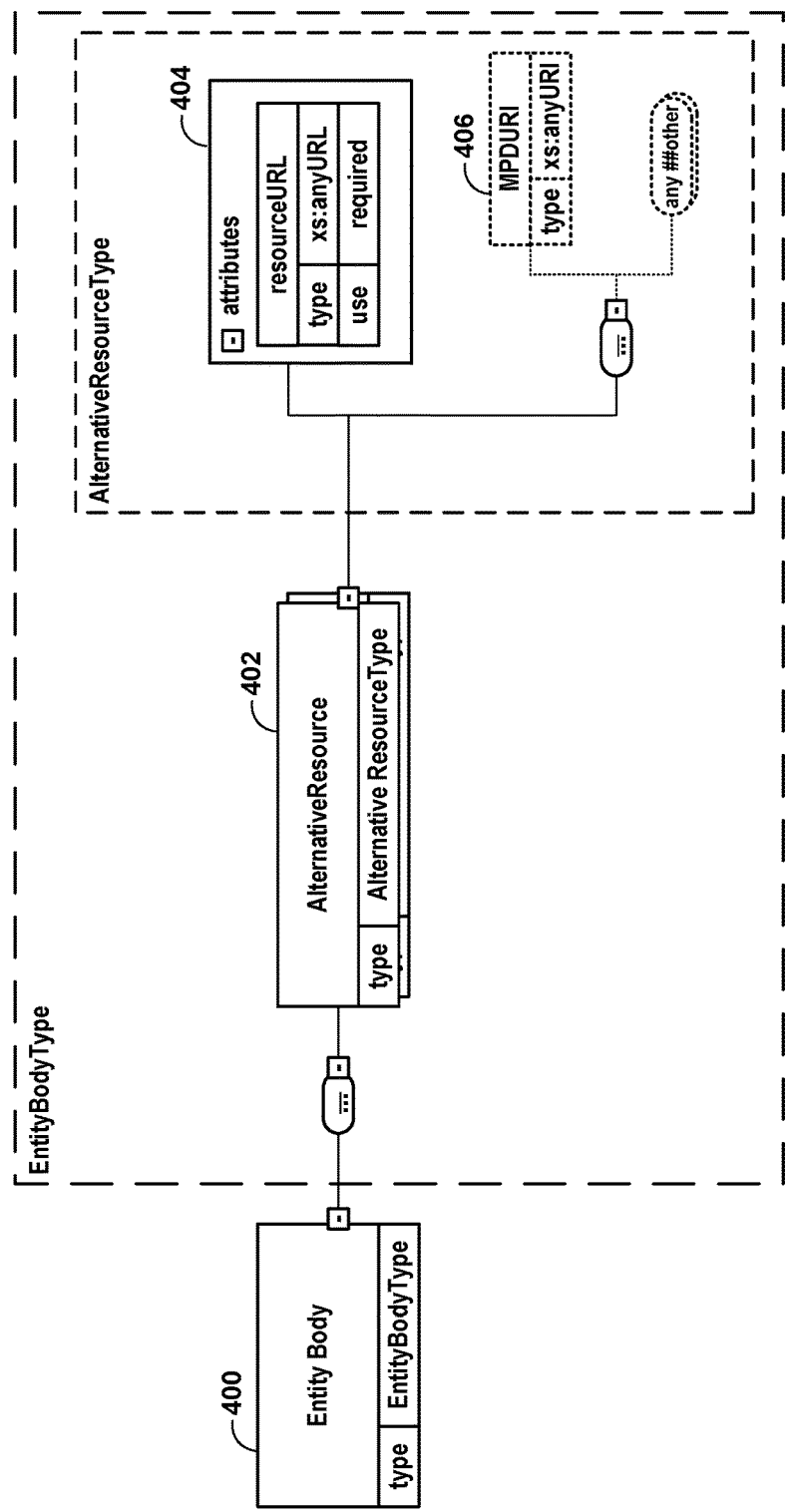
FIG. 6 is a conceptual diagram illustrating one example of a body entity for a redirection message.

FIG. 6 is a conceptual diagram illustrating one example of body entity 400 for a redirection message. In some examples, body entity 400 of FIG. 6 may represent the body of a 3xx-type HTTP redirection message. Body entity 400, as shown in the example of FIG. 6, may be formatted in accordance with a structured file language, such as extensible markup language (XML) or any other format. FIG. 6 illustrates only one example of a body entity for a redirection message, and various other body entities and/or redirection messages may be used in accordance with one or more techniques of the present disclosure.

As shown in the example of FIG. 6, body entity 400 has a type of "EntityBodyType." Entity body type may contain one or more alternative resources 402A-402N (collectively "alternative resources 402"). Alternative resources 402 may represent alternative resource locations for content or content data (e.g., streaming service data or file download service data). For instance, in the context of FIGS. 5A-5D, alternative resources 402 may each refer to a local location (e.g., provided by MBMS unit 212) for various representations and each representation's segments of media data.

Alternative resources 402, as shown in the example of FIG. 6, may each have a type of "AlternativeResourceType" and contain attributes 404. Attributes 404 may include the attributes for the respective alternative resource (e.g., the URL itself). In some examples, alternative resources 402 may contain other information, such as MPDURI object 406 or any other information. By including body entity 400 in a 3xx-type HTTP redirection message, an MBMS middleware unit may cause a proxy unit and/or a streaming/file downloading client to thereafter send requests for content associated with a first service (e.g., a unicast service) to a different location, such as a local content server (e.g., associated with a multicast or broadcast service). That is, in accordance with one or more techniques of the present disclosure, body entity 400 may be used after activating a unit for receiving data via a second delivery mode (e.g., an MBMS middleware unit) to subsequently receive the data from the unit via the second delivery mode.

Figure 7A:
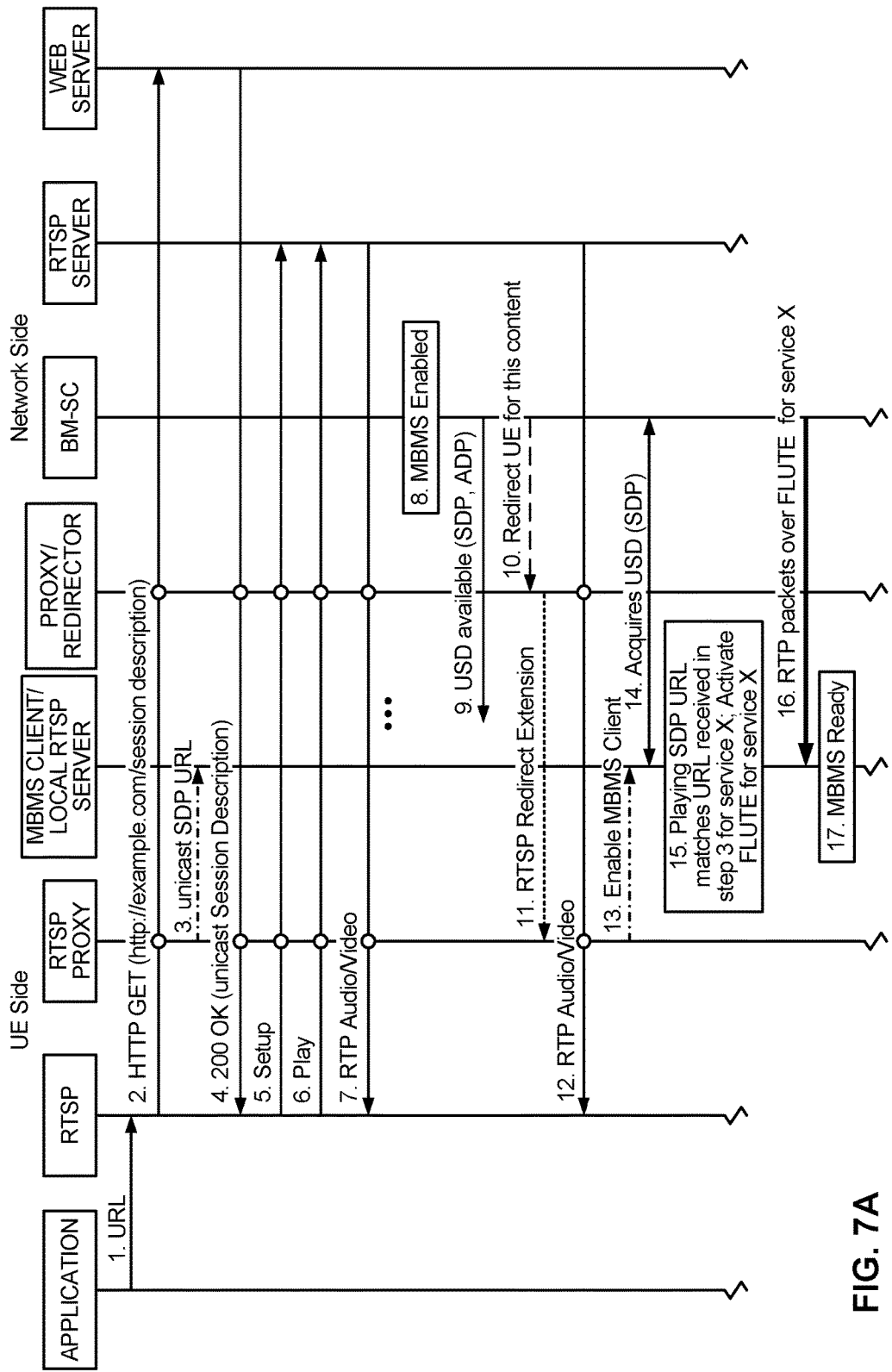
FIGS. 7A and 7B are conceptual diagrams illustrating example operations for obtaining streaming media data selectively using one or more services.
Figure 7B:
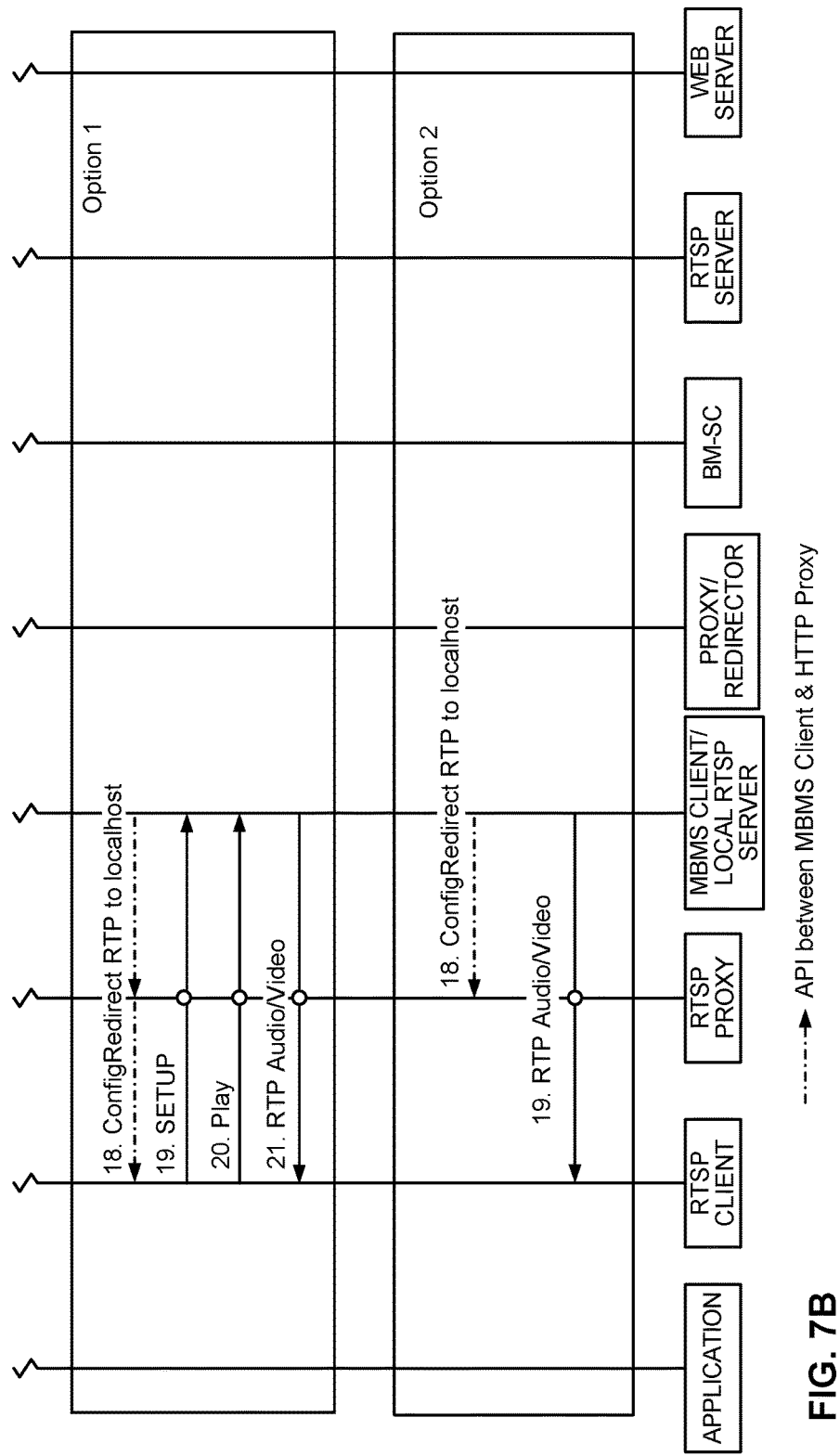

FIGS. 7A and 7B are conceptual diagrams illustrating example operations for obtaining streaming media data selectively using one or more services via RTP/RTSP. The example operations of FIGS. 7A and 7B are described below within the general context of system 200 of FIG. 4. In the example of FIGS. 7A and 7B, streaming/file downloading client 210 may be an RTP/RTSP client, redirection/proxy unit 205 may be a Proxy/Redirector, MBMS unit 212 may be an MBMS client and a local RTSP server, proxy unit 213 may be an RTSP proxy, and application server 202 may be both an RTSP server capable of providing RTP media data as well as a webserver for providing responding to HTTP GET requests for a session description. In accordance with one or more techniques of the present disclosure, application 208 may obtain media data using streaming/file downloading client 210 (e.g., using the RTP protocol). For instance, application 208 may send streaming/file downloading client 210 a URL indicating a location of a manifest file (e.g., a session description) that maps an identifier for the media data to a resource location for a first service (e.g., unicast). Streaming/file downloading client 210 may obtain the session description by sending an HTTP GET request to proxy unit 213. Proxy unit 213 may receive the HTTP GET request, and direct the request to application server 202 via IP stack 214, modem 216, P-GW 204, and redirection/proxy unit 205. In the example of FIG. 7A, proxy unit 213 may also send an indication of the unicast session description URL to MBMS unit 212 (e.g., by calling an API).

In some examples, the UE may indicate that it is eMBMS capable when it does an initial fetch of the session description. In this way, the UE may enable the network to know how many eMBMS capable devices are in the area. Indicating eMBMS capability also allows the network to track future transactions from the UE's address. In some examples, the UE may also indicate its location when it does the initial fetch of the session description. In any case, application server 202 may receive the HTTP GET request and may send a 200-type HTTP OK message, which proxy unit 213 may receive and send to streaming/file downloading client 210 in response. The OK message may include the unicast session description.

Streaming/file downloading client 210 may receive the session description and may send an RTSP SETUP request to application server 202 via proxy unit 213. The SETUP request may contain the session description URL and may specify how the media data will be transported (e.g., in accordance with RTP). In some examples, the SETUP request may contain more or other information, such as a local port for receiving the data. In any case, application server 202 may respond to the SETUP request, and a unicast session may be created between streaming/file downloading client 210 and application server 202. Streaming/file downloading client 210 may send one or more RTSP PLAY requests to application server 202 via proxy unit 213. In response to receiving a PLAY request, application server 202 may send streaming media data, such as RTP audio and/or RTP video data, which proxy unit 213 may receive and send to streaming/file downloading client 210. Streaming/file downloading client 210 may receive the media data, and play the associated content.

On the network side, BM-SC 206 may enable an MBMS service for the content and initiate an MBMS bearer. BM-SC 206 may broadcast a USD that includes a new session description, including a description of the available broadcast service, as well as an associated delivery procedure (ADP) description. For instance, the new session description may include a URL that corresponds to the broadcast delivery mode as well as a fallback URL that corresponds to the unicast service. BM-SC 206 may also send an indication to redirection/proxy unit 205 that media data is to be received via the MBMS service for the particular media content.

In response to receiving the indication, redirection/proxy unit 205 may send an RTSP REDIRECT request to proxy unit 213. The REDIRECT request may include a new extension which includes a URL to cause the UE to issue subsequent requests for the content to the new URL. The REDIRECT request may indicate to local proxy unit 213 to activate MBMS unit 212. In some examples, the REDIRECT request may include a timestamp indicating the time at which the UE should start issuing requests to the new URL. Prior to the time indicated in the timestamp, streaming/file downloading client 210 may continue to send requests to, and receive media data from, application server 202 via proxy unit 213.

When proxy unit 213 receives the REDIRECT request sent by redirection/proxy unit 205, proxy unit 213 may make use of an API (e.g., of MBMS unit 212) to enable MBMS unit 212. That is, in response to receiving the REDIRECT request, proxy unit 213 may send an indication to MBMS unit 212 to obtain data using the broadcast service. MBMS unit 212 may communicate with BM-SC 206 to acquire the USD (including the new session description). MBMS unit 212 may compare the URL for the session description initially received from streaming/file downloading client 210 (e.g., in step 3 of FIG. 7A) with the URL for the session description received from BM-SC 206. If the URLs match, MBMS unit 212 may begin receiving media data via the broadcast delivery mode. For instance, MBMS unit 212 may activate FLUTE to receive the RTP media data being sent via a broadcast delivery mode. Once MBMS unit 212 has received sufficient media data (e.g., a buffer), MBMS unit 212 may be ready to act as a local server for the media data.

FIG. 7B provides example operations for two possible cases. In a first option, MBMS unit 212 may call an API (e.g., of proxy unit 213) to cause streaming/file downloading client 210 to tear down the existing session. For instance, proxy unit 213 may send a modified version of the previously received REDIRECT request, with the local address of MBMS unit 212 to streaming/file downloading client 210. In response to receiving the REDIRECT request, streaming/file downloading client 210 may send an RTSP TEARDOWN message, and send a new RTSP SETUP message. The new SETUP message may be sent to the URL indicated in the received REDIRECT request (e.g., a location of MBMS unit 212). MBMS unit 212 may receive the request via proxy unit 213, and communicate with streaming/file downloading client 210 via proxy unit 213 to provide the RTP audio and/or RTP video data. That is, streaming/file downloading client 210 may send one or more RTSP PLAY requests, via proxy unit 213, to a local server contained within MBMS unit 212 and the local server may send RTP media data in response, which proxy unit 213 may receive and send to streaming/file downloading client 210.

In a second option, MBMS unit 212 may call an API to cause proxy unit 213 to redirect requests for RTP media data corresponding to the particular media content to MBMS unit 212. For instance, proxy unit 213 may receive RTSP PLAY requests from streaming/file downloading client 210 and redirect the requests to MBMS unit 212 instead of to application server 202. Thereafter, streaming/file downloading client 210 may receive, via proxy unit 213, RTP audio data and/or RTP video data from MBMS unit 212. In this way, proxy unit 213 may selectively enable or disable MBMS unit 212 to choose between various services and delivery modes for receiving the RTP media data.

Figure 8:
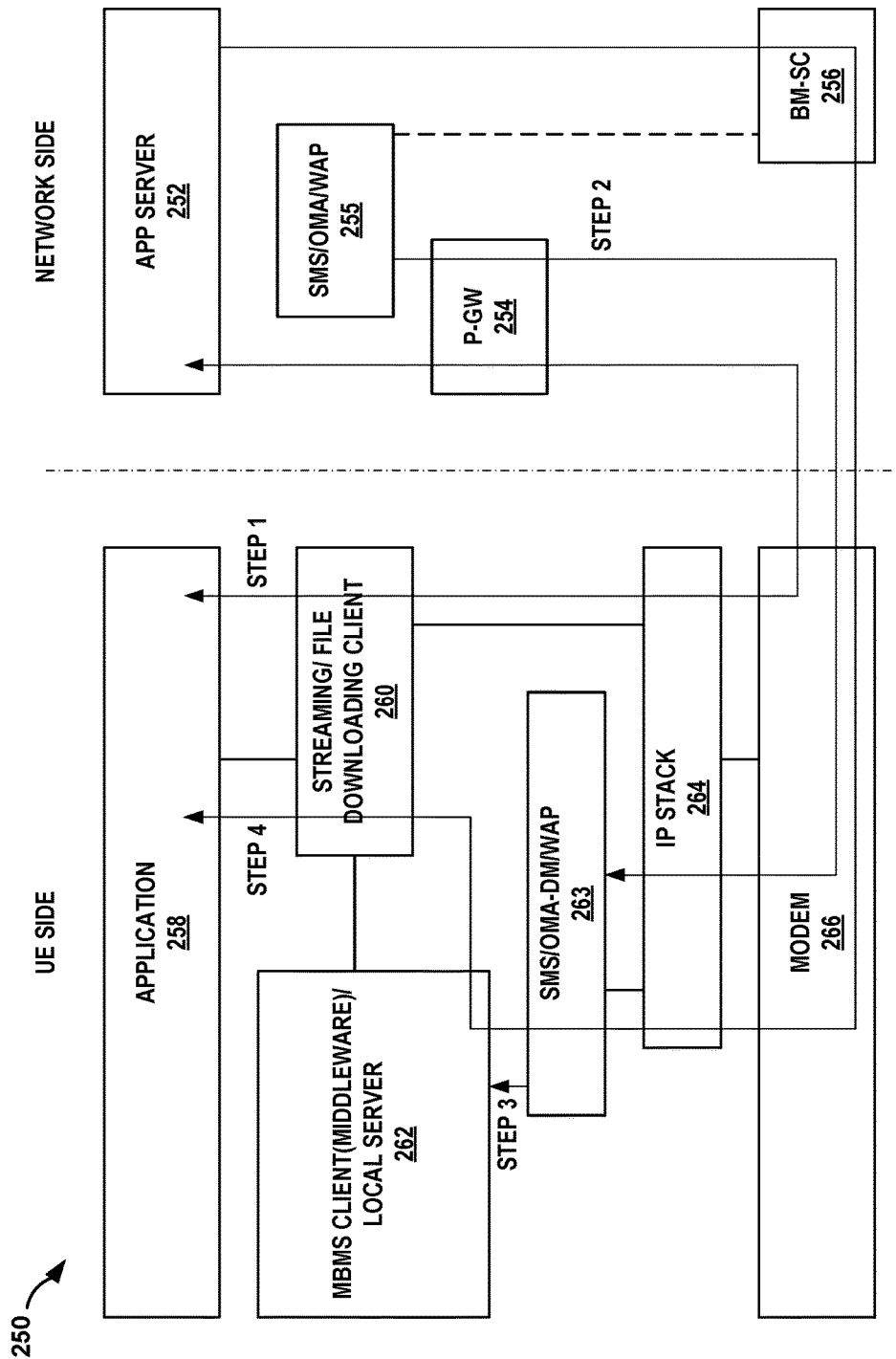
FIG. 8 is a conceptual diagram illustrating an example system that implements techniques for obtaining data selectively using one or more services.

FIG. 8 is a conceptual diagram illustrating an example system 250 that implements techniques for obtaining data selectively using one or more services. In the example of FIG. 8, system 250 includes UE side and network side. The network side of system 250 includes application server ("app server") 252, P-GW 254, message service ("SMS/OMA/WAP") 255, and BM-SC 256. Application server ("app server") 252, P-GW 254, and BM-SC 256 may include functionality that is the same as or similar to that of application server 152, P-GW 154, and BM-SC 156 of FIG. 3, respectively. Message service 205 may represent hardware, firmware, software, or some combination thereof for communicating with one or more UEs. For instance, message service 205 may be a server operable to communicate with UEs using one or more protocols, such as a short message service (SMS) center, an OMA-DM server, a WAP server, or other protocol.

In the example of FIG. 8, the UE side of system 250 includes application 258, streaming/file downloading client 260, MBMS unit ("MBMS client (middleware)/local server") 262, message client ("SMS/OMA-DM/WAP") 263, IP stack 264, and modem 266. Application 258, IP stack 264, and modem 266 may include functionality that is the same as or similar to that of application 158, IP stack 164, and modem 166 of FIG. 3, respectively. In some examples, streaming/file downloading client 260 may include functionality that is the same or similar to that of streaming/file downloading client 210 of FIG. 4. In other examples, streaming/file downloading client 260 may include different or additional functionality. MBMS unit 262 may include functionality that is the same or similar to that of MBMS unit 162 of FIG. 3.

In the example of FIG. 8, MBMS unit 262 may also include functionality to communicate with message client 263, such as via an API. Message client 263 may be operable to provide various information to MBMS unit 262, such as a unicast MPD/session description URL (or a mechanism to notify the eMBMS layer of an MPD for a presentation being accessed), MBMS triggering information (e.g., a mechanism to cause/trigger the eMBMS layer to check for USD updates), or other information. For instance, message client 263 may send information to MBMS unit 212 to cause MBMS unit 212 to start receiving data via a broadcast service.

In Step 1 of FIG. 8, application 258 gets data from application server 252 through a unicast service via streaming/file downloading client 260. MBMS unit 262 may be disabled. That is, when the UE has received an indication that data is to be received via a first service (e.g., when the first service is the only service available), the UE may disable the unit for receiving data via a second service. In Step 2 of the example of FIG. 8, a HARD unit in the network (not shown) detects a high attach rate. The HARD unit indicates the high attach rate to BM-SC 256 to enable an MBMS session (e.g., an MBMS bearer). BM-SC 256 requests message service 255 (e.g., the SMS center, OMA-DM/WAP server) to send an indication to the UE. Message service 255 may send a message to an SMS/OMA-DM/WAP layer (e.g., message client 263) in the UE. In this way, the network may send an indication (e.g., the message) that data should be received via the broadcast service. The message may include a USD update for broadcast service.

In Step 3 of the example of FIG. 8, when message client 263 receives the indication (e.g., the instruction to activate MBMS unit 262), message client 263 (e.g., the SMS/OMA-DM/WAP layer) in the UE registers with the MBMS middleware (e.g., MBMS unit 262). That is, in accordance with one or more techniques of the present disclosure, the network side of system 250 may use a push mechanism (such as SMS, WAP push, OMA-DM, etc.) to directly wake up the MBMS middleware.

In Step 4 of the example of FIG. 8, application 258 gets data from the MBMS bearer (e.g., BM-SC 256) by obtaining data indirectly from MBMS unit 262 that the MBMS unit 262 obtained using the broadcast or multicast service (e.g., using a broadcast or multicast delivery mode). In other words, when the UE receives an indication that the data is to be received via the second service, the UE may activate a unit for receiving data via the second service (e.g., MBMS unit 262) and receive the data from the unit for receiving the data via the second service. The data received via the second service may then be provided indirectly (e.g., via streaming/file downloading client 260) to the application 258. In the example of FIG. 8 one or more components of the network side of system 250 may be operable to maintain state information. That is, the example of FIG. 8 may require state in the network and needs to identify which UEs should be sent "PUSH" notifications. In some examples, the pushed content can include the USD itself. In the example of FIG. 8, application 258 is transport agnostic. That is, application 258 need not have any indication of how the data is obtained. Rather, streaming/file downloading client 260 may receive an updated USD (e.g., including a new MPD, session description, or other manifest file) and send requests for data to MBMS unit 262 instead of to application server 252.

Figure 9:
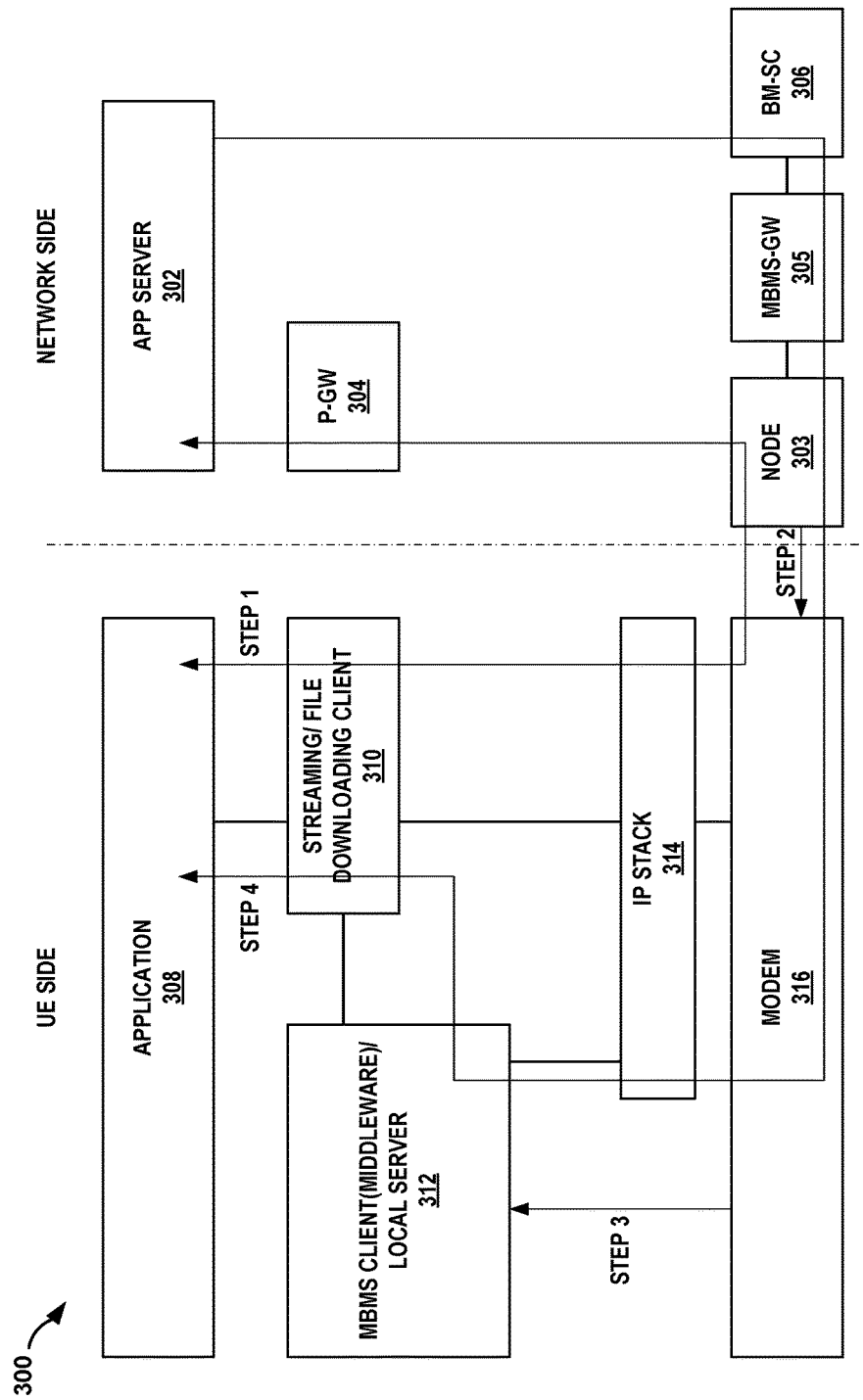
FIG. 9 is a conceptual diagram illustrating an example system that implements techniques for obtaining data selectively using one or more services.

FIG. 9 is a conceptual diagram illustrating an example system 300 that implements techniques for obtaining data selectively using one or more services. In the example of FIG. 9, system 300 includes UE side and network side. The network side of system 300 includes application server ("app server") 302, P-GW 304, node 303, MBMS Gateway (MBMS-GW) 305 and BM-SC 306. Application server ("app server") 302, P-GW 304, and BM-SC 306 may include functionality that is the same as or similar to that of application server 202, P-GW 204, and BM-SC 206 of FIG. 4, respectively. Node 303 may represent network hardware, firmware, software or any combination thereof for communicating directly with UEs. For instance, node 303 may represent a "NodeB" or an "eNodeB" of a cellular network, operable to communicate via air interface technology with one or more components of the UE side of system 300. MBMS-GW 305 may represent hardware, firmware, software, or any combination thereof operable to perform MBMS control functions. For instance, MBMS-GW 305 may be operable to send multicast or broadcast data to various nodes of the network, such as node 303. MBMS-GW 305 may receive broadcast or multicast data from BM-SC 306, and coordinate the broadcast to one or more nodes.

In the example of FIG. 9, the UE side of system 300 includes application 308, streaming/file downloading client 310, MBMS unit ("MBMS client (middleware)/local server") 312, IP stack 314, and modem 316. Application 308, streaming/file downloading client 310, IP stack 314, and modem 316 may include functionality that is the same as or similar to that of application 218, streaming/file downloading client 210, IP stack 214, and modem 216 of FIG. 4, respectively. MBMS unit 312 may include some functionality that is the same or similar to that of MBMS unit 312 of FIG. 4. In the example of FIG. 9, MBMS unit 312 may include different or additional functionality. For instance, MBMS unit 312 may include functionality to receive instructions from the network of system 300. That is, MBMS unit 312 may receive various information from one or more components, such as node 303, MBMS-GW 305, and/or BM-SC 306.

In Step 1 of the example of FIG. 9, application 308 gets data from application server 302 through a unicast service via streaming/file downloading client 310. In Step 2 of the example of FIG. 9, a HARD unit in the network (not shown) detects a high attach rate. The HARD unit indicates the high attach rate to BM-SC 306 to enable an MBMS session (e.g., an MBMS bearer). BM-SC 306 enables MBMS by sending an MBMS session setup to add a new temporary mobile group identifier (TMGI), which triggers an eNode B and/or a multi-cell/multicast coordination entity (MCE) (e.g., node 303) to send air interface signaling, such as USD change notifications. The air interface signaling may be received by modem 316 on the UE side. In this way, the network side of system 300 may use air interface signaling to indicate the availability of a second service (e.g., an MBMS bearer or other multicast or broadcast service) to the UE.

In Step 3 of the example of FIG. 9, when modem 316 receives the indication (e.g., a USD change notification), modem 316 indicates the USD change to the MBMS middleware (e.g., MBMS unit 312). That is, in accordance with one or more techniques of the present disclosure, the network side of system 300 may use air interface signaling, such as SIB broadcasts, MCCH notifications, USD change notifications, or other signaling to indicate the availability of multicast or broadcast services to the UE.

In Step 4 of the example of FIG. 9, application 308 gets data from the MBMS bearer (e.g., BM-SC 306) by obtaining data indirectly from MBMS unit 312 that the MBMS unit 312 obtained using the broadcast or multicast service (e.g., via a broadcast or multicast delivery mode). In other words, when the UE receives an indication that the media data is to be received via the second service, the UE may activate the unit for receiving data via the second service (e.g., MBMS unit 312) and receive the media data from the unit for receiving the data via the second service. The data received via the second service may then be provided indirectly (e.g., via streaming/file downloading client 310) to the application 308. This approach of FIG. 9 can be used for both streaming services and file downloading. In the example of FIG. 9, application 308 is transport agnostic. That is, application 308 need not have any indication of how the data is obtained. In some examples, MCCH Change notification may not work with multiband/Multifrequency environments, because the network adding services on the other frequency will not trigger MCCH change notification for this frequency.

Figure 10:
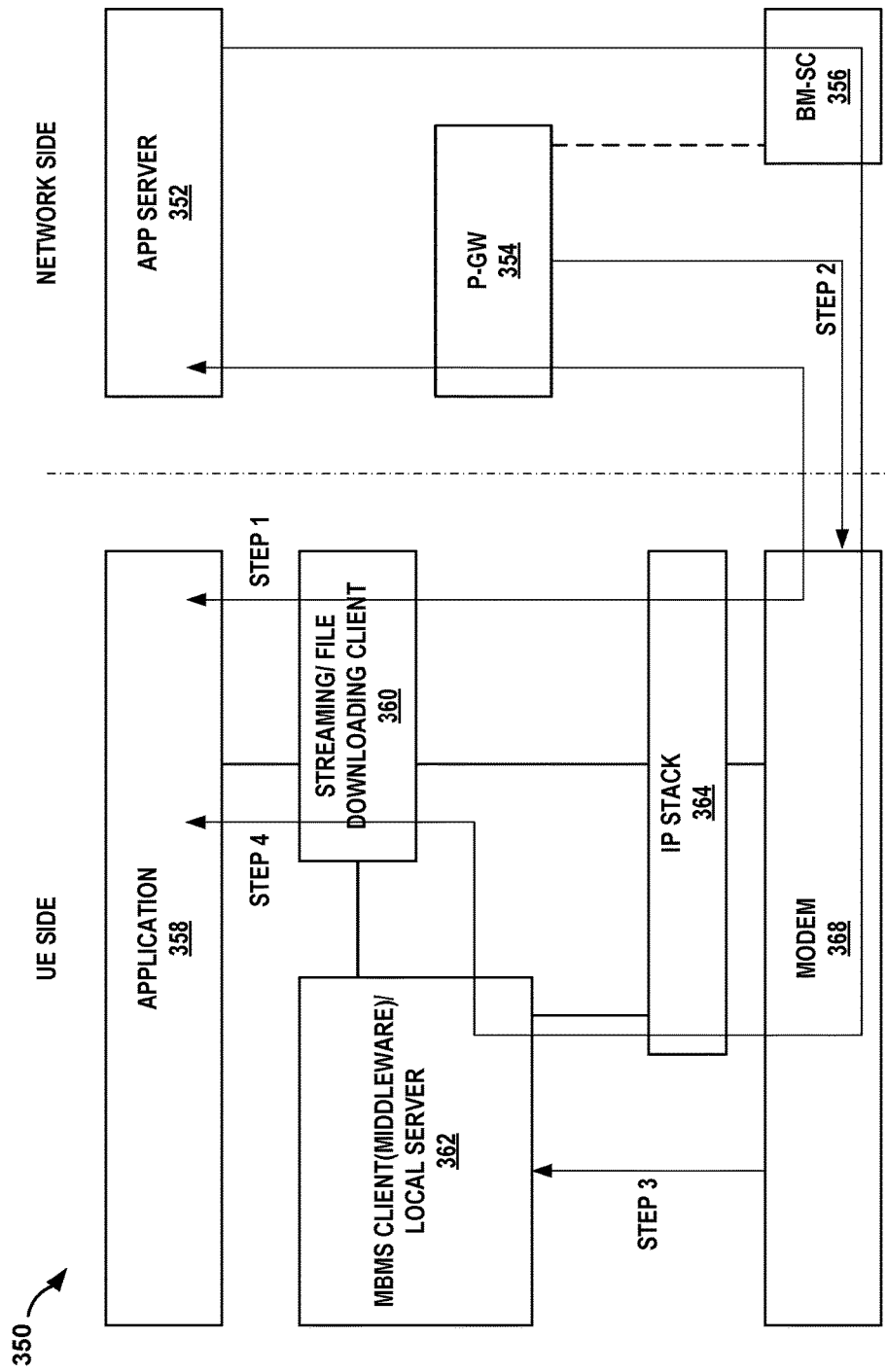
FIG. 10 is a conceptual diagram illustrating an example system that implements techniques for obtaining data selectively using one or more services.

FIG. 10 is a conceptual diagram illustrating an example system 350 that implements techniques for obtaining data selectively using one or more services. In the example of FIG. 10, system 350 includes UE side and network side. The network side of system 350 includes application server ("app server") 352, P-GW 354 and BM-SC 356. Application server ("app server") 352, P-GW 354, and BM-SC 356 may include functionality that is the same as or similar to that of application server 202, P-GW 204, and BM-SC 206 of FIG. 4, respectively. BM-SC 356 may include functionality to indicate broadcast availability to other components of the network side of system 350, such as P-GW 304.

In the example of FIG. 10, the UE side of system 350 includes application 358, streaming/file downloading client 360, MBMS unit ("MBMS client (middleware)/local server") 362, IP stack 364, and modem 366. Application 358, streaming/file downloading client 360, IP stack 364, and modem 366 may include functionality that is the same as or similar to that of application 218, streaming/file downloading client 210, IP stack 214, and modem 216 of FIG. 4, respectively. MBMS unit 362 may include some functionality that is the same or similar to that of MBMS unit 362 of FIG. 4. In the example of FIG. 9, MBMS unit 362 may include different or additional functionality. For instance, MBMS unit 362 may include functionality to receive instructions from the network side of system 350. That is, MBMS unit 362 may receive various information from one or more components, such as P-GW 354.

In Step 1 of the example of FIG. 10, application 358 gets data from application server 352 through a unicast service via streaming/file downloading client 360. In Step 2 of the example of FIG. 10, a HARD unit in the network (not shown) detects a high attach rate. The HARD unit indicates the high attach rate to BM-SC 356 to enable an MBMS session (e.g., an MBMS bearer). BM-SC 356 sends a request to P-GW 354 to cause P-GW 354 to send an indication to the UE. The indication can use PCO or NAS signaling.

In Step 3 of the example of FIG. 10, when modem 366 receives the indication, modem 366 indicates the availability of the broadcast or multicast service to the MBMS middleware (e.g., MBMS unit 362). That is, in accordance with one or more techniques of the present disclosure, the network side of system 350 may use P-GW signaling, such as NAS signaling, PCOs or other signaling to indicate to the UE the availability of multicast or broadcast services.

In Step 4 of the example of FIG. 10, application 358 gets data from the MBMS bearer (e.g., BM-SC 356) by obtaining data indirectly from MBMS unit 362 that the MBMS unit 362 obtained using the broadcast or multicast service (e.g., via a broadcast or multicast delivery mode). In other words, when the UE receives an indication that the data is to be received via the second service, the UE may activate the unit for receiving data via the second service (e.g., MBMS unit 362) and receive the data from the unit for receiving the data via the second service. The data received via the second service may then be provided indirectly (e.g., via streaming/file downloading client 360) to the application 358. In the example of FIG. 10, one or more components of the network side of system 350 may be operable to maintain state information. That is, the example of FIG. 10 may require state in the network and needs to identify which UEs should be sent the indication. In the example of FIG. 10, application 358 is transport agnostic. That is, application 358 need not have any indication of how the data is obtained.

Figure 11A:
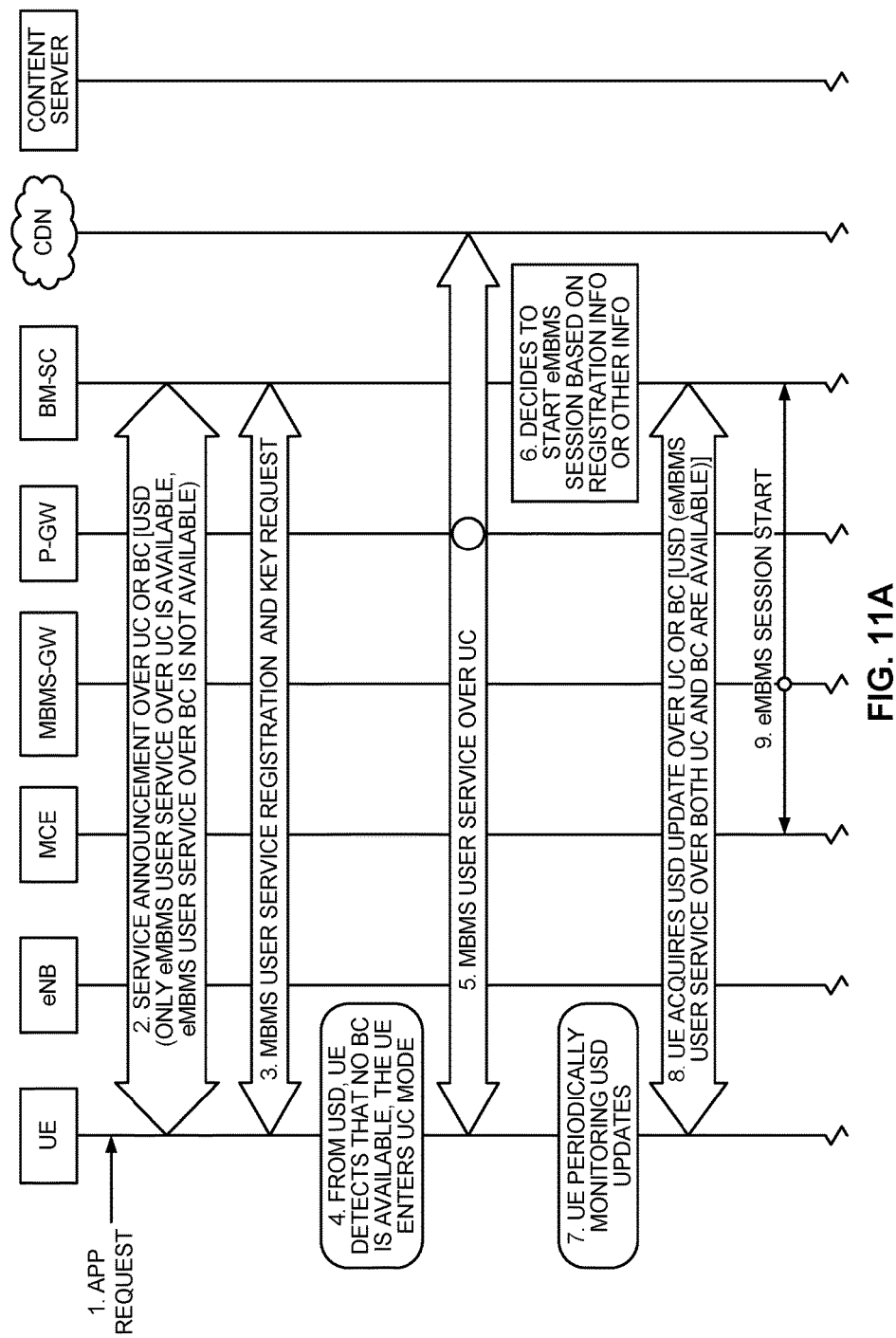

FIGS. 11A and 11B are conceptual diagrams illustrating example operations for obtaining data over a network using one or more services. In the example of FIGS. 11A and 11B, an application running on a UE may request content (e.g., media content, a file, or other content). One or more components of the UE (e.g., a streaming or file downloading client) may communicate with components on the network to determine what services are available for receiving data for the content. UE may determine that the data is available over a unicast service only and the UE may register for the unicast service. The UE may enter unicast mode when it is determined that no multicast or broadcast service is available, and may thereafter receive data via the unicast service (e.g., using a unicast delivery mode). The UE may periodically check for updates to the USD, to determine if a broadcast or multicast service is available. Upon determining that a broadcast service is available, the UE may receive data via the broadcast service, enter broadcast mode, and tear down the unicast channel.

Figure 12:
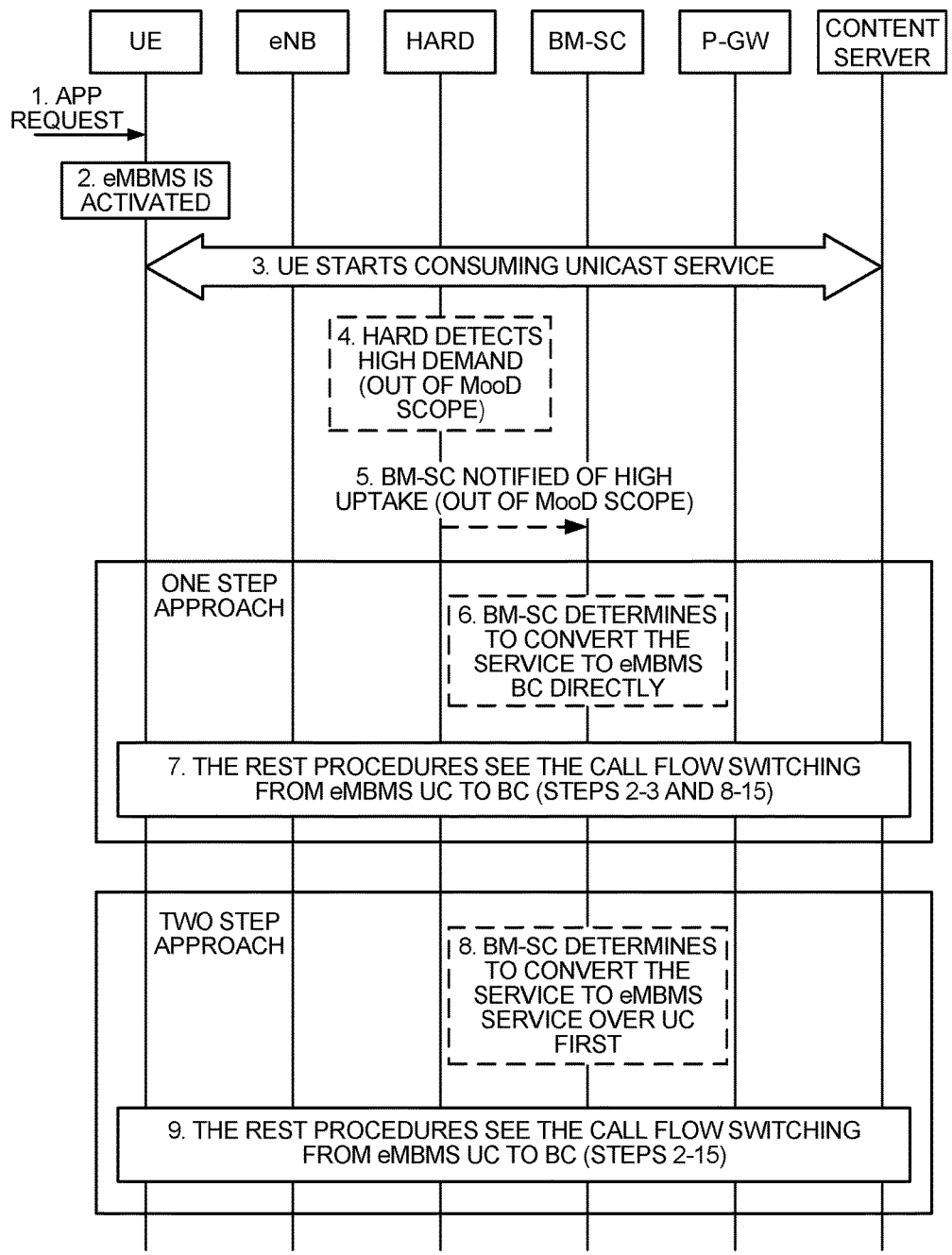
FIG. 12 is a conceptual diagram illustrating example operations for obtaining data over a network using one or more services.

FIG. 12 is a conceptual diagram illustrating example operations for obtaining data over a network using one or more services. In the example of FIG. 12, a UE may receive a request for data (e.g., from a streaming or file downloading client of the UE) and may activate eMBMS. The UE may receive data using a unicast service, such as when a broadcast or multicast service is unavailable. A HARD in the network may detect a high attach rate or high demand for the content, and notify a BM-SC of the high demand. In a one-step approach, the BM-SC may convert the unicast service directly to an eMBMS broadcast service, and the UE may register with the broadcast service as described in steps 2,3, and 8-15 of FIGS. 11A and 11B. In a two-step approach, the BM-SC may first convert the unicast service to an eMBMS service over unicast, and the UE may transition from the eMBMS unicast service to the eMBMS broadcast service as described in steps 2-15 of FIGS. 11A and 11B.

Figure 13A:
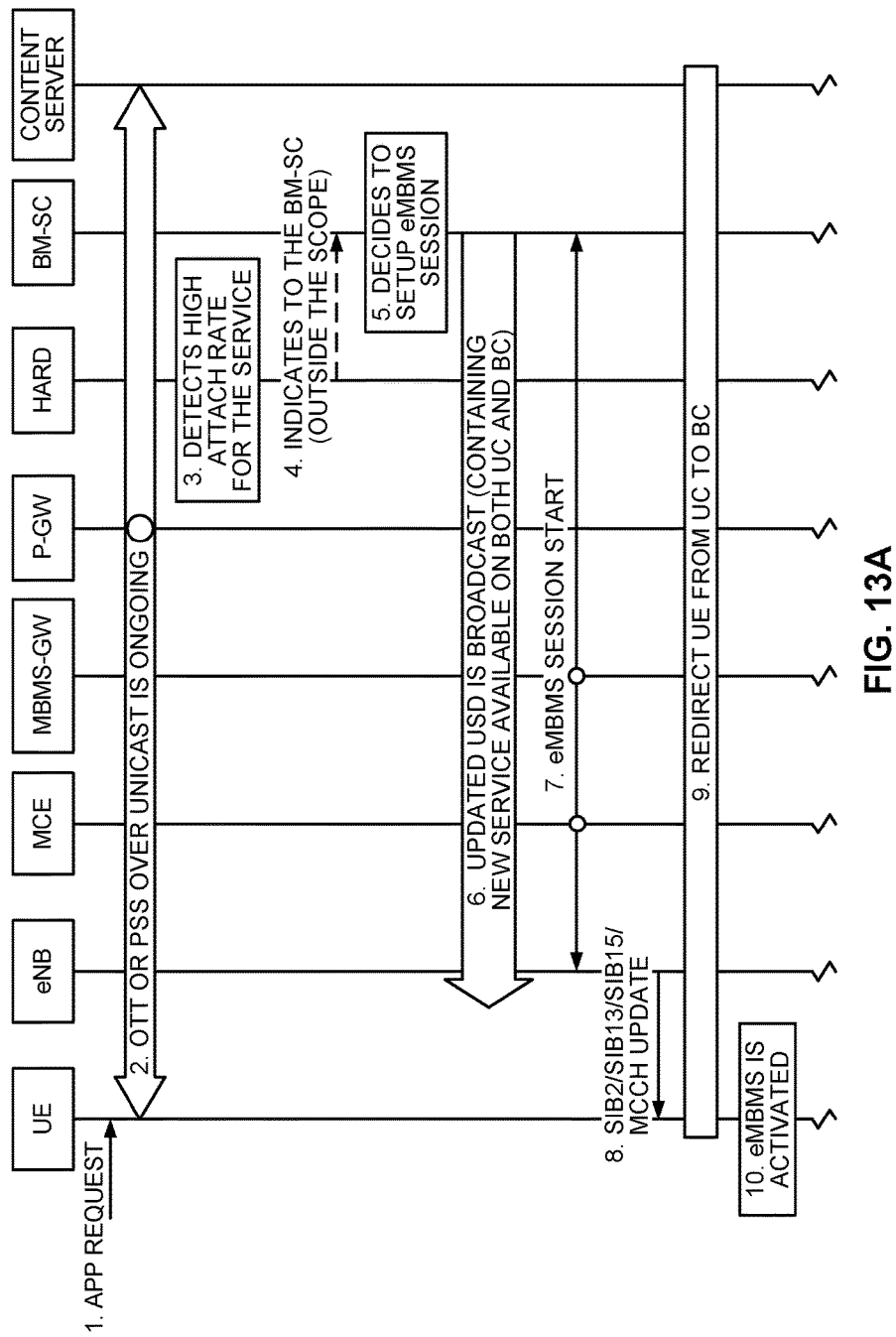
FIGS. 13A and 13B are conceptual diagrams illustrating example operations for obtaining data over a network using one or more services.
Figure 13B:
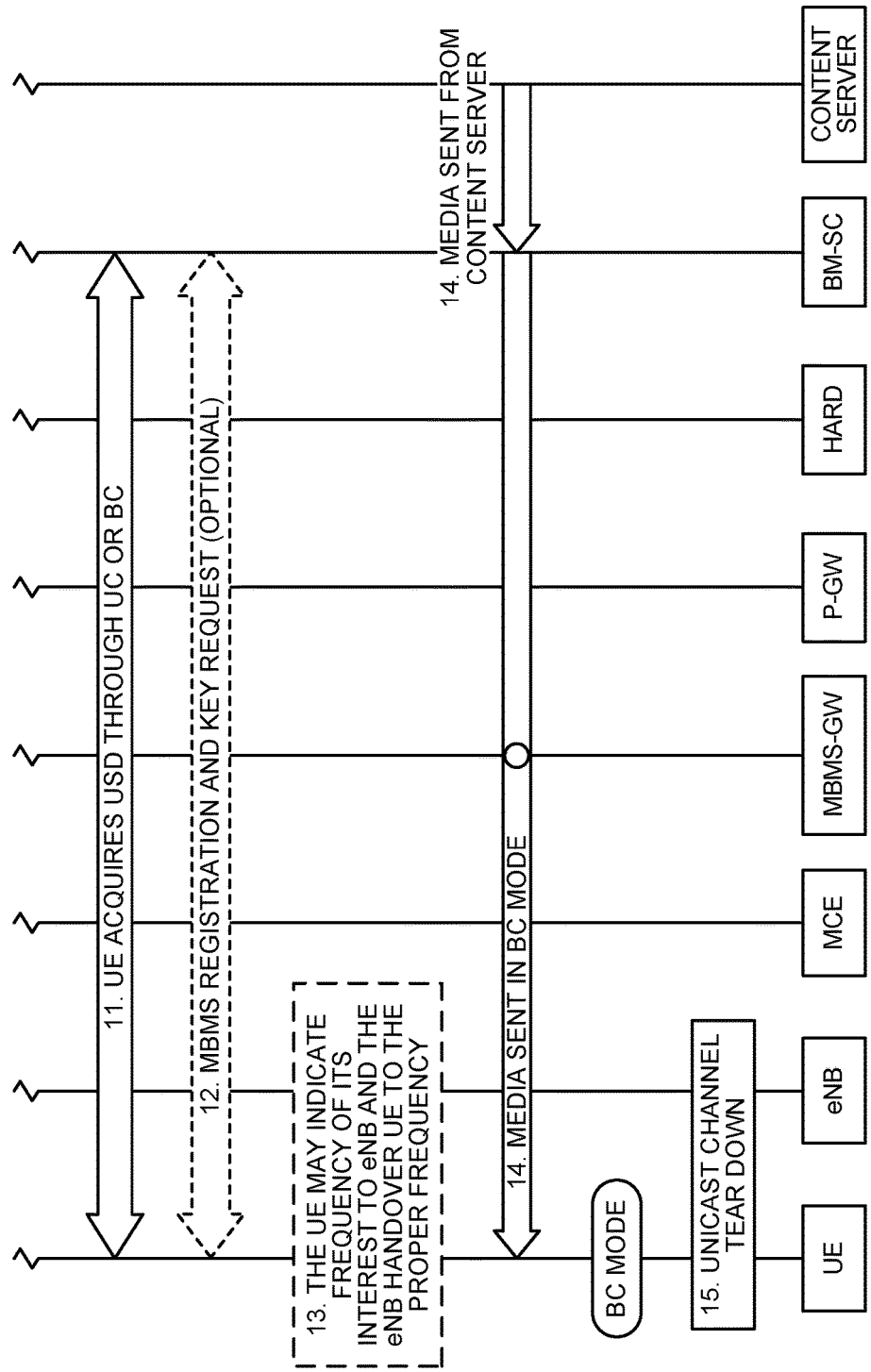

FIGS. 13A and 13B are conceptual diagrams illustrating example operations for obtaining data over a network using one or more services. Specifically, the example of FIGS. 13A and 13B may describe the switching of a non-eMBMS unicast service to an eMBMS broadcast service. In some examples, when switching from a non-eMBMS unicast service to an eMBMS broadcast service, the BM-SC may determine (e.g., receive an indication of) a high attachment rate to a non-eMBMS service. The BM-SC may then activate eMBMS transmission of the service and switch content delivery from unicast delivery to broadcast delivery. Such a transition may occur in accordance with a business agreement enabling a service network provider to convert the various content feeds of a content provider from unicast delivery to broadcast delivery, such as when high demand of a nominal unicast content or service is detected.

In the example of FIGS. 13A and 13B, when an application of the UE starts with a non-eMBMS unicast service, the eMBMS client of the UE may not be activated. In accordance with the techniques described herein, the eMBMS client may be activated in various ways, such as by network redirection that triggers the UE to acquire a USD through unicast or broadcast delivery. For instance, the network redirection may be HTTP/RTSP redirection, OMA Push, or other signaling sent from a network entity.

In the example of FIGS. 13A and 13B, an application of the UE may request a content item. In response to a request from an application (e.g., a streaming or file downloading client), a UE may obtain data via a unicast service using an over the top content (OTT) service or a packet-switched streaming service (PSS). Subsequently, the BM-SC may determine that the non-eMBMS unicast service should be switched to eMBMS transmission of the service. For instance, such a determination may be made based on obtained information, based on an event, and/or based on detection of a high attachment rate of the non-eMBMS unicast service. In some examples, the BM-SC may also utilize the unicast to MBMS switching capability of attached UEs, if such information is known to the BM-SC. As one example of determining that the non-eMBMS unicast service should be switched to eMBMS transmission, a HARD in the network may determine a high attach rate, and indicate the high attach rate to a BM-SC. The BM-SC may determine to setup an eMBMS session in response to receiving the indication. While shown in the example of FIGS. 13A and 13B as separate components, the HARD and the BM-SC may, in some examples, be part of a single component.

After determining to setup the eMBMS session, the BM-SC may broadcast an updated USD. In some examples, the user service may include broadcast and unicast related information. In other examples, the user service may include broadcast related information only. If the BM-SC has already established an eMBMS session for the USD (e.g., a USD broadcast channel), the BM-SC may send the updated USD over the established broadcast channel. In some examples, the BM-SC can establish the eMBMS session for the updated USD or include the updated USD in the unicast to broadcast switching trigger at a later point (e.g., in step nine of FIG. 13A). That is, the BM-SC may make the updated USD available by broadcast, unicast, or other means.

The BM-SC may setup the MBMS session (e.g., as specified in 3GPP Technical Specification 23.246, "Multimedia Broadcast/Multicast Service (MBMS); Architecture and functional description, (Release 12)" v12.1.0, March 2014). In some examples, the BM-SC may setup the MBMS session in parallel with sending the updated USD. An eNB may start an eMBMS session, and the eNB may use MCCH, SIB, or other notification methods to send updates to UEs. That is, the eNB may apply RRC and send updated SIB13 and SIB15 messages if needed. The eNB may perform MCCH change notifications to inform all UEs of the presence of the eMBMS service.

Once the MBMS session has been established, a trigger may be sent (e.g., by a device of the network) to the UEs consuming the non-eMBMS service, indicating the availability of the MBMS User Service for the service or content. For instance, a device of the network may send an indication to cause the UE to switch from unicast consumption to broadcast consumption. In some examples, a device of the network may additionally send a USD update. Subsequent to receiving the MCCH notification or other trigger, the UE may be redirected from using the unicast service to using the broadcast service. That is, for UEs configured in accordance with the techniques described herein, the UE may activate the MBMS client. The UE may initiate service discovery procedures to receive USDs through the broadcast channel, if available, or through the unicast bearer. When the UE has received the USD, is in the proper coverage range, and is consuming the service, the UE may switch from unicast to broadcast reception. The UE may acquire the USD from the BM-SC through either the unicast or the broadcast service. Optionally, the MBMS client of the UE may register with the BM-SC and request a key. That is, if the UE has not registered with the newly-established MBMS service and the USD indicates that service registration is required, the UE may perform MBMS service registration and obtain the service key (e.g., if service protection is enabled). In some examples, the UE may indicate a frequency of its interest to the eNB, and the eNB may perform a handover of the UE to the proper frequency. That is, the UE may determine, from the information received from SIB15 over the air and/or the USD from the BM-SC, that the corresponding MBMS service is being transmitted on a different frequency. Consequently, the UE may send an 'MBMSInterestIndication' message to indicate the UE's desire to switch to the indicated frequency. The eNB may then hand over the UE to the proper frequency. The UE may then update system information from the SIB sent on the new frequency.

The BM-SC may receive content, such as from the content server, and transmit the data using the broadcast service. While shown in the example of FIGS. 13A and 13B as obtaining content from the content server, the BM-SC may, in some examples, obtain the content from a PSS server or other location. In various examples, the BM-SC may obtain content at any time subsequent to establishing the MBMS session. The BM-SC may then send obtained content over the MBMS bearer. Thereafter, the UE may operate in a broadcast mode, and may tear down the unicast channel (e.g., if there is no other unicast service). In the example of FIGS. 13A and 13B, the normative new signaling for various operations, such as some or all of steps three, four, five, six, nine, ten, eleven, and/or other operations may be defined under MooD.

Figure 14:
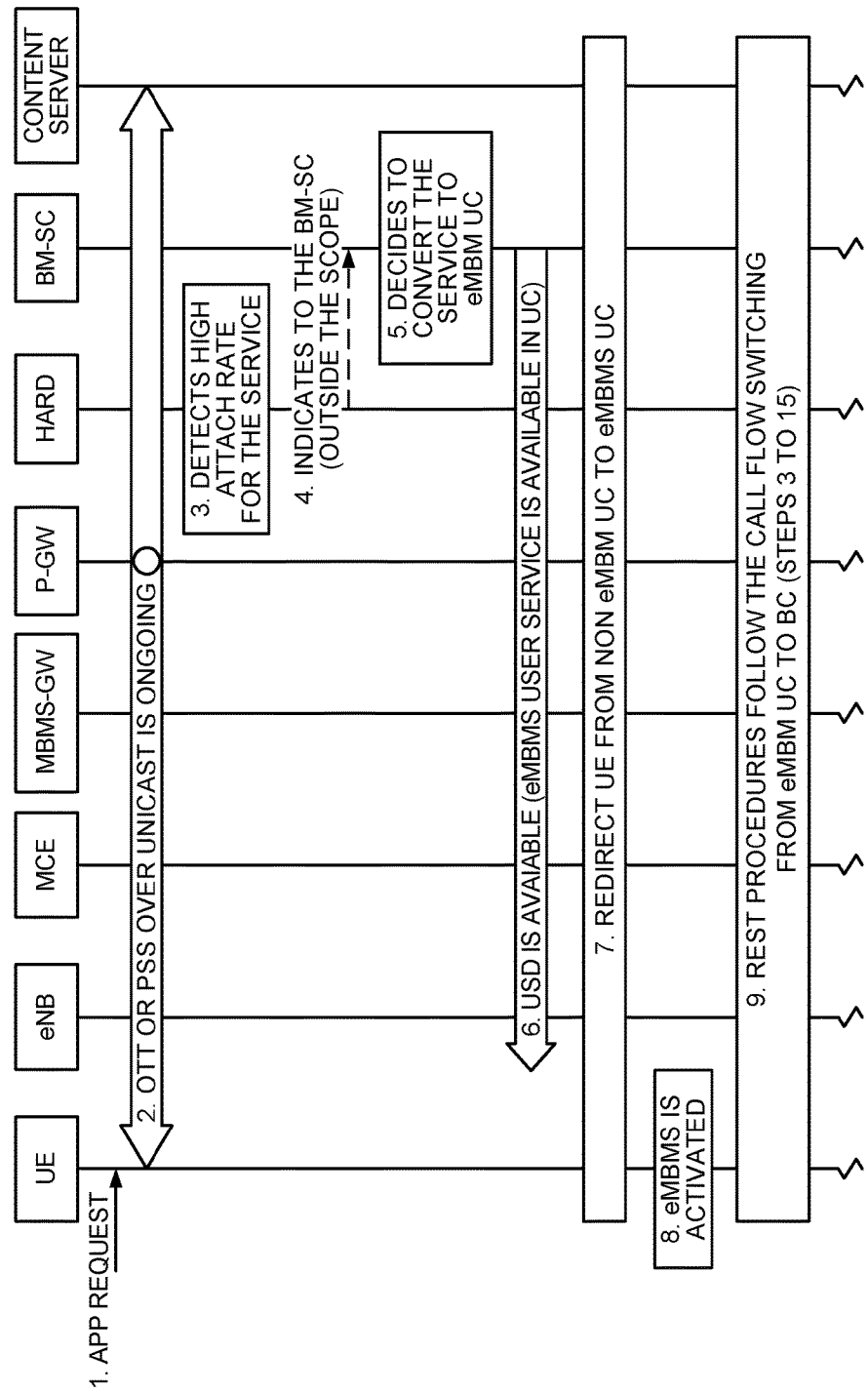
FIG. 14 is a conceptual diagram illustrating example operations for obtaining data over a network using one or more services.

FIG. 14 is a conceptual diagram illustrating example operations for obtaining data over a network using one or more services. In the example of FIG. 14, a UE may receive a request for data (e.g., from a streaming/file downloading client of the UE). The UE may receive data using a unicast service using OTT or PSS. A HARD in the network may detect a high attach rate or high demand for the service, and notify a BM-SC. The BM-SC may convert the unicast service to an eMBMS service over unicast, and send an indication that an updated USD is available (e.g., indicating that the eMBMS unicast service is available). Thereafter, the UE may be redirected from the non-eMBMS unicast service to the eMBMS unicast service. The UE may activate eMBMS and may transition from the eMBMS unicast delivery mode to the broadcast delivery mode as described in steps 3-15 of FIGS. 13A and 13B.

Figure 15A:
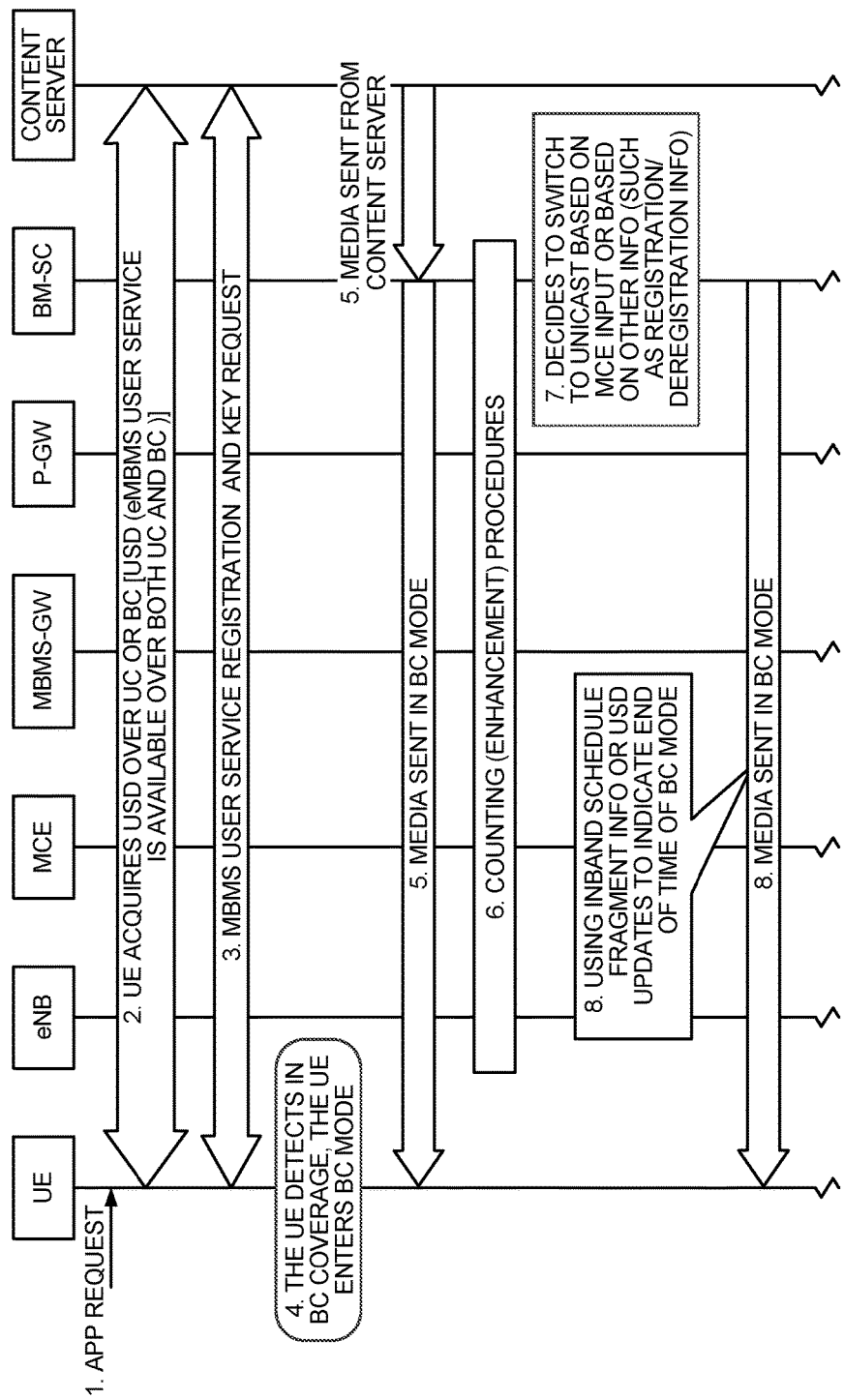
FIGS. 15A and 15B are conceptual diagrams illustrating example operations for obtaining data over a network using one or more services.
Figure 15B:
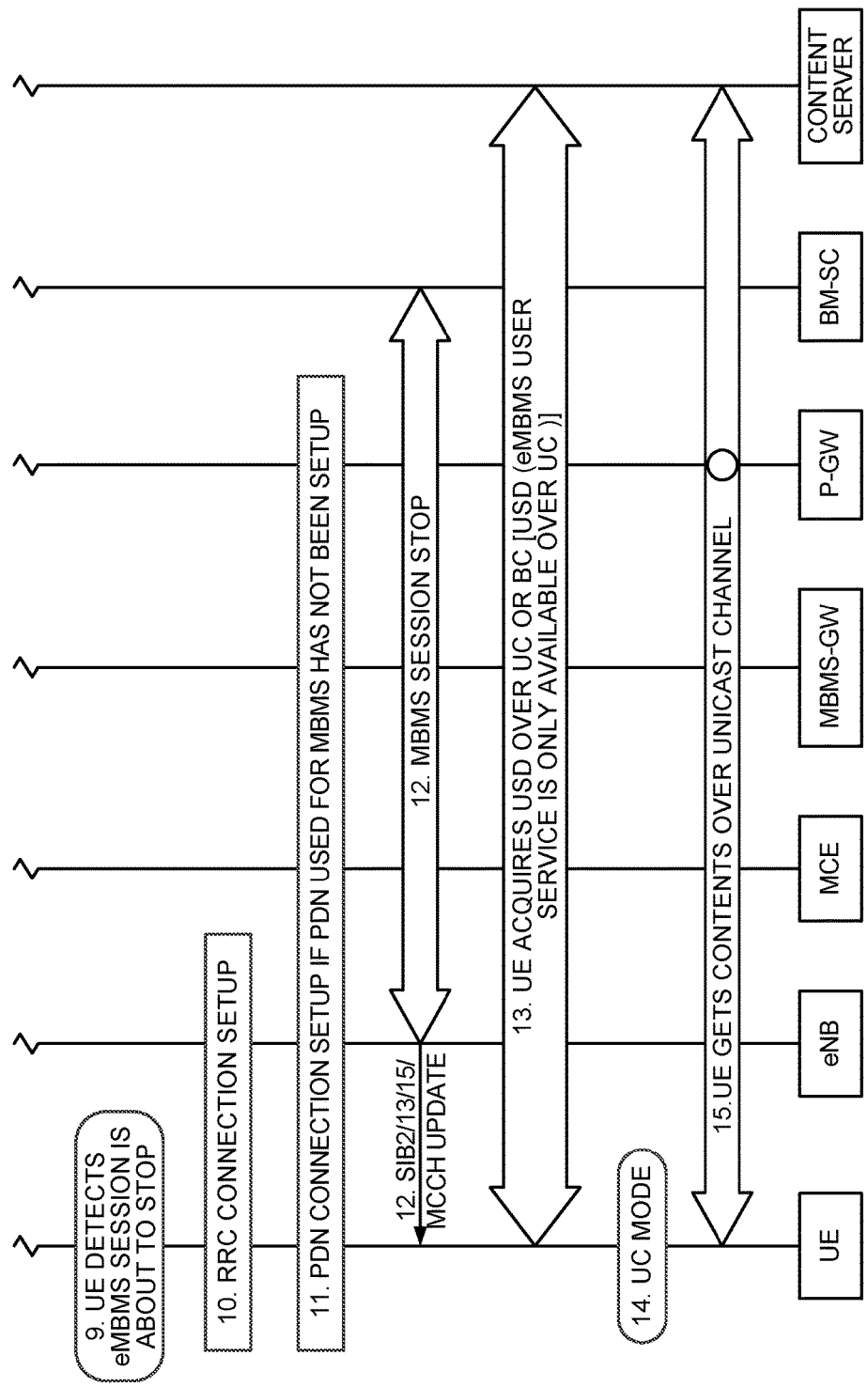

FIGS. 15A and 15B are conceptual diagrams illustrating example operations for obtaining data over a network using one or more services. In steps one to five, the UE may consume content as a regular MBMS user service. In some examples, the service may have initially been a non-MBMS user service. In the example of FIGS. 15A and 15B, in response to a request from an application (e.g., a streaming/file downloading client), a UE may obtain a USD using a broadcast or unicast service. The requested content may be available through an MBMS user service. In some examples, the USD may indicate that eMBMS is available over both a broadcast and unicast delivery mode. In some examples, the USD may indicate that the MBMS User Service is available over both unicast and broadcast delivery modes. In various examples, a USD may indicate that an MBMS user service is only available via broadcast by not including unicast channel related information.

The MBMS unit of the UE may register with the content server, and request a key. As one example, the UE may inform the BM-SC that it wishes to acquire the MBMS user service by MBMS user service registration. That is, the UE may obtain a service key (MSK) if service protection is enabled. In some examples, MBMS user service registration may indicate the UE's consumption intent. In some examples, MBMS user service registration may indicate the UE's intent to be registered for the service to obtain necessary information. Thereafter, the UE may detect that the broadcast delivery mode is available for the media content, and may enter broadcast mode. The BM-SC may receive content from the content server and send the data out via the broadcast delivery mode.

In some examples, subsequent steps of FIGS. 15A and 15B may support MooD aspects. That is, step six and beyond may enable turning an MBMS user service into a non-eMBMS user service. In step six, procedures on the operation of the service may be collected. These procedures may include MCE counting procedures, BM-SC-based counting procedures (e.g., based on registration/de-registration, or on other means), or other operational aspects (e.g., the popularity of the MBMS user service or other non-MBMS services). As one example, the BM-SC may get Radio Access Network (RAN) counting results from the MCE on how many UEs are interested in receiving the broadcast services. At some point, based on the collected information, the BM-SC may determine that the delivery mode should be switched from broadcast delivery to unicast delivery. The BM-SC may make the determination based on counting, on registration/de-registration information, and/or other information (e.g., expiration of a preconfigured timer, etc.). As one example, based on MCE input and/or other information (e.g., registration or registration information) the BM-SC may determine a switch to a unicast service.

After the determination, the BM-SC may indicate that the MBMS transmission is about to stop. The BM-SC may indicate the impending stop in various ways, such as updating the USD, using an in-band Schedule Fragment to indicate the end of MBMS transmission, or in other ways. The UE may receive the indication of the end of time for the broadcast delivery mode (e.g., using inband schedule fragment information or USD updates).

Turning to FIG. 15B, the UE may detect that the eMBMS session is about to stop and may set up a radio resource connection (RRC). The RRC may be established before the MBMS broadcast delivery session end time. The UE may also set up a packet data network (PDN) connection if the PDN was not previously setup. That is, the UE may establish the PDN connection if needed. The BM-SC may stop the broadcast delivery mode, and an eNB may notify the UEs using SIB, MCCH notification, or other notification methods. For instance, the BM-SC may perform MBMS broadcast delivery session stop procedures as specified in 3GPP TS 23.246, "Multimedia Broadcast/Multicast Service (MBMS); Architecture and functional description". In some examples, the BM-SC may update the USD to indicate that the MBMS User Service is only available over unicast delivery mode. In some examples, the MBMS User Service is terminated by the BM-SC by removing the service from the USD.

After the broadcast delivery mode has ceased, the UE may acquire the new USD over broadcast or unicast. The new USD may specify that eMBMS service is only available over a unicast delivery mode. Consequently, the UE may enter a unicast mode and may receive media data via the unicast delivery mode. In the example of FIGS. 15A and 15B, the MooD WI may define normative new signaling for various operations, such as some or all of steps three, six, seven, eight, thirteen, and/or other operations.

Figure 16:
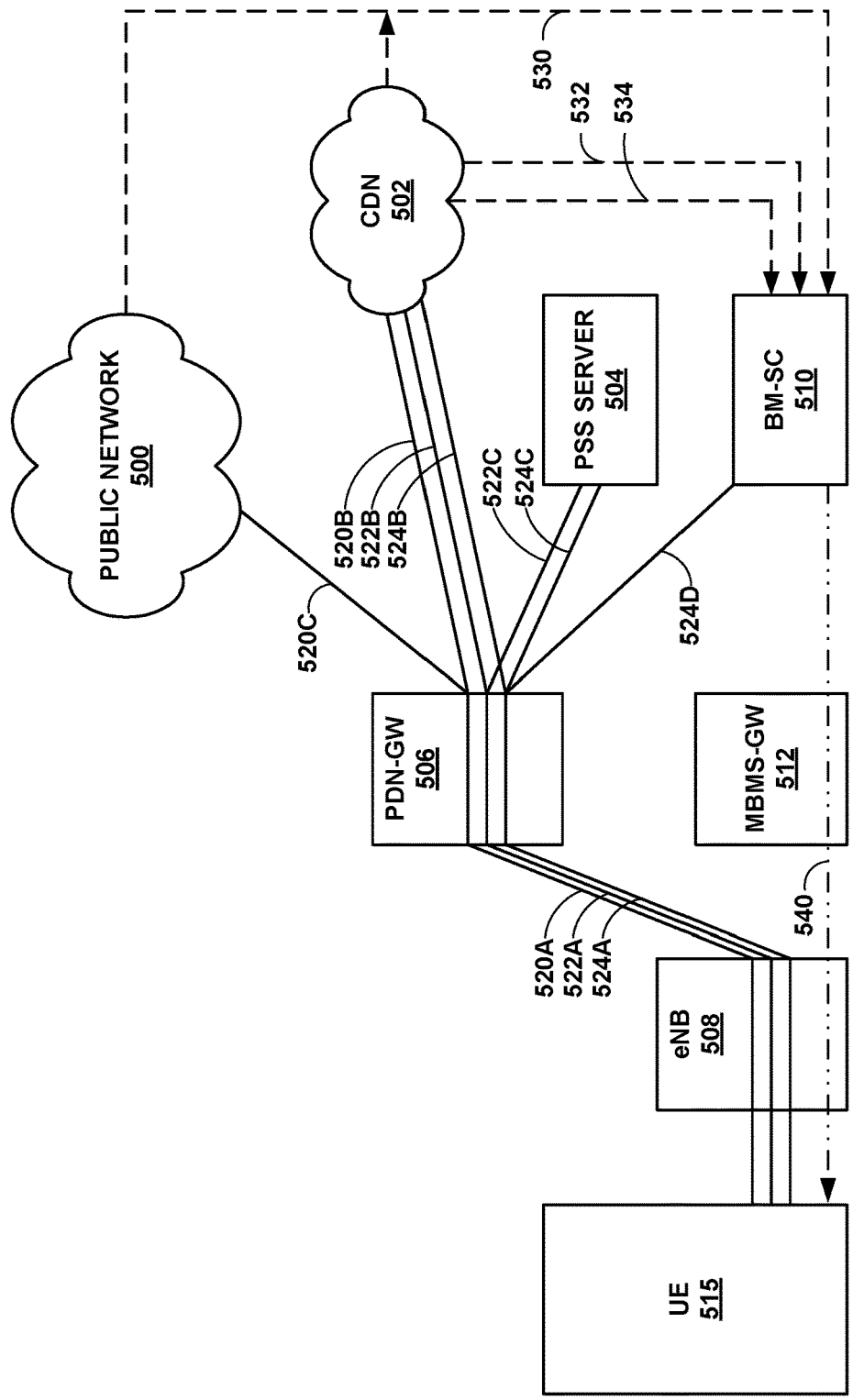
FIG. 16 is a conceptual diagram illustrating an example system for obtaining data over a network using one or more services.

FIG. 16 is a conceptual diagram illustrating an example system for obtaining data over a network using one or more services. The example of FIG. 16 may represent a high level MooD architecture. The example of FIG. 16 represents only one example of a system for performing the techniques described herein, and various other systems may be used in accordance with the present disclosure.

The example of FIG. 16 includes public network 500 (e.g., the Internet), cellular data network (CDN) 502, packet-switched service (PSS) server 504, packet data network gateway (PDN-GW) 506, eNode B (eNB) 508, broadcast and multicast service center (BM-SC) 510, MBMS gateway (MBMS-GW) 512, and user equipment (UE) 515. In some examples, one or more of public network 500, CDN 502, PSS server 504, PDN-GW 506, eNB 508, BM-SC 510, and/or MBMS-GW 512 may represent components of a service provider network, such as a wireless or cellular service provider network. UE 515 may represent the user equipment of a subscriber of the service provider.

In the example of FIG. 16, UE 515 may access various content or services via a unicast delivery through eNB 508 and PDN-GW 506, such as over-the-top (OTT) service 520A, PSS service 522A, and MBMS service 524A. In some examples, MBMS service 524A may be provided using unicastAccessURI. PDN-GW 506 may obtain such services from various sources. For instance PDN-GW 506 may communicate with CDN 502 to obtain OTT service 520B and/or may communicate with public network 500 to obtain OTT service 520C. PDN-GW 506 may communicate with CDN 502 to obtain PSS service 522B and/or may communicate with PSS server 504 to obtain PSS service 522C. PDN-GW 506 may communicate with CDN 502 to obtain MBMS service 524B, may communicate with PSS server 504 to obtain MBMS service 524C, and/or may communicate with BM-SC 510 to obtain MBMS service 524D.

Upon the service provider's determination (e.g., by BM-SC 510) of a high attachment rate of any of OTT service 520A-C, PSS service 522A-C, or MBMS service 524A-D, BM-SC 510 may activate an eMBMS User Service to carry the same content over an MBMS bearer. For instance, BM-SC 510 may communicate with public network 500 and/or CDN 502 to obtain OTT service 530 over unicast delivery and convert the service to broadcast delivery. BM-SC 510 may communicate with CDN 502 to obtain PSS service 532 and/or MBMS service 534 over unicast delivery, and convert the services to broadcast delivery.

Thereafter, BM-SC 510 may provide services 530, 532, and/or 534 via broadcast delivery. UE 515 may obtain one or more of services 530, 532, and/or 534 via MBMS service 540 using the broadcast delivery. In this way, the techniques described herein may allow UEs to obtain content and/or services via multiple delivery modes.

Figure 17A:
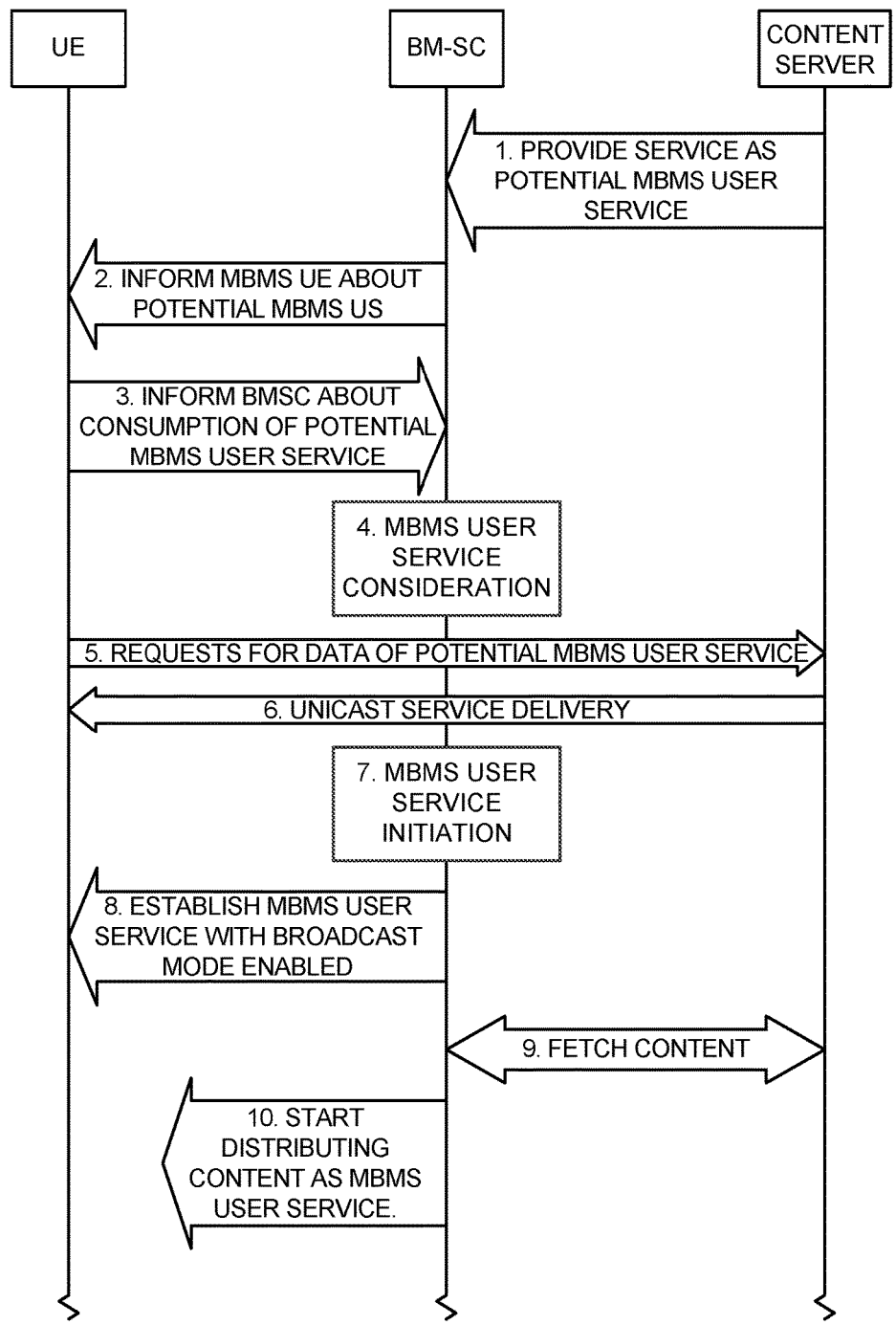
FIGS. 17A and 17B are conceptual diagrams illustrating example operations for obtaining data over a network using one or more services.
Figure 17B:
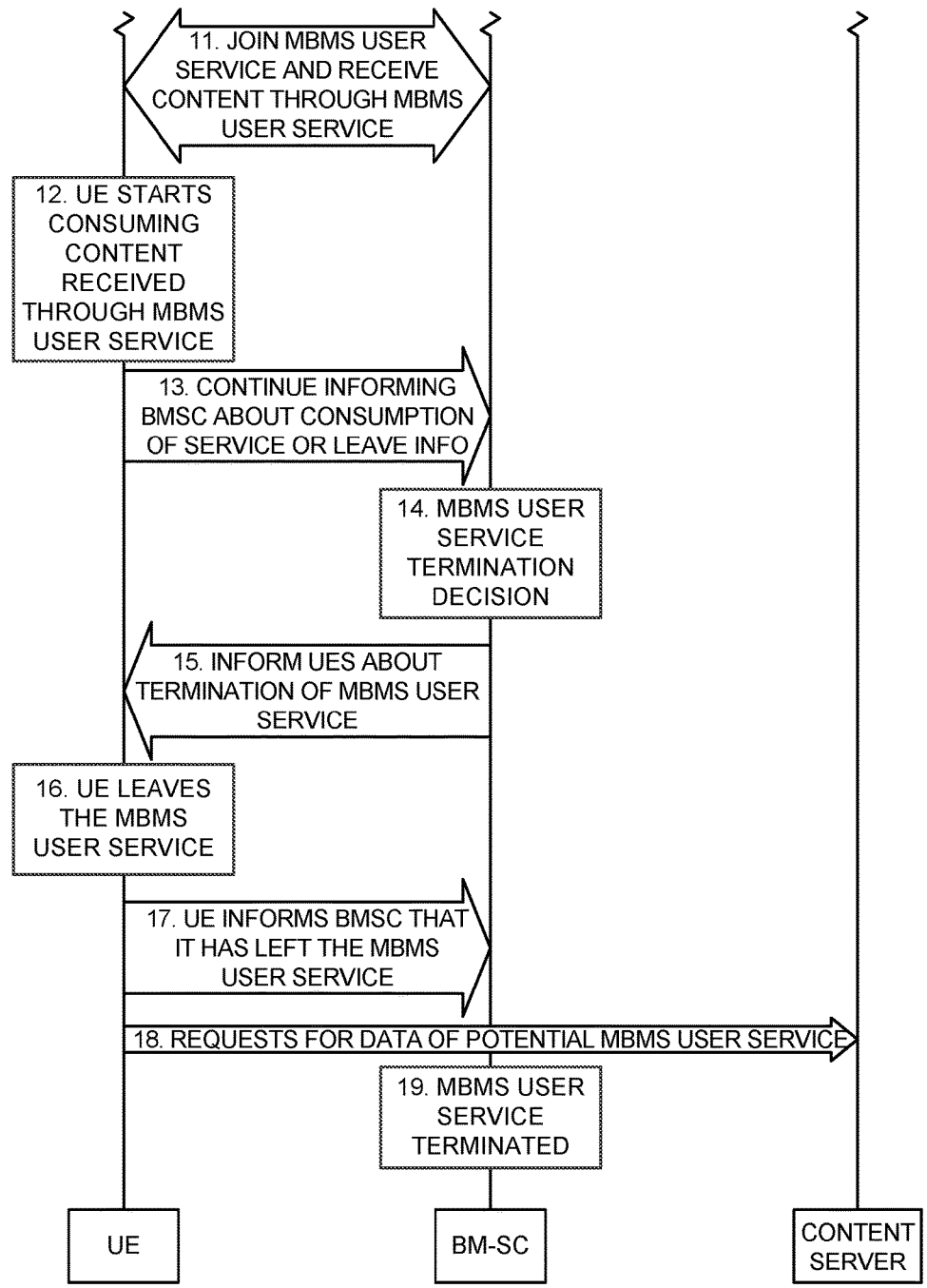

FIGS. 17A and 17B are conceptual diagrams illustrating example operations for obtaining data over a network using one or more services. The example operations of FIGS. 17A and 17B may be used, for example, when a UE supports MooD operation and MBMS-capable UE's may provide at least an indication to the network (e.g., to a BM-SC) of consumption of a service. In some examples, the BM-SC may be central to making decisions regarding unicast, broadcast, and/or multicast delivery modes and/or services. While shown in the example of FIGS. 17A and 17B as a single component, the physical implementation of the BM-SC may be distributed (e.g., using a proxy server for scalable distribution of the unicast content) in various examples. Similarly, while shown in the example of FIGS. 17A and 17B as a single component, the MBMS-capable UE may, in various examples, be split into multiple components, such as an MBMS UE and an application client.

In step one of the example of FIG. 17A, the content server may offer a service, such as streaming media or downloadable content. In some examples, the BM-SC may be made aware that this service is a Potential MBMS User Service. A Potential MBMS User Service may, in some examples, be defined as a non-MBMS User Service that may potentially be migrated to an MBMS User Service. In step two of the example of FIG. 17A, the BM-SC informs MBMS-capable UEs about the Potential MBMS User Service. In step three, the MBMS-capable UE informs the BM-SC about the UE's consumption of the Potential MBMS User Service. In some examples, the UE may continually update the BM-SC about the UE's consumption. In some examples, the UE may additionally include location and/or consumption metadata about the UE. Sending this information may act as implicit consent, by the UE, to the BM-SC migrating the Potential MBMS User Service to an MBMS User service. Such migration may be handled by the UE in one or more of the following manners: by direct registration for the service; or by indirect registration using regular data requests (e.g., requests for the Potential MBMS User Service). In some examples, the manner in which the UE informs the BM-SC of the UE's consumption of the Potential MBMS User service and/or the manner in which the UE's handles the migration may depend on scalability considerations.

In step four of FIG. 17A, the BM-SC determines whether the Potential MBMS User Service should be migrated to an MBMS User Service. The BM-SC may use the information from the registration and/or other information to make the determination. In some examples, such determination may happen regularly throughout the Potential MBMS User Service. That is, the BM-SC may make the determination periodically (e.g., every 5 seconds, every 30 seconds, etc.), after each UE initiates or terminates consumption of the Potential MBMS User Service, or at some other interval. In step five, the UE requests data from the Potential User Service by communicating directly with the content server or by using the BM-SC as a proxy for the request (e.g., the BM-SC may forward requests to the content server). In step six, the UE receives the requested data as a regular unicast service.

In step seven of FIG. 17A, the BM-SC may, at some point in time, determine that the content would be more efficiently provided via a broadcast mode and may initiate an MBMS User service for the Potential MBMS User service. In step eight, the BM-SC establishes the MBMS User Service with broadcast mode and informs the MBMS-capable UEs that are consuming the content about the availability of the content via the MBMS User Service. In step nine, the BM-SC begins retrieving the content from the Content Server. In step ten, the BM-SC starts distributing the retrieved content over the established MBMS User Service, typically with broadcast mode enabled.

Turning now to FIG. 17B, in step eleven, the UE joins the MBMS User Service and begins receiving the content through the MBMS User Service. In step twelve of FIG. 17B, the UE starts consuming the content received through the MBMS User Service. In step thirteen, the UE may continuously inform (e.g., taking account scalability) the BM-SC about the consumption of the service. In some examples, the UE may also provide an indication of de-registration for the service. In step fourteen, the BM-SC may determine that it is no longer most efficient to deliver the content via the MBMS User Service. The BM-SC may use the information received from the UEs, such as registration information, and/or other information.

In step fifteen of FIG. 17B, the BM-SC informs the UEs consuming the MBMS User Service about the termination of the MBMS User Service. In step sixteen, the UE leaves the MBMS User service. In step seventeen, the UE informs the BM-SC that it has left the MBMS User service. In step eighteen, the UE starts one again requesting data of the Potential MBMS User Service through unicast (e.g., by communicating directly with the content server or by using the BM-SC as a proxy for the request). In step nineteen, the BM-SC terminates the MBMS User service but continues to provide the Potential MBMS User Service. In the example of FIGS. 17A and 17B, the MooD WI may define normative new signaling for various operations, such as steps two, three, eight, thirteen, seventeen, and/or other operations.

In one or more of the examples described, a BM-SC may be able to provision a demand-based eMBMS service in substitution of, or in addition to, unicast delivery of the same service or content. In some examples, the BM-SC, upon having dynamically transitioned the unicast service to an MBMS User Service, may offer service delivery over unicast bearers only, over MBMS bearers, or over both bearer types. In some examples, the BM-SC may be capable, in a scalable manner, of providing indication to the UE of each service that is eligible to be switched between a non-MBMS unicast service and an MBMS User Service. Upon obtaining awareness of a low attachment rate/volume to broadcast delivery of an existing MBMS User Service, the BM-SC may, in some examples, deactivate the MBMS User Service. Upon obtaining awareness of a low attachment rate/volume to broadcast delivery of an existing MBMS User Service, the BM-SC may, in some examples, restrict the MBMS User Service to a unicast-only delivery mode.

One or more of the examples described may provide the necessary signaling required to inform UEs of available services and delivery modes. One or more of the examples described may provide a scalable solution, both in terms of number of potential MBMS User Services and in terms of UEs involved when operating in unicast mode and in broadcast mode. One or more of the examples described may provide for efficient use of uplink and/or downlink resources. One or more of the examples described may take into account relevant regulatory and privacy considerations. One or more of the examples described may reuse existing MBMS features, to the extent possible, including features developed in other work items during Rel-12, such as enhanced MBMS operation. One or more of the examples described may additionally or alternatively reuse other existing features such as common web technologies and HTTP features.

One or more of the examples described may minimize the impact on users when migrating from a potential MBMS user service to an actual MBMS user service. One or more of the examples described may provide the ability to run an MBMS User Service in a broadcast-only mode and/or in a broadcast-and-unicast mode. One or more of the examples described may be enabled for DASH over MBMS as well as MBMS download delivery services that may be augmented by associated delivery procedures providing repair through regular HTTP servers. One or more of the examples described may allow for maintaining the formats of a potential MBMS User Service when moving the service to an actual MBMS User Service (e.g., without transcoding to MBMS User Service formats). One or more of the examples described may operate with minimum processing overhead for the BMSC and other network components. One or more of the examples described may be efficient in terms of overhead, network usage, and UE battery consumption.

Figure 18:
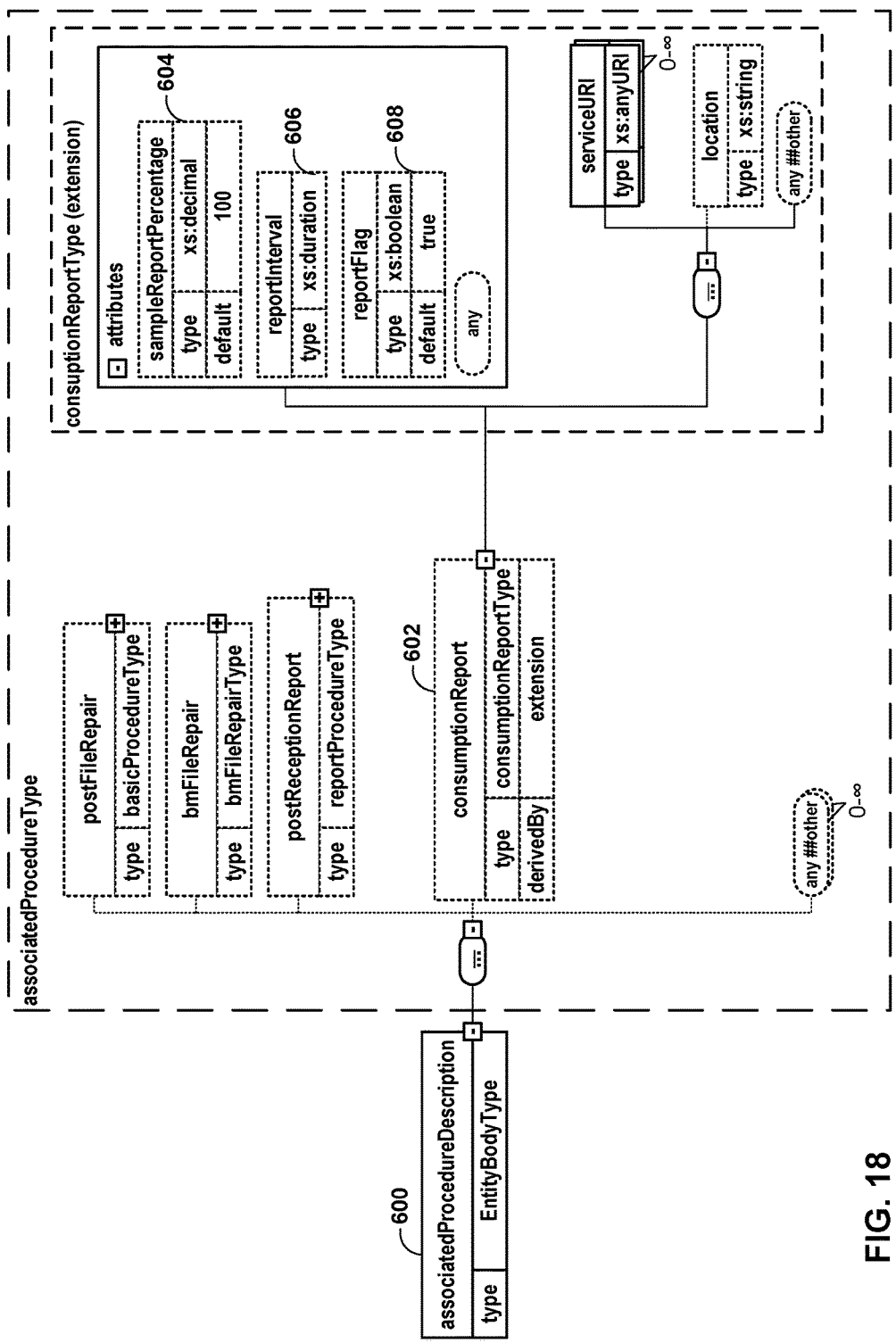
FIG. 18 is a conceptual diagram illustrating one example of an entity for consumption reporting.

FIG. 18 is a conceptual diagram illustrating one example of an entity for consumption reporting. The example of FIG. 18 may represent one entity usable to determine or assist in determining the consumption of a service (e.g., a unicast, broadcast, or multicast service) and thereby more accurately determine whether a service would be more efficiently provided via unicast, broadcast, and/or multicast transmission. The example of FIG. 18 may provide an MBMS service operator (e.g., a service provider network) with more accurate knowledge of the ongoing demand for an MBMS user service, and thus the operator may be able to better determine whether to terminate the MBMS user service, or temporarily switch to unicast-only delivery of the service.

In some examples, it may be beneficial for a network to disable MBMS transmission when the number of UEs consuming the MBMS user service is below a certain threshold (e.g., preconfigured by the service provider network) in a particular area. Various example methods for determining when to terminate an MBMS user service may be used. In the example of FIG. 18, determining when to terminate an MBMS user service may be based at least in part on an MBMS service consumption reporting method. Such a method may be defined as an extension to the Associated Delivery Procedure (ADP) description to signal the requirement for MBMS user service consumption reporting by UEs or may be defined as an extension to the existing reception report (e.g., by specifying a new report type).

FIG. 18 includes one example extension of the Associated Procedure Description (APD) 600 that contains MBMS service consumption reporting parameters 602. Via extension of APD 600, a BM-SC may specify the percentage subset of MBMS receivers to perform MBMS User Service Reporting in sampleReportPercentage attribute 604. The BM-SC may specify the frequency at which the UE should report in reportInterval attribute 606. The BM-SC may also specify whether the UE is required to report when it starts or stops receiving the MBMS user service in USD in reportFlag attribute 608.

If sampleReportPercentage attribute 604 is provided for an MBMS user service and the value is less than 100, the UE may generate a random number which is uniformly distributed in the range of 0 to 100. The UE may send the MBMS user service report periodically (e.g., according to the report frequency specified in reportInterval attribute 606) when the generated random number is of a lower value than the value of sampleReportPercentage attribute 604.

If reportFlag attribute 608 is set to "true," the UE may send the MBMS user service report when the UE starts (e.g., including when the UE moves into MBMS coverage) or stops (e.g., including when the UE moves out of eMBMS coverage) receiving the MBMS user service. In some examples, such as to avoid excessive fluctuation of reporting (e.g., due to user misbehavior in quick succession of turning on and off the MBMS service application or due to the UE being located near the border of MBMS coverage and repeatedly gaining and losing coverage), the UE may implement a hysteresis based algorithm to reduce consumption reporting.

When a UE sends the MBMS user service report, it may indicate its location to the BM-SC (for example, service area identity (SAI), Cell Global Identity (CGI) or Evolved Cell Global Identity (ECGI), based on MooD configuration).

In other example methods for determining when to terminate an MBMS user service, a device of the network may disable MBMS transmission upon expiration of a preconfigured timer. The timer-based mechanism may be suitable for use when a prior decision to turn on MBMS transmission was initiated by a specific event. In another example, a device of the network may use MCE counting procedures to determine when to terminate the MBMS user service. For instance, after the MCE detects the number of UEs that are interested in an MBMS user service falls below a certain threshold (e.g., 100 UEs, 1000 UEs, etc.) the MCE may send a notification to the BM-SC. In some examples, however, MCE counting may not include UEs that are receiving the MBMS user service in an idle state. Moreover, MCE counting is within the scope of 3GPP RAN2. An improved solution for MCE counting may enhance current RAN counting to include those UEs in an RRC IDLE state in addition to those in an RRC CONNECTED state. Additionally or alternatively, the improved MCE counting may allow UEs to autonomously report when the UE starts or stops consumption of a given MBMS user service. The improved MCE counting may allow UEs to periodically report consumption of a given MBMS user service. Finally, the improved MCE counting may enable the sending of RAN counting measurements to a BM-SC in the network.

As another example of determining when to terminate an MBMS user service, a BM-SC-based counting procedure based on MBMS user service registration/de-registration may be used. In some examples, the semantics of MBMS user service registration may refer to an end-user's consumption intent, and may not indicate whether a UE is actually consuming (e.g., performing reception of) the eMBMS user service.

While shown in the example of FIG. 18 as consumption-Reporting parameters 602, techniques of the present disclosure may, in some examples, extend APD 600 by including MBMS service consumption reporting parameters under the reportProceduresType of APD 600. In some examples, some parameters (e.g., samplePercentage) may be reusable for MBMS service consumption reporting.

Figure 19:
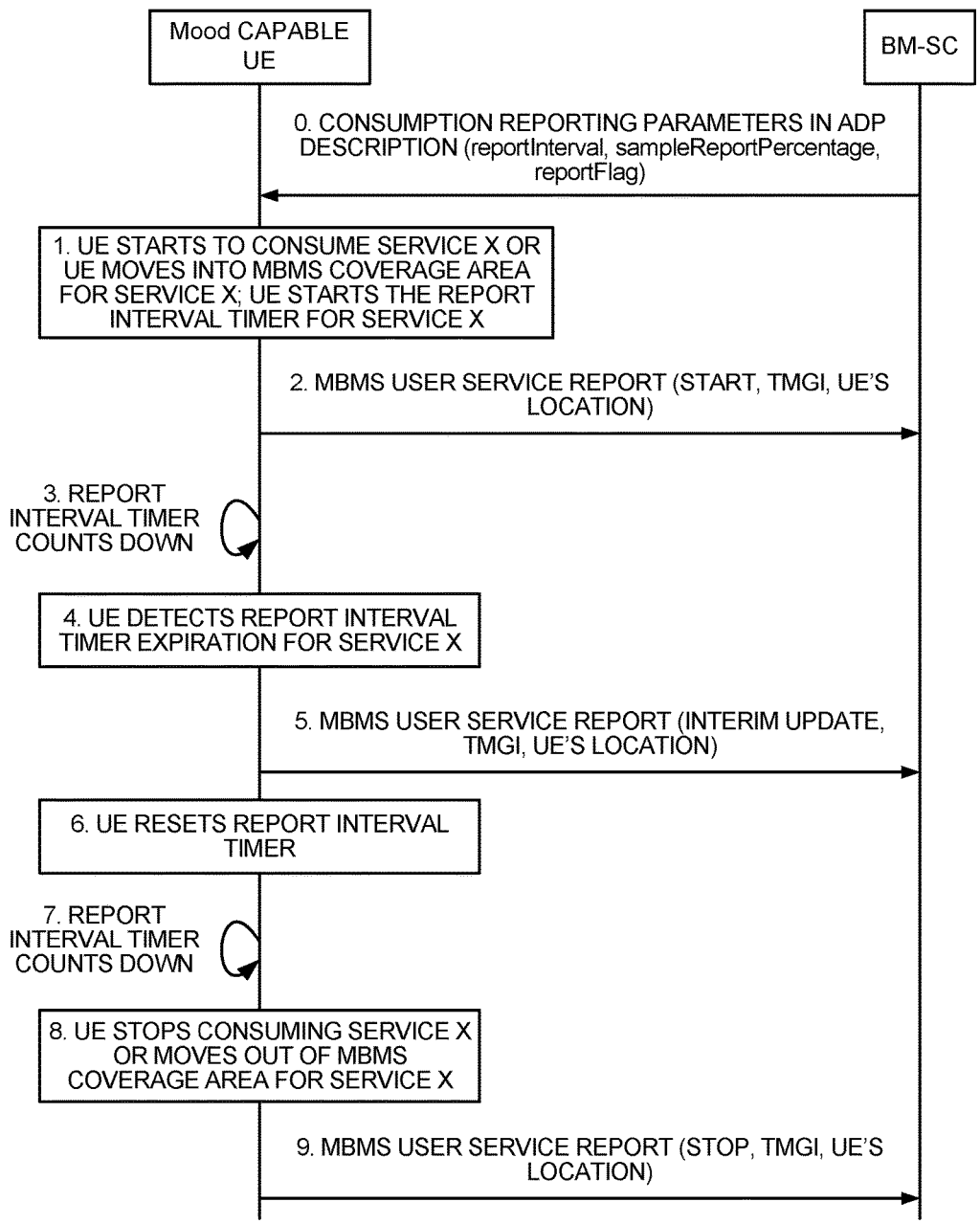
FIG. 19 is a conceptual diagram illustrating example operations for consumption reporting.

FIG. 19 is a conceptual diagram illustrating example operations for consumption reporting. The example operations of FIG. 19 may represent one possible call flow between a MooD capable UE and a BM-SC for providing MBMS user service consumption reporting.

Initially, the BM-SC may send consumption reporting parameters to the Mood capable UE (e.g., as an extension to an ADP Description). In the example of FIG. 19, the consumption reporting parameters may include a report interval, a sample report percentage, and a report flag. Various other parameters may be included in other examples. In step one of the example of FIG. 19, the UE may begin consuming content (e.g., Service X) via an MBMS user service. For instance, the UE may switch from a unicast delivery of Service X to the MBMS user service in accordance with the techniques described herein. As another example, the UE may enter MBMS coverage area for Service X. In step one, the UE may start the Report Interval Timer corresponding to Service X.

In step two of the example of FIG. 19, the UE may send an MBMS User Service Report to the BM-SC. The MBMS User Service Report may include an indication that the UE has started consuming Service X via the MBMS user service (e.g., by indicating that the type of the MBMS User Service Report is a "start" type), a TMGI, and a location of the UE. In step three of the example of FIG. 19, the UE may continue to count down the Report Interval Timer while consuming Service X over the MBMS user service. In step 4, the UE may detect that the Report Interval Timer corresponding to Service X has expired. Consequently, in step 5, the UE may send another MBMS User Service Report, including an indication that the Report is an interim update (e.g., the Report is of an "interim Update" type), the TMGI, and the location of the UE. After sending the MBMS User Service Report, the UE may, in step six, reset the Report Interval Timer corresponding to Service X. In step seven, the UE may once again count down the Report Interval Timer.

As the UE continues consuming Service X, steps four through seven may repeat a number of times. In step 8 of FIG. 19, the UE may stop consuming Service X. For instance, the UE may cease executing an application that was receiving Service X, or the UE may move out of the MBMS coverage area for Service X. In step 9 of FIG. 19, the UE may send another MBMS User Service Report to the BM-SC, including an indication that the UE has stopped consuming Service X via the MBMS user service (e.g., by indicating that the Report is of a "stop" type), as well as a TMGI and a location of the UE. By sending MBMS User Service Reports to the BM-SC, UEs may provide the BM-SC with more accurate information for determining whether to provide content via unicast, broadcast, and/or multicast delivery modes.

Figure 20A:
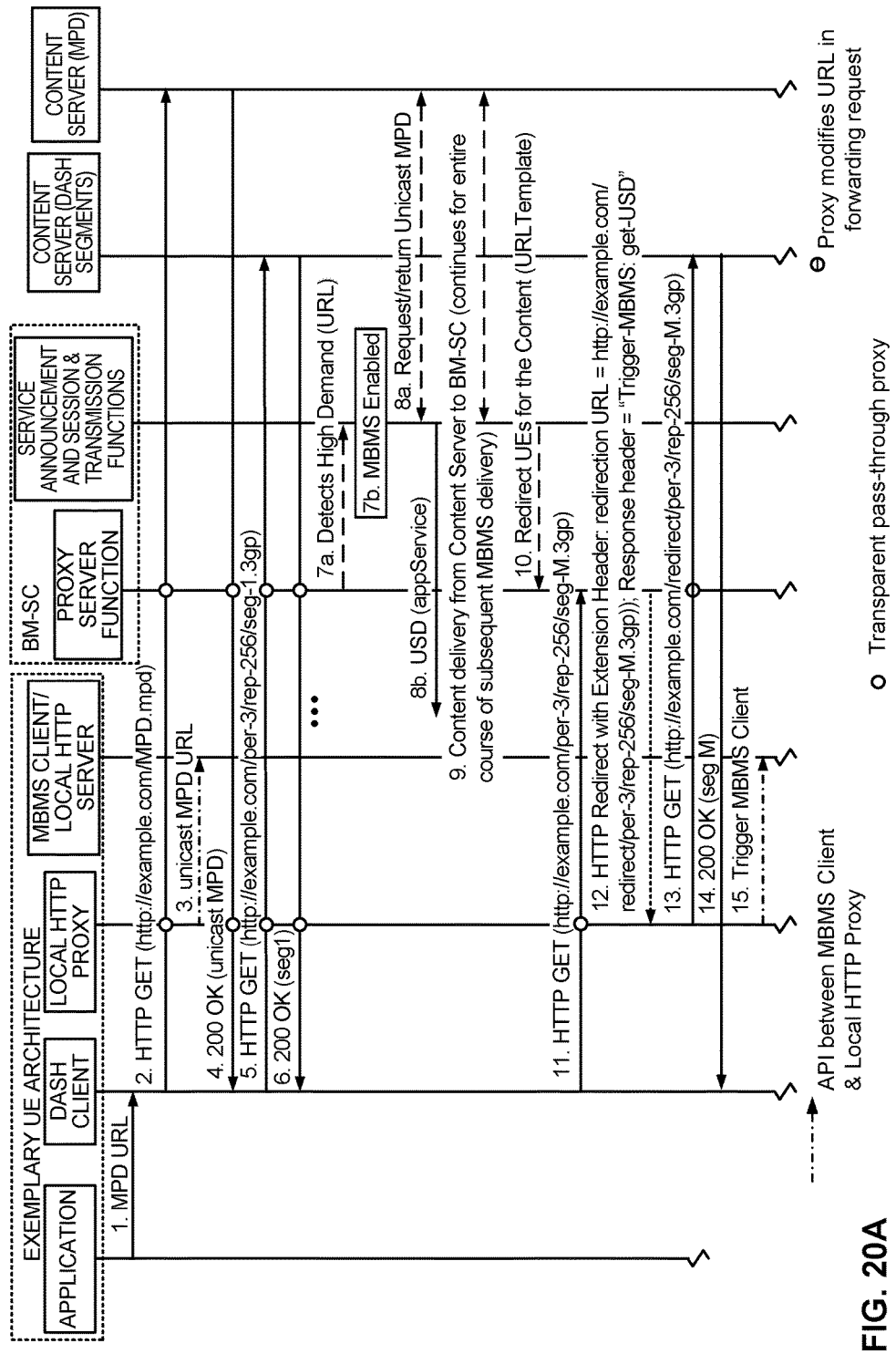
FIGS. 20A and 20B are conceptual diagrams illustrating example operations for obtaining streaming media data selectively using one or more services.
Figure 20B:
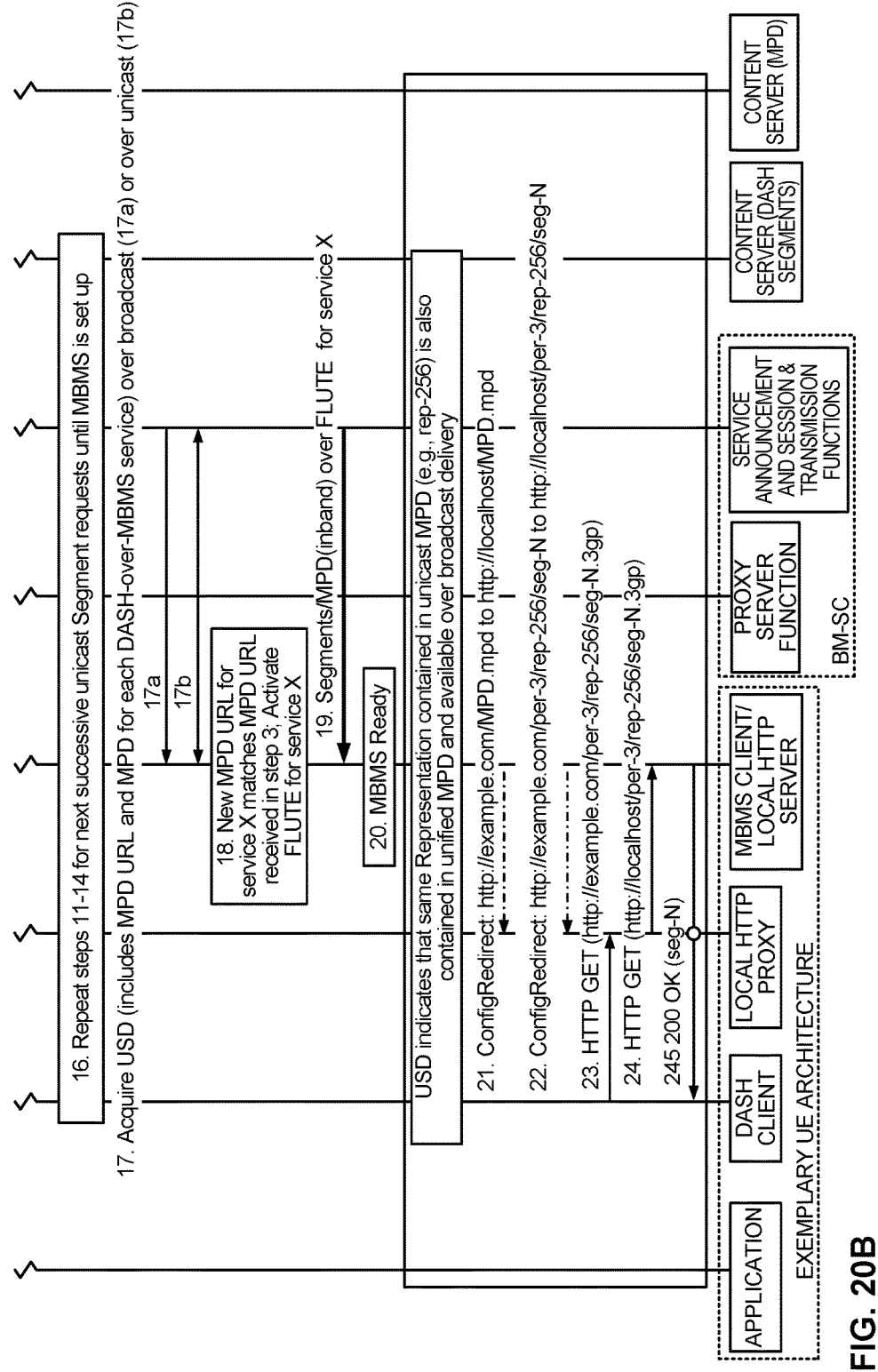

FIGS. 20A and 20B are conceptual diagrams illustrating example operations for obtaining streaming media data selectively using one or more services. The example operations of FIGS. 20A and 20B are described below within the general context of system 200 of FIG. 4, but may be performed by other systems in various examples. In the example of FIGS. 20A and 20B, streaming/file downloading client 210 may be a DASH client, MBMS unit 212 may be an MBMS client (e.g., MBMS middleware) and a local HTTP server, and proxy unit 213 may be a local HTTP proxy. Furthermore, in the example of FIGS. 20A and 20B, BM-SC 206 and redirection/proxy unit 205 may be represented as part of a single BM-SC unit, including a proxy server function and service announcement and session & transmission functions. App server 202 may be a content server capable of providing DASH segments as well as a content server providing an MPD.

In accordance with one or more techniques of the present disclosure, application 208 may obtain media data using streaming/file downloading client 210 (e.g., using the DASH protocol). For instance, application 208 may send streaming/file downloading client 210 a URL indicating a location of a manifest file (e.g., an MPD) that, in turn, defines one or more resource locations for retrieving media data according to a first service (e.g., unicast). Streaming/file downloading client 210 may obtain the MPD by sending an HTTP GET request to application server 202 (e.g., through proxy unit 213). Proxy unit 213 may allow the HTTP GET request to pass through to application server 202 via IP stack 214, modem 216, P-GW 204, and redirection/proxy unit 205. In the example of FIG. 20A, proxy unit 213 may also send an indication of the MPD URL to MBMS unit 212 (e.g., by calling an API).

Application server 202 may receive the HTTP GET request, and send a 200-type HTTP OK message in response. The OK message may pass through the BM-SC proxy server as well as the local HTTP proxy without modification. The OK message may include the unicast MPD. Streaming/file downloading client 210 may receive the MPD and determine a representation, a period, and a segment of media data to obtain (e.g., Period 3, Representation 256, Segment 1). Based at least in part on the MPD, streaming/file downloading client 210 may look up a URL for the determined segment and send an HTTP GET request with the determined URL (e.g., "http://example.com/per-3/rep-256/seg-1.3gp"). The HTTP GET request may pass through the local HTTP proxy and the BM-SC proxy server function without modification.

Application server 202 may receive the GET request and, in response, may send a 200-type HTTP OK message including the requested media data (e.g., "seg1"). The HTTP OK message may pass through the BM-SC proxy server function and the local HTTP proxy without modification. In this way, streaming/file downloading client 210 may obtain streaming media data from application server 202 using a unicast service.

On the network side, the proxy server function of BM-SC 206 may detect a high demand for the unicast service. In response, BM-SC 206 may enable an MBMS (e.g., a broadcast) service for the content. BM-SC 206 may request and receive the unicast MPD for the content from application server 202. BM-SC 206 may then broadcast a user service description (USD) that includes a common MPD and/or other parameters. Throughout the course of subsequent MBMS delivery of the content, BM-SC 206 may continue to request and receive content from application server 202. After enabling the MBMS user service, BM-SC 206 (and/or redirection/proxy unit 205) may utilize the proxy server function to redirect UEs for the content.

Thereafter, streaming/file downloading client 210 may continue sending HTTP GET requests for media data, such as a request for segment M, including the corresponding URL from the original MPD (e.g., "http://example.com/per-3/rep-256/seg-M.3gp"). The GET requests may pass through the local HTTP proxy without modification. However, when the proxy server function of BM-SC 206 (e.g., redirection/proxy unit 205) receives the GET request for segment M, BM-SC 206 may send, in the example of FIG. 20A, an HTTP redirection message to the UE. The redirection message may include an extension header, including a redirection URL and/or a response header to indicate to local proxy unit 213 to register with MBMS unit 212. The redirection URL may represent a different location for the same requested resource. For instance, if the original request URL is http://example.com/per-x/rep-y/seg-z.3gp, the redirection URL might be http://example.com/redirect/per-x/rep-y/seg-z.3gp. The 3GPP-defined HTTP extension header might be named "Trigger-MBMS" with the value "Get-USD," in which case the HTTP response message to the content request by the UE may be accompanied by the response header, "Trigger-MBMS: Get USD."

Local proxy unit 213 may receive the HTTP redirect and send an HTTP GET request for the indicated media data (e.g., segment M) to the URL specified in the redirect. Proxy server function of BM-SC 206 may direct the HTTP GET request to the application server 202 to retrieve the segment. In some examples proxy server function of BM-SC 206 may receive the HTTP GET request sent to the new URL and forward the unmodified request on to application server 202. In some examples, proxy server function of BM-SC 206 may receive the HTTP GET request sent to the new URL and modify the request to direct the request to the original URL. That is, in some examples proxy server function of BM-SC 206 may allow the request to pass through to the redirection URL (e.g., when application server 202 is configured to handle requests directed to the redirection location) while in other examples, proxy server function of BM-SC 206 may forward the request to the normal URL (e.g., so that application server 202 does not need to be configured to handle requests directed to the redirection location). Application server 202 may receive the HTTP GET request and send a 200-type HTTP OK message that includes the requested segment. In this way, the local HTTP proxy may ensure that the content requested by the DASH client is received while the UE transitions to receiving content via the MBMS service.

In response to receiving the HTTP redirect, local proxy unit 213 may communicate (e.g., via an API) with the MBMS client/local HTTP server 212 to trigger the MBMS client (e.g., initiate receipt of the content via the MBMS service).

Turning now to FIG. 20B, the UE may continue to obtain the content while the MBMS session is set up by sending HTTP GET messages, receiving HTTP redirects, sending corresponding HTTP GET messages to the URL specified in the redirect, and receiving the requested content. After receiving the trigger from local proxy unit 213, MBMS client/local HTTP server 212 may acquire an updated USD (e.g., specified in the HTTP redirect received from BM-SC 206). The USD may be acquired via broadcast or unicast. After acquiring the USD, MBMS client/local HTTP server 212 may determine that the new MPD URL for the service (e.g., Service X) matches the MPD URL received for the unicast service. Consequently, MBMS client/local HTTP server 212 may activate a FLUTE session for Service X.

BM-SC 206 may send segments and/or an MPD for Service X over FLUTE. MBMS client/local HTTP server 212 may receive sufficient content and determine that the MBMS User Service is set up. If the USD indicates that the same representation contained in the unicast MPD (e.g., rep-256) is also contained in the unified MPD, and the representation is available over broadcast delivery, MBMS client/local HTTP server 212 may communicate with local proxy unit 213 (e.g., using an API) to configure local proxy unit 213 to redirect requests for Service X content to MBMS client/local HTTP server 212. That is, MBMS client/local HTTP server 212 may cause local proxy unit 213 to redirect requests for an MPD of Service X to an MPD at MBMS client/local HTTP server 212, and may cause local proxy unit 213 to redirect requests for segments of Service X to segments of Service X at MBMS client/local HTTP server 212.

Thereafter, when streaming client 210 sends an HTTP GET request for a particular segment (e.g., segment N), local proxy unit 213 may redirect the request to MBMS client/local HTTP server 212. MBMS client/local HTTP server 212 may receive the request and send segment N as part of a 200-type HTTP OK message.

Figure 21:
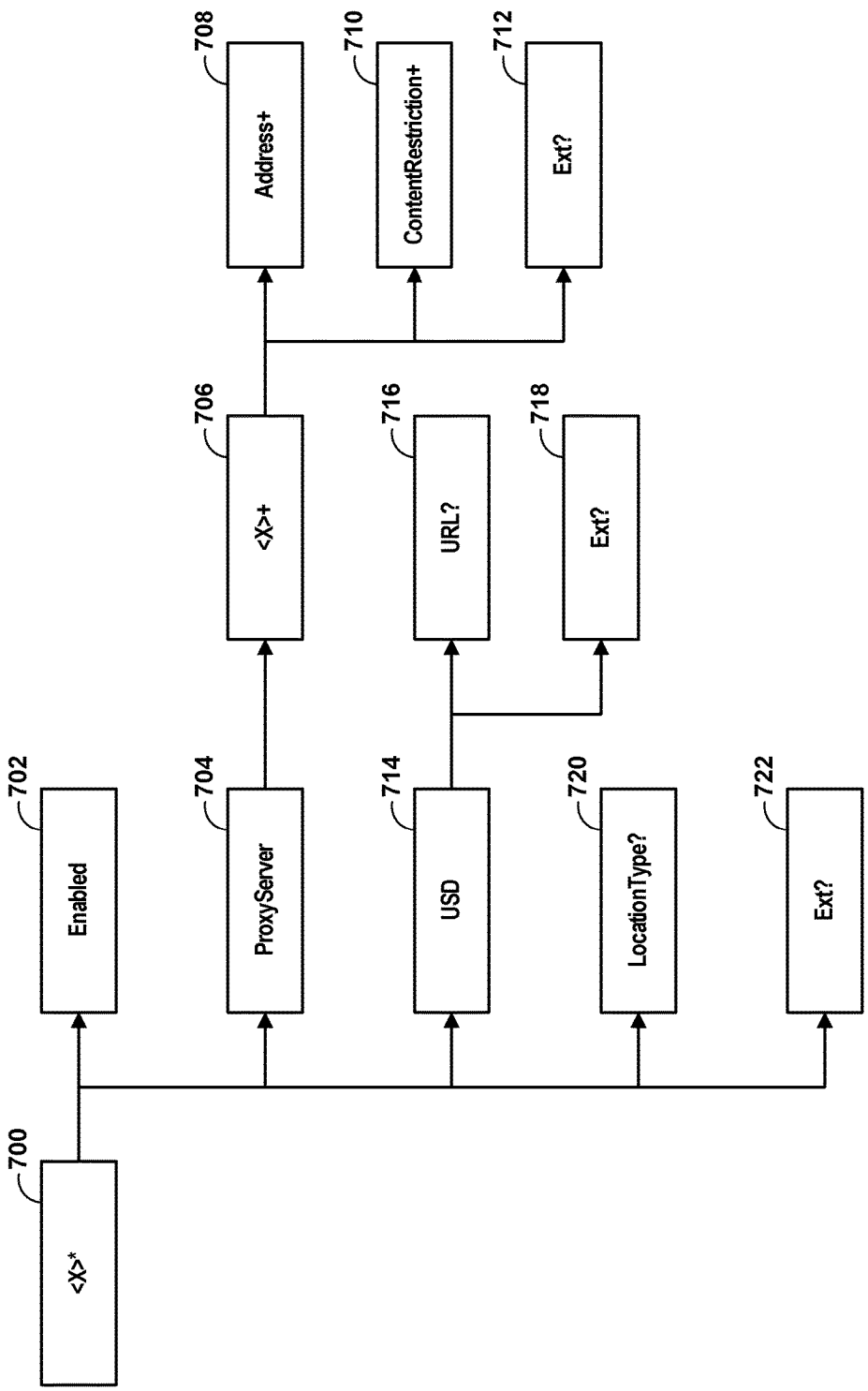
FIG. 21 is a conceptual diagram illustrating one example of a management object for MBMS operation on demand configuration.

FIG. 21 is a conceptual diagram illustrating one example of a management object for MooD configuration. In some examples, the management object of FIG. 21 may be included in a header of an HTTP redirection sent to a UE, thereby indicating to the UE that streaming data is available over a broadcast and/or multicast service. In some examples, OMA-DM may be used to specify the MooD configuration information. If such a DM configuration object exists on the UE, the UE may use it whenever it elects to support MBMS offloading. The OMA DM management object may additionally or alternatively be used to configure offloading for any type of eligible content accessed over the unicast network via HTTP or RTP.

In some examples, the Management Object Identifier may be set to: urn:oma:mo:ext-3gpp-mbmsmood:1.0. The MO is compatible with OMA Device Management Protocol specifications, version 1.2 and upwards (as specified by Open Mobile Alliance, "OMA Device Management Protocol", Approved Version 1.2.1, June 2008), and is defined using the OMA DM Device Description Framework as described in Open Mobile Alliance, "Enabler Release Definition for OMA Device Management" Approved Version 1.2.1, June 2008.

The example of FIG. 21 depicts the nodes and leaf objects contained under the 3GPP_MBMS MooD MO, if an MBMS middleware client supports the features described.

Node 700 (e.g., Node: /<X>) may, in the example of FIG. 21, specify a unique object id of an MBMS MooD management object. This interior node may group together the parameters of a single object.

Occurrence: ZeroOrOne

Format: node

Minimum Access Types: Get

The following interior nodes may be contained if the UE supports the "MBMS MooD Management Object".

In the example of FIG. 21, node 702 (e.g., /<X>/Enabled) may indicate whether MooD is supported by the BM-SC.

Occurrence: One

Format: bool

Minimum Access Types: Get

Node 704 (e.g., /<X>/ProxyServer) may, in the example of FIG. 21, represent the one or more proxy servers that the UE may use for all unicast requests that the UE elects to potentially receive over MBMS.

Occurrence: One
Format: node
Access Types: Get, Replace
Values: N/A

In the example of FIG. 21, node 706 (e.g., /<X>/Proxy-Server/<X>) may act as a placeholder for one or more instances of ProxyServer information as addresses associated with content restriction identifiers for proxy server selection. Should more than one proxy server satisfy the conditions of the content restriction, the UE may randomly select one of the proxy servers.
Occurrence: OneOrMore
Format: node
Access Types: Get, Replace Node 708 (e.g., /<X>/ProxyServer/<X>/Address) may, in the example of FIG. 21, indicate the one or more addresses of a ProxyServer in the form of a Fully-Qualified Domain Name (FQDN). Each ProxyServer may be associated with a set of content restrictions of which at least one must be satisfied in order for a UE to use that/those Proxy Server(s) for all its unicast requests to resources that it elects to potentially receive over MBMS.
Occurrence: OneOrMore
Format: chr
Access Types: Get, Replace
Values: FQDN (one or more)

Node 710 (e.g., /<X>/ProxyServer/<X>/ContentRestriction) may, in the example of FIG. 21, be a leaf node that contains one or more domain names for matching against the HTTP(s) or RTSP URL of the resource request issued by the UE to determine whether the requested content is eligible for conversion from unicast access to an MBMS User Service, and if so, the corresponding Proxy Server to use. A match between this value and the requested resource URL may indicate that the requested resource may be switched to MBMS delivery, and the associated proxy server shall be used by the UE for unicast access of that resource.
Occurrence: OneOrMore
Format: chr
Access Types: Get, Replace
Values: concatenation of URI scheme as defined in Berners-Lee et al., "Uniform Resource Identifier (URI): Generic Syntax", IETF, RFC 3986, January 2005, with a domain name as defined in Mockapetris, "Domain Names—Implementation and Specification", IETF, RFC 1035, November 1987.

In the example of FIG. 21, node 712 (e.g., /<X>/Proxy-Server/<X>/Ext) may be an interior node where vendor-specific (application vendor, device vendor, etc.) information can be placed, pertaining to UE selection of the proxy server. In some examples, the vendor extension may be identified by a vendor-specific name under the Ext node. The tree structure under the identified vendor is not defined and may therefore include one or more non-standardized sub-trees.
Occurrence: ZeroOrOne
Format: node
Minimum Access Types: Get, Replace Node 714 (e.g., /<X>/USD) may, in the example of FIG. 21, represent the starting point of the MBMS User Service Discovery/Announcement information definitions.
Occurrence: ZeroOrOne
Format: node
Minimum Access Types: Get, Replace In the example of FIG. 21, node 716 (e.g., /<X>/USD/URL) may provide a URL to an aggregated service announcement document encapsulating all relevant metadata fragments for the demand-based MBMS user service, which the UE can fetch using the unicast channel. It may also be used by the network when a device of the network redirects the UE to switch MBMS reception. Should a redirection message provide an alternative redirection link to service announcement information, it shall take precedence over the URL provided by the MO.
Occurrence: ZeroOrOne
Format: chr
Minimum Access Types: Get
Values: <HTTP(S) URL>

Node 718 (e.g., /<X> USD/Ext) may, in the example of FIG. 21, be an interior node where vendor-specific information can be placed. In some examples, the vendor extension is identified by a vendor-specific name under the Ext node. The tree structure under the vendor identified may not be defined and can therefore include one or more un-standardized sub-trees.
Occurrence: ZeroOrOne
Format: node
Minimum Access Types: Get In the example of FIG. 21, node 720 (e.g., /<X>/LocationType) may provide a location type for a UE to report in the unicast content request. One of the following entries may be present: a cell-ID (e.g., in the form of Cell Global Identification (CGI) or E-UTRAN Cell Global Identification (ECGI)). CGI and ECGI are defined in 3GPP Technical Specification 23.003, "Numbering, addressing and identification, (Release 12)" v12.2.0, March 2014. When present, the UE may send its location as part of the MooD header field together with the requests that it sends to a MooD proxy server.
Occurrence: ZeroOrOne
Format: chr
Minimum Access Types: Get
Values: Exactly one of the following location information types: CGI, ECGI.

Node 722 (e.g., /<X>/Ext) may, in the example of FIG. 21, be an interior node where vendor-specific information can be placed. In some examples, the vendor extension may be identified by a vendor-specific name under the Ext node. The tree structure under the identified vendor may not be defined and can therefore include one or more non-standardized sub-trees.
Occurrence: ZeroOrOne
Format: node
Minimum Access Types: Get In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a client device including a Multimedia Broadcast Multicast Services (MBMS) client, a response to a request for first data via a unicast service, wherein the response comprises at least one of a 3xx-type HTTP redirection message or a 200-type HTTP OK message, wherein the at least one of the 3xx-type HTTP redirection message or the 200-type HTTP OK message comprises an extension header, wherein the extension header of the at least one of the 3xx-type HTTP redirection message or the 200-type HTTP OK message comprises an indication that second data is to be received via a second service, wherein the second service comprises at least one of a broadcast service or a multicast service;
in response to the indication of the extension header of the at least one of the 3xx-type HTTP redirection message or the 200-type HTTP OK message indicating that the second data is to be received via the second service that comprises the at least one of the broadcast service or the multicast service, activating, by the client device, the MBMS client of the client device;
in response to the indication of the extension header, retrieving user service description (USD) fragments corresponding to the second data; and
receiving, by the MBMS client of the client device, the second data via the second service using the USD fragments.

2. The method of claim 1, wherein the MBMS client is an evolved MBMS (eMBMS) client.

3. The method of claim 1, wherein the request for the first data comprises a hypertext transfer protocol (HTTP) GET request.

4. The method of claim 1, wherein the extension header is a third generation partnership project (3GPP) extension header.

5. The method of claim 1, further comprising:
sending, by the client device, the request to at least one resource location.

6. The method of claim 5, wherein a manifest file maps an identifier for the first data to the at least one resource location.

7. The method of claim 1, wherein the 3xx-type HTTP redirection message comprises an entity body that includes a redirection location from which to obtain the second data.

8. The method of claim 1, wherein the extension header comprises a Multimedia Broadcast Multicast Service (MBMS) operation on Demand (MooD) header field including the indication.

9. A device comprising:
a Multimedia Broadcast Multicast Services (MBMS) client; and
one or more processing units configured to:
receive a response to a request for first data via a unicast service, wherein the response comprises at least one of a 3xx-type HTTP redirection message or a 200-type HTTP OK message, wherein the at least one of the 3xx-type HTTP redirection message or the 200-type HTTP OK message comprises an extension header, wherein the extension header of the at least one of the 3xx-type HTTP redirection message or the 200-type HTTP OK message comprises an indication that second data is to be received via a second service, wherein the second service comprises at least one of a broadcast service or a multicast service;
in response to the indication of the extension header of the at least one of the 3xx-type HTTP redirection message or the 200-type HTTP OK message indicating that the second data is to be received via the second service that comprises the at least one of the broadcast service or the multicast service, activate the MBMS client of the client device;
in response to the indication of the extension header, retrieve user service description (USD) fragments corresponding to the second data; and
cause the MBMS client to receive the second data via the second service using the USD fragments.

10. The device of claim 9, wherein the MBMS client is an evolved MBMS (eMBMS) client.

11. The device of claim 9, wherein the request for the first data comprises a hypertext transfer protocol (HTTP) GET request.

12. The device of claim 9, wherein the extension header is a third generation partnership project (3GPP) extension header.

13. The device of claim 9, wherein the one or more processing units are further configured to:
send the request to at least one resource location.

14. The device of claim 13, wherein a manifest file maps an identifier for the first data to the at least one resource location.

15. The device of claim 9, wherein the 3xx-type HTTP redirection message comprises an entity body that includes a redirection location from which to obtain the second data.

16. The device of claim 9, wherein the extension header comprises a Multimedia Broadcast Multicast Service (MBMS) operation on Demand (MooD) header field including the indication.

17. A non-transitory computer-readable storage medium having instruction stored thereon that, when executed, cause at least one processor of a client device, the client device further comprising a Multimedia Broadcast Multicast Services (MBMS) client implemented in circuitry, to:
receive a response to a request for first data via a unicast service, wherein the response comprises at least one of a 3xx-type HTTP redirection message or a 200-type HTTP OK message, wherein the at least one of the 3xx-type HTTP redirection message or the 200-type HTTP OK message comprises an extension header, wherein the extension header of the at least one of the 3xx-type HTTP redirection message or the 200-type HTTP OK message comprises an indication that second data is to be received via a second service, wherein the second service comprises at least one of a broadcast service or a multicast service;
in response to the indication of the extension header of the at least one of the 3xx-type HTTP redirection message or the 200-type HTTP OK message indicating that the second data is to be received via the second service that comprises the at least one of the broadcast service or the multicast service, activate the MBMS client of the client device;
in response to the indication of the extension header, retrieve user service description (USD) fragments corresponding to the second data; and
cause the MBMS client to receive the second data via the second service using the USD fragments.

18. The non-transitory computer-readable storage medium of claim 17, wherein the MBMS client is an evolved MBMS (eMBMS) client.

19. The non-transitory computer-readable storage medium of claim 17, wherein the request for the first data comprises a hypertext transfer protocol (HTTP) GET request.

20. The non-transitory computer-readable storage medium of claim 17, wherein the extension header is a third generation partnership project (3GPP) extension header.

21. The non-transitory computer-readable storage medium of claim 17, further having instructions stored thereon that, when executed, cause the at least one processor to:
send the request to at least one resource location.

22. The non-transitory computer-readable storage medium of claim 21, wherein a manifest file maps an identifier for the first data to the at least one resource location.

23. The non-transitory computer-readable storage medium of claim 17, wherein the 3xx-type HTTP redirection message comprises an entity body that includes a redirection location from which to obtain the second data.

24. The non-transitory computer-readable storage medium of claim 17, wherein the extension header comprises a Multimedia Broadcast Multicast Service (MBMS) operation on Demand (MooD) header field including the indication.

* * * * *